(12) United States Patent
Miura et al.

(10) Patent No.: US 7,853,122 B2
(45) Date of Patent: Dec. 14, 2010

(54) DEVICE FOR REPRODUCING CONTENT SUCH AS VIDEO INFORMATION AND DEVICE FOR RECEIVING CONTENT

(75) Inventors: Masatoshi Miura, Chiba (JP); Yasushi Takahashi, Chiba (JP); Mikio Kamada, Kanagawa (JP); Yoshiaki Shibata, Kanagawa (JP); Hitoshi Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1218 days.

(21) Appl. No.: 10/240,803
(22) PCT Filed: Feb. 6, 2002
(86) PCT No.: PCT/JP02/00984

§ 371 (c)(1),
(2), (4) Date: Jun. 19, 2003

(87) PCT Pub. No.: WO02/063875
PCT Pub. Date: Aug. 15, 2002

(65) Prior Publication Data
US 2004/0013398 A1  Jan. 22, 2004

(30) Foreign Application Priority Data

| Feb. 6, 2001 | (JP) | P2001-029122 |
| Feb. 8, 2001 | (JP) | P2001-032012 |
| Mar. 12, 2001 | (JP) | P2001-068890 |
| Jan. 9, 2002 | (JP) | P2002-002312 |

(51) Int. Cl.
*H04N 5/91* (2006.01)
*H04N 7/00* (2006.01)
*H04N 7/16* (2006.01)
*H04H 60/33* (2008.01)
*H04H 60/45* (2008.01)

(52) U.S. Cl. .............. 386/95; 386/46; 725/9; 725/10; 725/11

(58) Field of Classification Search .......... 386/95, 386/83, 46; 348/552; 725/90, 24, 34, 46, 725/9, 10, 11
See application file for complete search history.

(56) References Cited

U.S. PATENT DOCUMENTS 5,596,558 A * 1/1997 Arataki et al. ........... 369/53.18
(Continued)

FOREIGN PATENT DOCUMENTS
EP  1 026 847  8/2000
(Continued)

OTHER PUBLICATIONS
Patent Abstracts of Japan, vol. 2000, No. 5, Feb. 2, 2000, JP 2000 059745.
(Continued)

*Primary Examiner*—Thai Tran
*Assistant Examiner*—Hung Q Dang
(74) *Attorney, Agent, or Firm*—Frommer Lawrence & Haug LLP; William S. Frommer

(57) ABSTRACT

The present invention is relative with a reproducing apparatus and a receiving apparatus for affording the impression or evaluation in line with the intention of a content supplier to the audience. The reproducing apparatus reproduces an optical disc (1) in which the contents and the estimated evaluation values are recorded at the outset. The estimated evaluation values recorded on the optical disc (1) have been set by the content supplier based on estimated impression or evaluation by the audience on the content. As the reproducing apparatus reproduces the content, the apparatus measures the reaction of the audience by a reaction value inputting unit (61), calculates the impression or evaluation by the audience for the content by a recognition evaluation value calculating unit (63) and compares the recognized evaluation values to the estimated evaluation values read out from the optical disc (1) in a control evaluation value calculating unit (53). Based on the results of comparison, a system controller (7) changes the picture brightness or the sound level in subsequent scenes or shots to vary the site or sequence of reproduction of the optical disc (1) to change the ensuing story development. The estimated evaluation values and/or the content can be received by a receiving apparatus over a communication network.

10 Claims, 30 Drawing Sheets

U.S. PATENT DOCUMENTS

| | | | |
|---|---|---|---|
| 5,721,583 A * | 2/1998 | Harada et al. | 725/24 |
| 5,848,934 A | 12/1998 | Shiels et al. | |
| 6,704,491 B1 * | 3/2004 | Revis | 386/94 |
| 2002/0006094 A1 * | 1/2002 | Teramoto | 369/53.21 |
| 2002/0013947 A1 * | 1/2002 | Russell et al. | 725/90 |
| 2002/0056118 A1 * | 5/2002 | Hunter et al. | 725/87 |
| 2002/0083145 A1 * | 6/2002 | Perinpanathan | 709/213 |
| 2002/0100046 A1 * | 7/2002 | Dudkiewicz | 725/46 |
| 2002/0133506 A1 * | 9/2002 | Yamato | 707/104.1 |
| 2002/0199194 A1 * | 12/2002 | Ali | 725/46 |
| 2003/0101451 A1 * | 5/2003 | Bentolila et al. | 725/34 |

FOREIGN PATENT DOCUMENTS

| | | |
|---|---|---|
| EP | 1 054 564 | 11/2000 |
| JP | 10-243309 | 9/1998 |
| JP | 10-243383 | 9/1998 |
| JP | 10 243383 | 9/1998 |
| JP | 2000-059745 * | 2/2000 |
| JP | 2001 285228 | 10/2001 |
| JP | 2001-285228 | 10/2001 |
| JP | 2002-18135 | 1/2002 |
| JP | 2002 18135 | 1/2002 |

OTHER PUBLICATIONS

Patent Abstracts of Japan, vol. 1998, No. 14, Sep. 9, 1998, JP 10 243383.

* cited by examiner

```
<Audio Visual Segment id="flower">
    <Media Time>
      <Media Rel Time Point>PT1M25S</Media Rel Time Point>
      <Media Duration>PT13S</Media Duration>
    </Media Time>
    <Supposed Value>
      <Noteworthy Phenomenon>50</Noteworthy Phenomenon>
      <Beauty>40</Beauty>
      <Stimulation>5</Stimulation>
    </Supposed Value>
            :
</Audio Visual Segment>
```

FIG.9

DEVICE FOR REPRODUCING CONTENT SUCH AS VIDEO INFORMATION AND DEVICE FOR RECEIVING CONTENT

TECHNICAL FIELD

This invention relates to an apparatus for reproducing the content from a recording medium, such as DVD (Digital Versatile Disc), an apparatus for receiving the content, broadcast or distributed, a method for presentation control of the content in case the content is reproduced or received by this content reproducing apparatus or the content receiving device, and to methods and apparatus for collecting/analyzing or collecting/managing the impression or evaluation of the content on the part of the viewer in case the content is reproduced or received by the content reproducing apparatus or the content receiving device.

Meanwhile, in the present invention, one of the picture information and the acoustic information is defined as the content. The picture information is meant to include the totality of the information that the human being can visually recognize, such as moving pictures, still pictures or graphics, while the acoustic information is meant to include the totality of the information that the human being can psycoacoustically recognized, such as music numbers, speech or natural sounds.

BACKGROUND ART

It is practiced in a DVD system or a game video system to determine the story development of the content by commands or actions on the part of the viewer (users).

In the DVD system, there are provided a parental lock function of removing e.g., a tyrannous scene from the presented content by level values preset by the viewer and a multi-angle function enabling the viewer to selectively view a picture of a desired angle in the case of a picture of a concert or sports.

Specifically, the parental lock function reproduces one of concatenations of scenes or shots, as the content, provided from one viewer level to another, while the multi-angle function enables the viewer to switch the pictures recorded with plural camera angles as he or she desires.

In a video game system, story development is determined and the game progresses responsive to the player's operations.

For observing or investigating into the reaction or evaluation of the viewer (audience) to a motion picture or a TV (television) content, or the content recorded on a recording medium, such as DVD, such a method is used in which the viewer's expressions or behavior, such as laughter or surprise, is observed in a preview, in the case of, for example, a motion picture, or such a method is also used in which the impression or opinion of the viewer is asked by a questionnaire. In the case of a TV program, the audience share (audience share) is searched from one time zone to another, by for example an audience share search machine to analyze the viewer's liking. As for the content recorded on the recording medium, such a method is used in which its sale is searched on the date/time basis or on the sale territory or area basis and the results are summed together.

In the above-described conventional content presentation controlling method, simply an image is selected and the story development of the content is changed, while the impression or evaluation as intended by the content supplier (creator) cannot be afforded to the viewer. For example, if the viewer is not interested in the presented content as expected by the content creator, content presentation cannot be controlled such as to arouse the viewer's interest.

DISCLOSURE OF THE INVENTION

It is therefore an object of the present invention to provide a content reproducing or receiving apparatus in which the facial impression or evaluation contemplated by the content creator can be afforded to the viewer.

In the above-described conventional method for collecting/analyzing or collecting/managing the reaction or evaluation of the viewer (audience) to the content, the first method in the case of for example the motion picture fails to grasp the inner reaction which can hardly be manifested on the spectator's facial expressions or behavior, or to measure the physiological reactions, with the result that it cannot be known precisely and in detail what feeling or impression the viewer has had as to the content. In addition, the evaluation of a large number of viewers cannot be obtained nor analyzed frequently and continuously.

The second method as to the TV program is that only the time-zone-based audience share can be known, while it cannot be known with which impression the viewer viewed the program, with the result that it is not possible to correctly grasp the program's popularity to acquire an index useful in retouching the program continuously or an index useful for subsequent program creation. The same applies for the third method for the content recorded on a recording medium.

It is another object of the present invention to allow to correctly grasp the viewer's evaluation for the content correctly and in detail, from one presentation time zone of the content to the next, in which the viewer's evaluation includes the inner and physiological reactions that are hardly manifested on the viewer's facial expressions or behavior, in order to acquire the evaluation of many viewers frequently and continuously and in order to acquire the index for subsequent content creation reliably.

The present invention provides a content reproducing apparatus pertinent to content presentation control. The apparatus includes reproducing means for reproducing a content, which is at least one of the picture information and the acoustic information, and evaluation values estimated for the content, from a recording medium, having recorded thereon the content and the estimated evaluation values, reaction value inputting means to which a reaction of a viewer to the reproduced content is input as reaction values, recognized evaluation value computing means for computing, from the input reaction values, the evaluation by the viewer for the content reproduced by the reproducing means, as recognized evaluation values, control evaluation value calculating means for comparing the so calculated recognized evaluation values and the estimated evaluation values, reproduced by the reproducing means, to calculate control evaluation values, and controlling means for controlling the reproduction of the content from the recording medium by the reproducing means, based on the so calculated control evaluation values.

The present invention also provides a content receiving apparatus pertinent to content presentation control. The apparatus includes receiving means for receiving a content which is at least one of the picture information and the acoustic information and evaluation values estimated for the content, storage means for storing the received content and the estimated evaluation values, reproducing means for reproducing the content and the estimated evaluation values from the storage means, reaction value inputting means to which the evaluation of the viewer on the reproduced content is input as reaction values, recognized estimation value computing means for computing, from the input reaction values, the evaluation of the viewer to the content reproduced by the reproducing means, as recognized evaluation values, control evaluation value computing means for computing control evaluation values by comparing the computed recognized evaluation value and the estimated evaluation values reproduced by the reproducing means and controlling means for controlling the reproduction of the content from the storage means by the reproducing means, based on the computed control evaluation values.

In the content reproducing apparatus or in the content receiving apparatus, according to the present invention, recognized evaluation value inputting means for inputting the viewer's evaluation for the content reproduced by reproducing means may be provided in place of the reaction value inputting means and recognized evaluation value computing means. The control evaluation value computing means then compares the input recognized evaluation values and the estimated evaluation values reproduced by the reproducing means to compute the control evaluation values.

This content reproducing apparatus or in the content receiving apparatus then is able to give the viewer the impression or evaluation in line with the intention of the content supplier.

The present invention provides a content reproducing apparatus pertinent to collection and analysis of the evaluation for the content. The apparatus includes reproducing means for reproducing a content, which is at least one of the picture information and the acoustic information, from a recording medium having the content recorded thereon, reaction value inputting means to which the reaction of a viewer to the reproduced content is input as reaction values, recognized evaluation value computing means for computing, from the input reaction values, recognized evaluation values indicating the evaluation of the viewer to the reproduced content, and communication means for transmitting the information of the recognized evaluation values, as computed, the content identification information, as the information specifying the reproduced content, and the transmission source identification information, as the information specifying the reproducing apparatus or the viewer.

The present invention also provides content receiving apparatus pertinent to collection and analysis of the evaluation for the content. The apparatus includes receiving means for receiving a content, which is at least one of the picture information and the acoustic information, reaction value inputting means to which the reaction of a viewer to the received content is input as reaction values, recognized evaluation value computing means for computing, from the input reaction values, recognized evaluation values indicating the viewer's evaluation on the received content, and communication means for transmitting the information of the recognized evaluation values, as computed, the content identification information, as the information specifying the reproduced content, and the transmission source identification information, as the information specifying the receiving apparatus or the viewer.

The content reproducing or receiving apparatus according to the present invention may be provided with recognized evaluation value inputting, to which the viewer's evaluation on the content reproduced or received is input as recognized evaluation values, in place of the reaction value inputting means and recognized evaluation values.

In the content evaluation collecting and analyzing method according to the present invention, the information of the recognized evaluation values indicating the viewer's evaluation for the content, the content identification information, which is the information specifying the content, and the transmission source identification information, as the information specifying a terminal device, reproducing or receiving the content, which is one of the picture information and the acoustic information, or the audience, are received from the terminal device, the respective information are detected and the viewer's evaluation for the content is analyzed.

In this case, the recognized evaluation values received are compared to the evaluation values estimated for the content at the outset to analyze the viewer's evaluation for the content.

In the above-described content reproducing device, content receiving device or the content evaluation collecting and analyzing method, the viewer's evaluation on the content, inclusive of the inner and psychological reactions, scarcely manifested in the facial expressions or demeanor of the viewer, may be known accurately in detail from one presentation time zone of the content to another. In particular, the evaluation of many viewers can be frequently and continually obtained and analyzed to arrive at an index which may be used in retouching the content or subsequently creating the content.

The present invention also provides a content reproducing apparatus for collecting and managing the evaluation for the content, including reproducing means for reproducing at least one of the picture information and the acoustic information, as the content, from a recording medium, having the content recorded thereon, reaction value inputting means, to which the reaction indicating the reaction of the viewer to the content reproduced is input as reaction values, recognized evaluation value computing means for computing, from the input reaction values, the recognized evaluation values indicating the viewer's evaluation to the content reproduced by the reproducing means, setting means for setting the transmission source identification information as the information determining a transmission source, decision means for specifying the viewer for determining the transmission source identification information, and communication means for transmitting the so determined transmission source identification information, the content identification information, as the information specifying the content reproduced by the reproducing means, and the recognized evaluation value information calculated by the recognized evaluation value computing means or the results of comparison between the recognized evaluation values and evaluation values pre-estimated for the content reproduced by the reproducing means.

The present invention also provides a content receiving apparatus for collecting and managing the evaluation for the content, including receiving means for receiving at least one of the picture information and the acoustic information, reaction value inputting means, to which the reaction indicating the reaction of the viewer to the content received is input as reaction values, recognized evaluation value computing means for computing, from the input reaction values, the recognized evaluation values indicating the viewer's evaluation to the content received by the receiving means, setting means for setting the transmission source identification information as the information determining a transmission source, decision means for specifying the viewer for determining the transmission source identification information, and communication means for transmitting the so determined transmission source identification information, the content identification information, as the information specifying the content received by the receiving means and the recognized evaluation value information calculated by the recognized evaluation value computing means or the results of comparison between the recognized evaluation values and evaluation values pre-estimated for the content received by the receiving means.

The above-described content reproducing apparatus or the content receiving apparatus may also be provided with recognized evaluation value inputting means, to which the viewer's evaluation for the content reproduced or received is input as the recognized evaluation values, in place of the reaction value inputting means and the recognized evaluation value computing means.

In the content evaluation collecting and managing method of the present invention, the transmission source identification information, as the information specifying a transmission source, transmitted from a terminal device reproducing or receiving the content, the content identification information, as the information specifying the content, reproduced or received by said terminal device, and the recognized evaluation values indicating the viewer's evaluation for the content reproduced or received by said terminal device, or the result of comparison between the recognized evaluation values and evaluation values pre-estimated for the content reproduced or received by said terminal device, are received, the respective information is detected, the viewer's evaluation for the content is analyzed and the evaluation hysteresis as well as management data on the transmission source specified by said transmission source identification information is updated.

In the above-described content reproducing apparatus, content receiving apparatus or the content evaluation collecting and analyzing method, the viewer's evaluation of the audience for the content, inclusive of the inner and psychological reactions scarcely manifested in the facial expressions or demeanor of the viewer, may be known accurately in detail from one presentation time zone of the content to the next. In particular, the evaluation of many viewers can be frequently and continually obtained and analyzed to arrive at an index which may be used in retouching the content or subsequently creating the content.

Other objects, features and advantages of the present invention will become more apparent from reading the embodiments of the present invention as shown in the drawings.

BRIEF DESCRIPTION OF THE DRAWINGS

FIG. 9 shows typical data stating estimated evaluation values.

BEST MODE FOR CARRYING OUT THE INVENTION

Embodiment of Content Presentation Control: See FIGS. 1 to 9

As a first embodiment of the present invention, the case of controlling content presentation responsive to the viewer's evaluation on the reproduced or received content is hereinafter explained.

Figure 1:
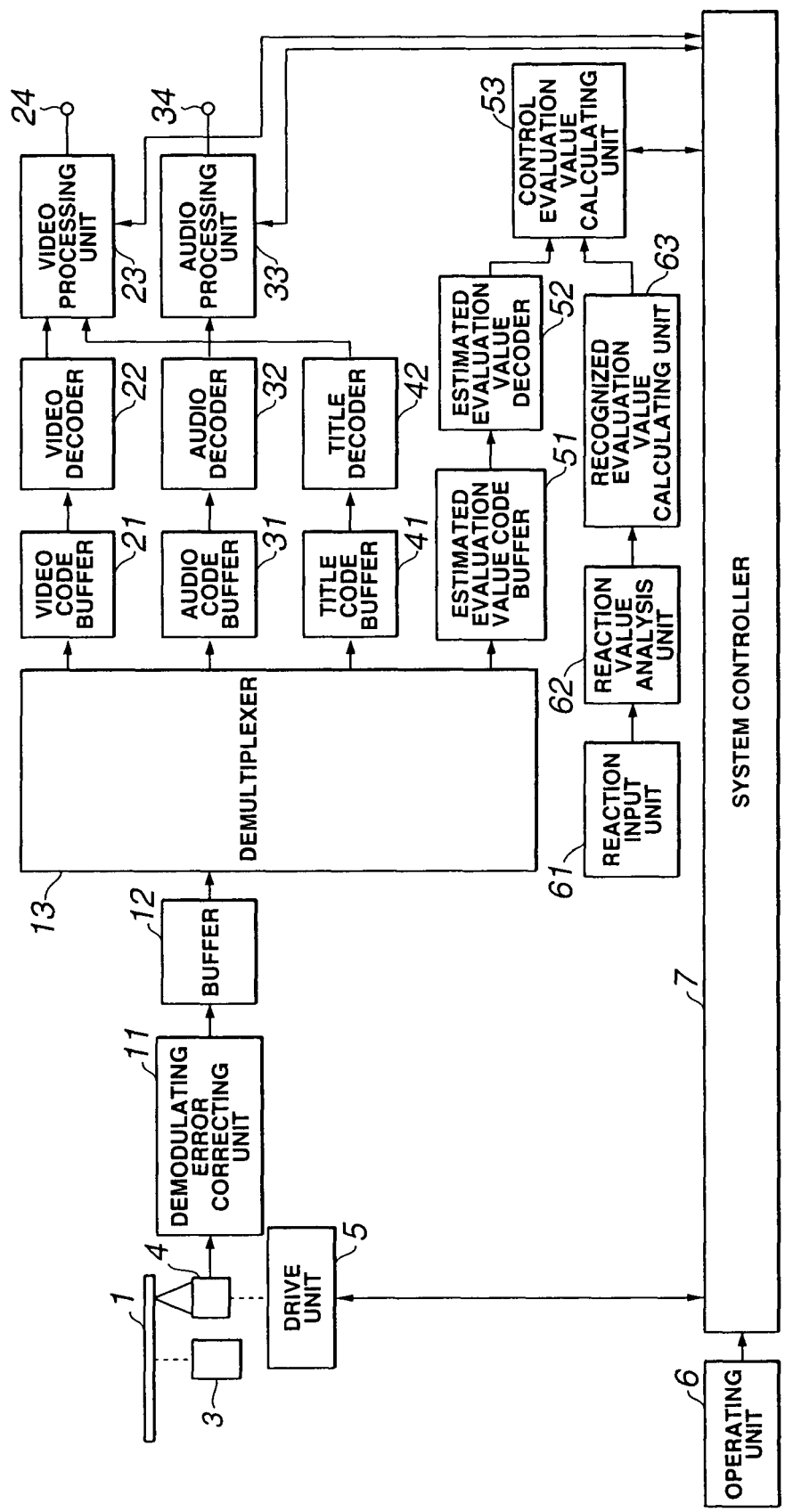
FIG. 1 is a block diagram showing an embodiment of a content reproducing apparatus according to the present invention.

(Embodiment of Content Reproducing Apparatus: FIG. 1)

FIG. 1 shows an embodiment of an optical disc reproducing apparatus as a content reproducing apparatus of the present invention.

In the present embodiment, the content and estimated evaluation values are recorded on the optical disc 1. The content in this case is the motion picture information and the acoustic information for the motion picture. Specifically, picture data and audio data are compression-encoded in accordance with the MPEG (Moving Picture Experts Group) system, multiplexed and recorded on the optical disc 1.

The estimated evaluation value E is the impression and evaluation by the viewer who has viewed the content, as estimated by the content supplier (creator). The estimated evaluated value data are encoded and, in the present embodiment, are multiplexed into picture data and acoustic data so as to be recorded on the optical disc 1.

Specifically, the estimated evaluation value data are multiplexed from one GOP (Group of Pictures) of the MPEG stream to another or from one picture of the MPEG stream to another. In any case, the time axis of the multiplexed evaluation value data may be managed by referencing for example the replay time management information of a GOP or a picture in question.

As another method for managing the time axis of the estimated estimation value, data stating the estimated evaluation value, and time information, including the start and end time or the start time and the time duration thereof, is multiplexed into picture data and acoustic data, and transmitted, as in the present embodiment, or may be transmitted independently of the picture data and the acoustic data, as in an embodiment which will be explained subsequently.

As an instance, description data shown in FIG. 9 may be used as description data of a scene [flower] having a three-dimensional estimated evaluation value (degree of attention of 50, beauty of 40 and stimulus degree of 5), represented by the start time (1 minute 25 second) and time duration (13 seconds). This description data is transmitted by multiplexing it on the picture data and the acoustic data, or transmitted by a cabled network or a radio network independently of the picture data and the acoustic data.

On the optical disc, there are also recorded the decoding time information, such as decoding time stamp, and the content presentation time information (replay time information), such as presentation time stamp.

(Outline of Reproducing Apparatus)

An optical disc 1 is driven by a disc motor 3. An optical head (pickup) 4 is driven by a driving unit 5 including a feed motor and a tracking/focussing actuator 5.

When the viewer acts on an operating unit 6 for reproduction, a system controller 7 commands reproducing the optical disc 1 to cause the signals to be read out by the optical head 4.

The signals so read out are demodulated and corrected for errors by a demodulation error correction unit 11 so as to be then written in and read out from a buffer 12.

The signals read out from the buffer 12 are sent to a demultiplexer 13 from which encoded picture data, acoustic data, title data and the estimated evaluation value data are separately acquired.

The encoded picture data, acoustic data, title data and the estimated evaluation value data are written in a video code buffer 21, an audio code buffer 31, a title code buffer 41 and an estimated evaluation value buffer 51, read out from the video code buffer 21, audio code buffer 31, title code buffer 41 and the estimated evaluation value buffer 51 and subsequently decoded in a video decoder 22, an audio decoder 32, a title decoder 42 and an estimated evaluation value decoder 52.

Based on the timing information, such as the aforementioned decoding time stamp, the system controller 7 controls the decoding timing in the respective decoders 22, 32, 42, 52 and controls the output timing in the respective decoders 22, 32, 42, 52 for coordinating the temporal data sequence in the respective decoders 22, 32, 42 and 52 based on the timing information such as the aforementioned presentation time stamp.

The picture data from the video decoder 22 and the title data from the title decoder 42 are sent to a video processor 23 where the picture characteristics are controlled by characteristics controlling signals from the system controller 7, at the same time as title signals are superimposed in the picture signals, as will be explained subsequently.

The picture signals at an output of the video processor 23 are output to a video output terminal 24 from which the picture signals are sent to a picture display device, such as a CRT display or a liquid crystal projector.

The picture signals are sent to a picture display apparatus, having a D/A (digital to analog) converter, as the picture signals remain to be digital picture data, that is without being converted by the video processor 23 into the analog picture signals. Alternatively, the picture signals are converted by the video processor 23 into analog picture signals, which are sent out to the picture display apparatus.

The acoustic data from the audio decoder 32 are sent to an audio processor 33 and are controlled by this audio processor 33 by the characteristics control signals from the system controller 7, as will be explained subsequently.

The acoustic signals of the output of the audio processor 33 are output to an audio output terminal 34 so as to be output from the audio output terminal 34 to an audio output device, such as a loudspeaker or to a headphone.

The acoustic signals are sent to an audio display apparatus, having the D/A (digital to analog) converter, as the acoustic signals remain to be digital audio data, that is without being converted by the audio processor 33 into the analog picture signals. Alternatively, the acoustic signals are converted by the audio processor 23 into analog acoustic signals, which are sent out to the audio outputting apparatus.

When the contents are reproduced from the optical disc 1, the reaction of the viewer, who listened to the sound output from the audio outputting device and who viewed the picture displayed by the picture display apparatus, is input from a reaction value inputting unit 61 as a reaction value. At the same time as the content from the optical disc 1 is reproduced, the system controller 7 measures the reaction of the viewer by the reaction value inputting unit 61.

The reaction value, input from the reaction value inputting unit 61, is analyzed by a reaction value analysis unit 62 where another reaction value is calculated. From the reaction value input from the reaction value inputting unit 61 and from the reaction value calculated by the reaction value analysis unit 62, the recognition evaluation value indicating the impression or evaluation by the viewer of the content reproduced from the optical disc 1 is calculated by a recognition evaluation value calculating unit 63.

A control evaluation value calculating unit 53 compares the estimated evaluation value, obtained from the optical disc 1 and decoded by the estimated evaluation value decoder 52, to the recognized evaluation values as calculated by the recognition evaluation value calculating unit 63, and the result is evaluated to compute control evaluation values.

From the control evaluation value, computed from the control evaluation value calculating unit 53, the system controller 7 generates a control signal controlling the replay characteristics of the content and a control signal for changing the progress of the content story, and sends the former control signal to the video processor 23 and to the audio processor 33 to control the replay characteristics of the picture and the sound, while sending the latter control signal to the driving unit 5 to change the reproducing location or sequence of the optical disc 1.

In FIG. 1, the reaction value inputting unit 61, reaction value analysis unit 62, recognition evaluation value calculating unit 63, control evaluation value calculating unit 53 and the system controller 7 are functionally separated from one another. However, the signal processing of the reaction value inputting unit 61 or the functions of the reaction value analysis unit 62, recognition evaluation value calculating unit 63 and the control evaluation value calculating unit 53 may also be included in the functions proper to the system controller 7.

<Estimated Evaluation Value>

The estimated evaluation value recorded on the optical disc 1 estimates the impression or evaluation of the content by the viewer who viewed the content, and is set by the content supplier (creator) in consideration of the sort or brightness of the presented picture, sort or level of the sound presented (sound magnitude) or the story development of the presented content.

The content presented in most cases has the properties of a story. The psychological state of the viewer to whom the content has been presented is customarily changed with the story development. Thus, if the picture or the sound is the same, the impression or evaluation, such as feeling or interpretation, may be estimated to differ, depending on a particular scene. Thus, the estimated evaluation value is set at each partition of the content, such as at each scene or shot of the content, in consideration of the story properties of the presented content, in addition to characteristics of the picture or the sound (physical properties of the picture brightness or the sound level). As a matter of course, the scene or shot, to which the attention of the viewer is desired to be directed, is video-acoustically adjusted so that the recognition evaluation value indicating the degree of the viewer's interest for such scene or shot will be higher. Thus, the estimated evaluation value of the scene or shot is also set to a higher value.

The estimated evaluation value may be represented as multi-dimensional data, in which case an identifier indicating the meaning of each of multiple dimensions is appended to the leading end of estimated evaluation value data of each dimension.

<Measurement of Reaction Values and Calculations of Recognition Evaluation Values>

The reaction value inputting unit 61 is made up by various sensors and a signal processor. In this signal processor, measurement data of sensor outputs are processed with differentiation, integration or correlation calculations to obtain reaction values.

It is however possible for the reaction value inputting unit 61 to be provided only with sensor portions and with interfacing portions. A sensor output is processed by the system controller 7 to calculate the reaction value.

The sensors for measuring the reaction of the viewer are mounted on the seat surface, backrest or armrest of a seat in which the viewer sits, an ear pad or a head band of a head set worn by the viewer, or on a remote commander operated by the viewer.

The reaction values are classified into data measured as an action of the viewer and data obtained on analysis of measured data from the reaction value inputting unit 61 by the reaction value analysis unit 62.

Specifically, the measurement items as the viewer's reaction may be exemplified by a cardiogram, respiration rate, respiration period, an electromyogram, cerebral blood flow, brain wave, amount of respiration, skin temperature, pupil diameter, eye opening degree, eye blink, facial expressions, blood flow of limb, blood flow in an earlobe and limb temperature.

In an audience participation type drama, such as a motion picture, a game or a broadcast receiving apparatus as later explained, the values obtained by the observation of the active behavior of the viewer, such as, for example, the pitch or frequency of the speech uttered by the viewer, its variations, smoothness of motion or the magnitude of force when an operating lever is moved, may be used.

The data obtained by the reaction value analysis unit 62 by analyzing these measured data may be exemplified by data indicating the time interval during which there is no blink, as calculated by analyzing the data indicating the time points of blink, and data indicating the time period of laughter, as calculated from the eye opening degree and variations in the blinkless time or mouth expressions.

Additionally, the reaction value analysis unit 62 is able to calculate data indicating the domain or period of surprise from the eye opening degree, changes in the pupil diameter or the electromyogram (indicating the tension of limb muscle). Moreover, the reaction value analysis unit 62 is able to calculate data indicating the domain of tension from the amount of sweat, heart rate, its rise rate, changes in the pupil diameter, changes in the limb blood flow and changes in the limb temperature.

As a method for calculating the new reaction value from the plural measured data, such a method which resides in linear combination of respective measured data may be used.

In the recognition evaluation value calculating unit 63, the impression or evaluation of the contents by the viewer is calculated as a recognition evaluation value from the reaction values input from the reaction value inputting unit 61 and from the reaction value calculated in the reaction value analysis unit 62.

As specified recognition evaluation value, the evaluation value indicating the degree of the viewer's interest, the evaluation value indicating the strength of the impression, the evaluation value indicating the preference or the evaluation value indicating the degree of fear, is calculated.

The recognition evaluation value, indicating the degree of the viewer's interest, is calculated as a function of the eye opening degree, blink rate or the heart rate. The recognition evaluation value indicating the strength of impression is calculated from the eye opening degree, heart rate and the amount of sweat. The recognition evaluation value indicating the preference is calculated from the stableness of heart rate or the amount of sweat, limb temperature or limb blood flow. The recognition evaluation value indicating the fear is calculated from the degree of surprise or the degree of tension.

Meanwhile, the recognition evaluation values are defined and calculated here taking the meaning of recognition into account and are not necessarily independent of one another.

Similarly to the estimated evaluation values, the recognition evaluation values may also be represented as multi-dimensional data, in which case an identifier indicating the meaning of each dimension is appended for use as recognition evaluation value data. In such case, comparison in the control evaluation value calculating unit 53 of the estimated evaluation values represented as multi-dimensional data to the recognition evaluation values similarly represented as multi-dimensional data may for example be by comparing the direction and the magnitude of the multi-dimensional vectors.

Although the reaction values and the recognition evaluation values may be measured or calculated incessantly, they may also be calculated at each partition of the content, such as each scene or shot of the content. Although the information indicating the domain or period, such as scene or shot, may be recorded on the optical disc 1 along with the content, it may be the system controller 7 that detects the partition, such as each scene or shot, from the features of the reproduced image or sound.

<Calculations of the Control Evaluation Values and Content Presentation Control>

If the various reaction values or the recognition evaluation values, calculated from these values, the psychological state of the viewer to the presented content can be understood. Moreover, comparison of the estimated evaluation values as set previously by the content supplier with the recognition evaluation values as calculated from these values reveals whether or not the viewer is in the psychological state as expected by the content supplier.

The first embodiment further positively exploits the results of comparison of the estimated evaluation values to the recognition evaluation values in content presentation control.

If specifically the result of comparison of the estimated evaluation values to the recognition evaluation values indicates that the viewer is not so affrighted as expected, the video-acoustic properties, such as picture brightness or the sound level of the subsequent scenes or shots, are changed, or the subsequent story development is changed.

If it is determined that the viewer is not happier than expected, is not so keenly interested as expected or is not concentrated in the scene as expected, subsequent story development is changed.

For changing the story development, such scenes which may be suggestive of later development or which may be presupposed from previous scenes are inserted to enable anticipation of the story development. This raises the degree of the viewer's attention to the story. Conversely, the scene content which may suggest the story development may be changed or deleted to render it difficult to anticipate the story progress or to prevent the audience from becoming tired of the story progress.

In changing the story, scene or shor, reference may be made to the hysteresis of the past reaction values or the recognition evaluation values of the viewer. The hysteresis may be the stored reaction values or the recognition evaluation values, recorded in the past, of the content currently presented, or the stored reaction values or the recognition evaluation values for another content viewed by the viewer in the past.

Specifically, in the example of FIG. 1, the content is read out from the optical disc 1 and decoded so as to be output to the picture display apparatus and to the sound outputting device, at the same time as the scene- or shot-based estimated evaluation values are read out from the optical disc 1.

The estimated evaluation value as read out from the optical disc 1 is correlated with the content presentation time information. Thus, the system controller 7 is able to recognize the scene- or shot-based estimated evaluation, as [the estimated evaluation value in the sense indicated by the identifier is 40 as from the presentation time 01:25:30 until presentation time 01:26:20].

On the other hand, as the content is decoded and reproduced, the reaction of the viewer is measured as the reaction value, and the recognition evaluation value indicating the impression or the viewer's evaluation to the reproduced content is calculated and compared to the estimated evaluation value as read out from the optical disc 1.

The system controller verifies, from the results of comparison of the estimated evaluation values and the recognized evaluation values, whether or not the difference between the scene- or shot-based difference between the estimated evaluation value and the recognized evaluation value is within the pre-set allowable range. Moreover, the system controller 7 checks the change tendency of the recognized evaluation value and the difference between the estimated evaluation value and the recognized evaluation value, in connection with the difference between the estimated evaluation value and the recognized evaluation value in the scene or shot of the past scene or shot, whether the difference between the estimated evaluation value and the recognized evaluation value is increasing or decreasing, whether the increasing tendency of the recognized evaluation value is desirable, whether the decreasing tendency of the recognized evaluation value is desirable, or whether the locally maximum value or the locally minimum value of the recognized evaluation value is desirable.

For example, if the difference between the estimated evaluation value and the recognized evaluation value is within the allowable range, but it is increasing, the viewer's reaction is determined to be in a direction different than expected.

Based on these results of decision, the system controller 7 controls the content replay characteristics to change the story development of the content.

The reproducing characteristics of the content may be luminance, contrast, saturation or color tone (color phase), while those of the sound may be frequency response or sound level.

The change of the story development may be made by such a method in which, when one scene is to be presented, one of plural scenes is selected and presented, or by a method in which certain shots making up a scene are interchanged and the so interchanged shots are presented.

Although scenes or shots can be interchanged at any optional time for changing the story development, it is also possible to permit interchange of scenes or shots for only specified scenes.

An optical disc reproducing apparatus is constructed so that, for controlling the state of the viewer's feeling for the content, indexes concerning the meaning or the orientation of the recognition and evaluation, such as 'logical process of introduction, development, turn and conclusion', may be affixed beforehand to plural selectable scenes, so as to permit the system controller 7 to select the scene to be presented, based on these indexes and on the results of comparison between the estimated evaluation values and the recognized evaluation values.

The optical disc reproducing apparatus is also constructed so that, as for shot interchanging, indexes are affixed to the shots and scenes to be presented will be selected from the indexes and from the results of comparison between the estimated evaluation values and the recognized evaluation values.

In the above embodiments, it is possible for the content supplier to give the viewer the impression or to acquire the evaluation from the viewer, as the content supplier expected from the viewer, in connection with the feeling or interest the viewer has shown on the content. The items in which the viewer will be interested may be estimated from the difference between the estimated evaluation values and the recognized evaluation values and from the tendency of change of the recognized evaluation values to cause the reproduction characteristics of the content and the story development as will arouse the interest on the part of the viewer.

(Other Embodiments of the Content Reproducing Apparatus)

In the embodiment of FIG. 1, the recognized evaluation values are calculated in the recognition evaluation value calculating unit 63 from the reaction values from the reaction value inputting unit 61. Alternatively, the recognized evaluation value for the respective items may be directly input by the viewer.

Figure 2:
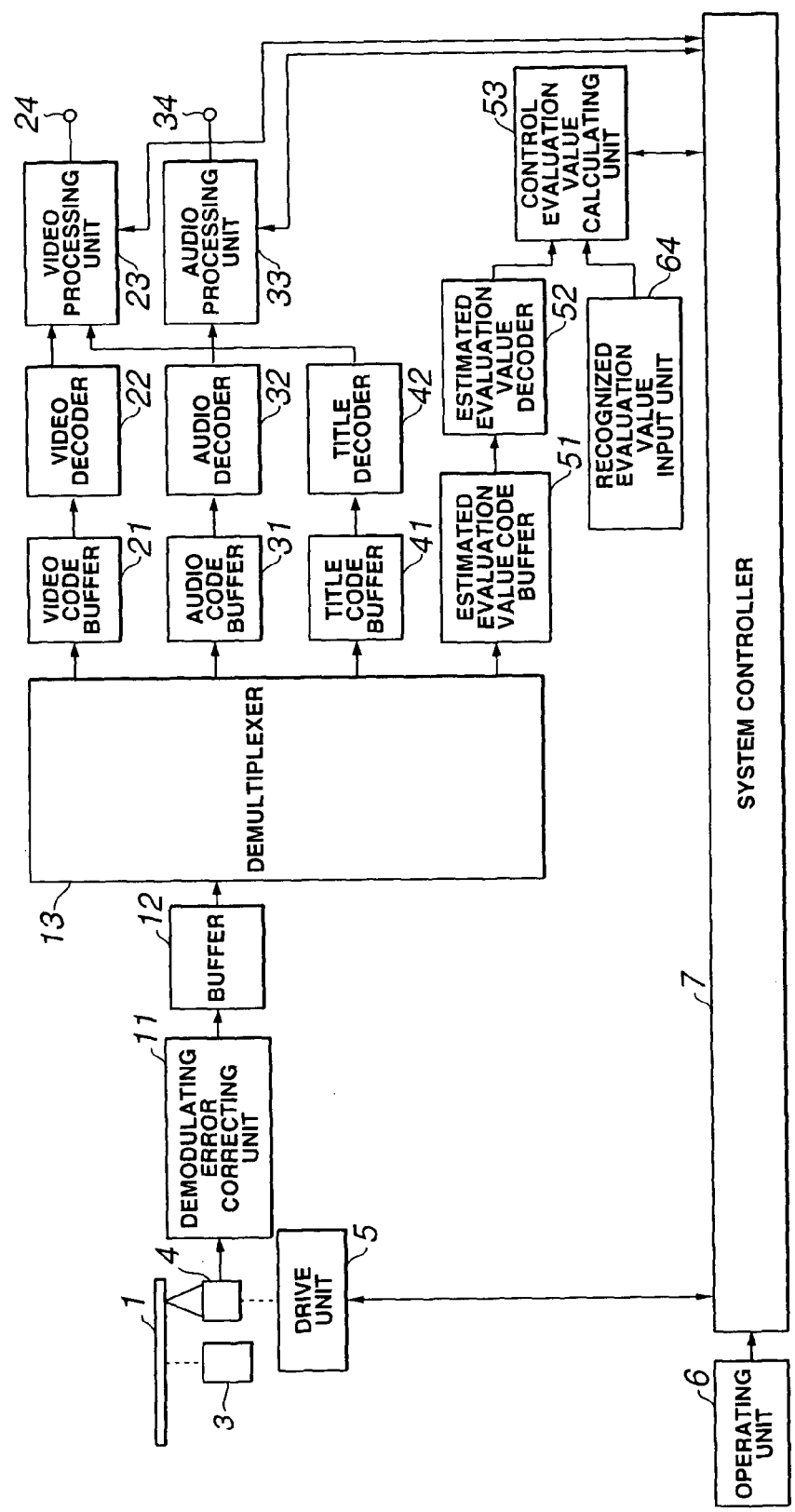
FIG. 2 is a block diagram showing another embodiment of a content reproducing apparatus according to the present invention.

FIG. 2 shows an embodiment of such a case. In this embodiment, an recognized estimation value inputting unit 64 is provided in place of the reaction value inputting unit 61, the reaction value analysis unit 62 and the recognition evaluation value calculating unit 63 of the embodiment of FIG. 1.

The recognized estimation value inputting unit 64 is designed to permit the viewer to input the recognized evaluation values for respective items with numerical figures, such as [−2] for the degree of interest or [+3] for the degree of preference. Alternatively, the recognized estimation value inputting unit 64 is designed so that levers are provided for respective items of the recognized evaluation values so as to be slid by the viewer in the plus direction or in the minus direction.

Still alternatively, the recognized estimation value inputting unit 64 may be comprised of a microphone and a signal processor having the speech recognizing function, so that the viewer is able to orally input the recognized evaluation values of the respective items, such as by uttering 'not at all interested' or 'truly desirable'.

With this embodiment, it is similarly possible for the content supplier to give the viewer the impression, or to acquire the evaluation from the viewer, as the content supplier expected from the viewer, while it is also possible for the content supplier to estimate the matter in which the viewer is presumably interested to change the reproduction characteristics of the content and the story development in a line which will be in keeping with the estimated interest on the part of the viewer.

In the embodiments of FIGS. 1 and 2, the content and the estimated evaluation values have already been recorded on the optical disc 1. Alternatively, the estimated evaluation values may be received from the source of transmission in separation from the content.

Figure 3:
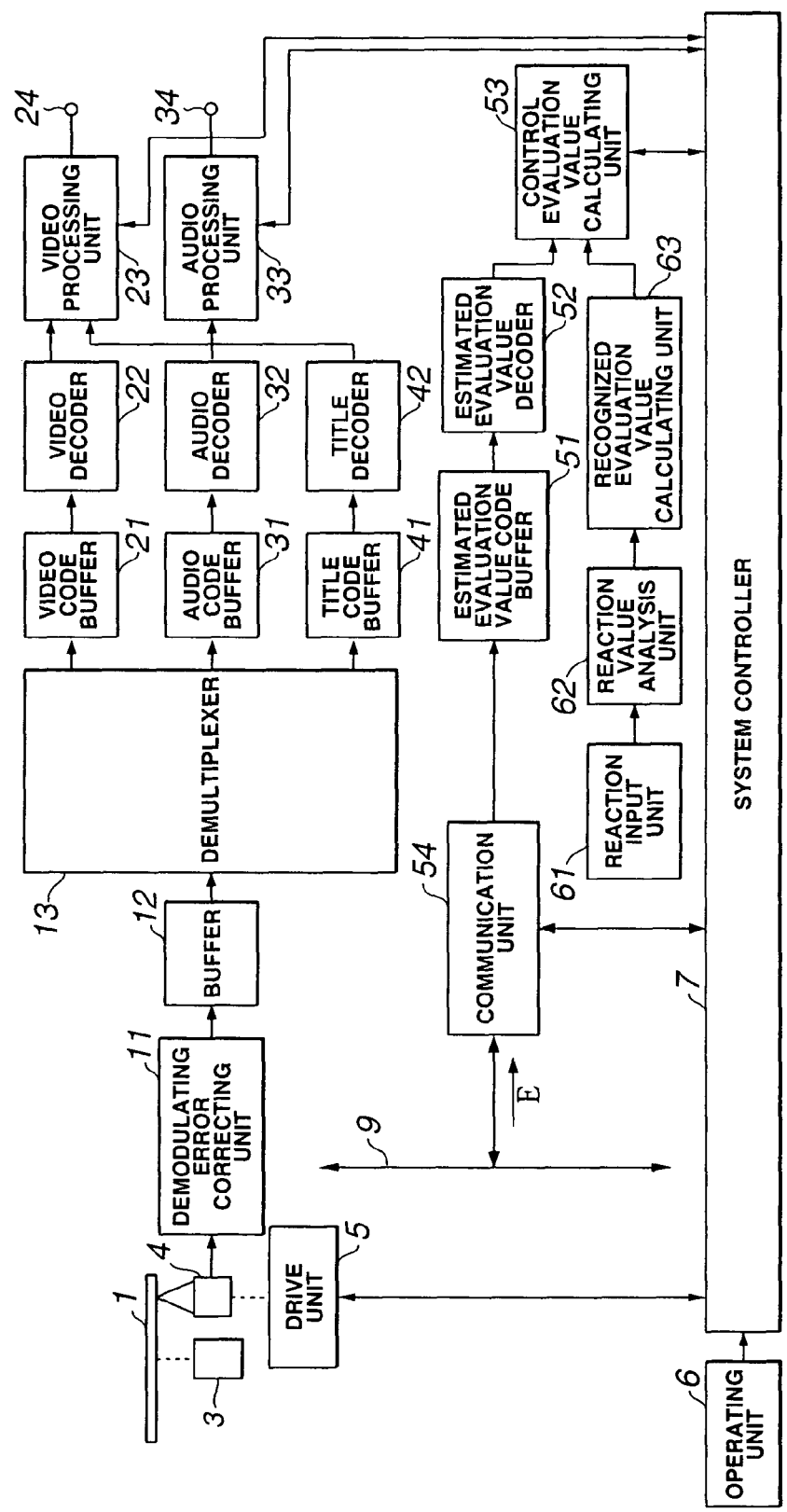
FIG. 3 is a block diagram showing a further embodiment of a content reproducing apparatus according to the present invention.

FIG. 3 shows an embodiment in such case. The optical disc 1 is the same as that shown in FIGS. 1 and 2 except that estimated evaluation values have not been recorded on the disc.

However, for collating whether or not the estimated evaluation values received from the source of transmission are paired to the content recorded on the optical disc 1, the content identification information has been recorded from the outset on the optical disc 1 and, at a time point the content reproduction commences, the content identification information is read out from the optical disc 1 so as to be taken into the system controller 7.

The optical disc reproducing apparatus is provided with a communication unit 54, connected to a communication network 9, such as the Internet. On receipt of the content identification information, the system controller 7 commands the communication unit 54 to send to the source of transmission a signal requesting the estimated evaluation value data corresponding to the content identification information.

On receipt of this command, the communication unit 54 secures the communication network between it and the source of transmission to request the source of transmission to transmit estimated evaluation value data E corresponding to the content identification information. If the communication network cannot be procured, the communication unit 54 notifies the system controller 7 of an error. If, as a result of the communication with the source of transmission, it has become clear that the source of transmission cannot transmit estimated evaluation value data as specified, the communication unit 54 notifies the system controller 7 of an error.

The estimated evaluation value data E, transmitted from the source of transmission and received by the communication unit 54, is written in and subsequently read out from the estimated evaluation value code buffer 51. The data read out from the estimated evaluation value code buffer 51 is decoded by the estimated evaluation value decoder 52.

The measurement of the reaction value by the reaction value inputting unit 61, the calculations of the reaction values in the reaction value analysis unit 62, the calculations of the recognized evaluation values in the recognition evaluation value calculating unit 63, calculations of the control evaluation values in the control evaluation value calculating unit 53 and content presentation control based on the control evaluation values (control of reproduction characteristics of the content and change of story development), are the same as those in the embodiment shown in FIG. 1.

Meanwhile, if the estimated evaluation values, once received, are stored, it is unnecessary to receive the estimated evaluation value data again when next the same content is reproduced. Thus, the reproducing apparatus may be constructed so that the system controller 7 will cause the received estimated evaluation value data to be stored in a storage unit in the reproducing apparatus, or in an external storage device loaded on or connected to the reproducing apparatus, in association with the content identification information.

In the present embodiment, the recognized evaluation values for respective items may again be input directly by the viewer.

Figure 4:
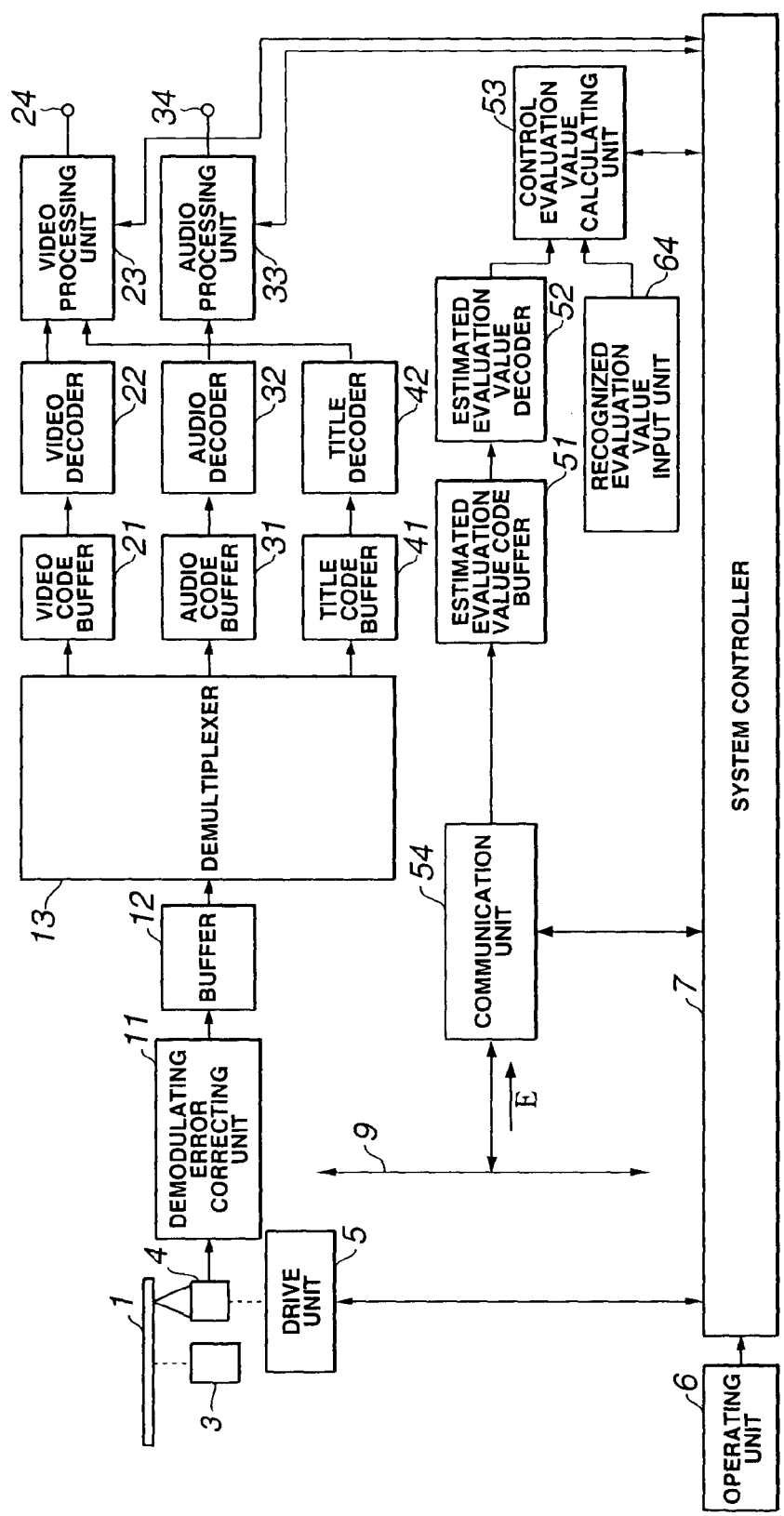
FIG. 4 is a block diagram showing a further embodiment of a content reproducing apparatus according to the present invention.

FIG. 4 shows an embodiment of the present case in which the recognized estimation value inputting unit 64 is provided in place of the reaction value inputting unit 61, reaction value analysis unit 62 and the recognition evaluation value calculating unit 63. The specified structure of the recognized estimation value inputting unit 64 is the same as in FIG. 2.

(Example of Content Receiving Apparatus (Broadcast Receiver): See FIGS. 5 and 6)

The content receiving apparatus of the first embodiment may be configured to receive a digital TV broadcast, such as BS digital broadcast.

In digital TV broadcast, a program ID (identifier) or a program name is broadcast as the content identification information, while the information inserted into a program, a scene or a shot to describe its video or acoustic characteristics, such as so-called meta-data, may also be aired.

Figure 5:
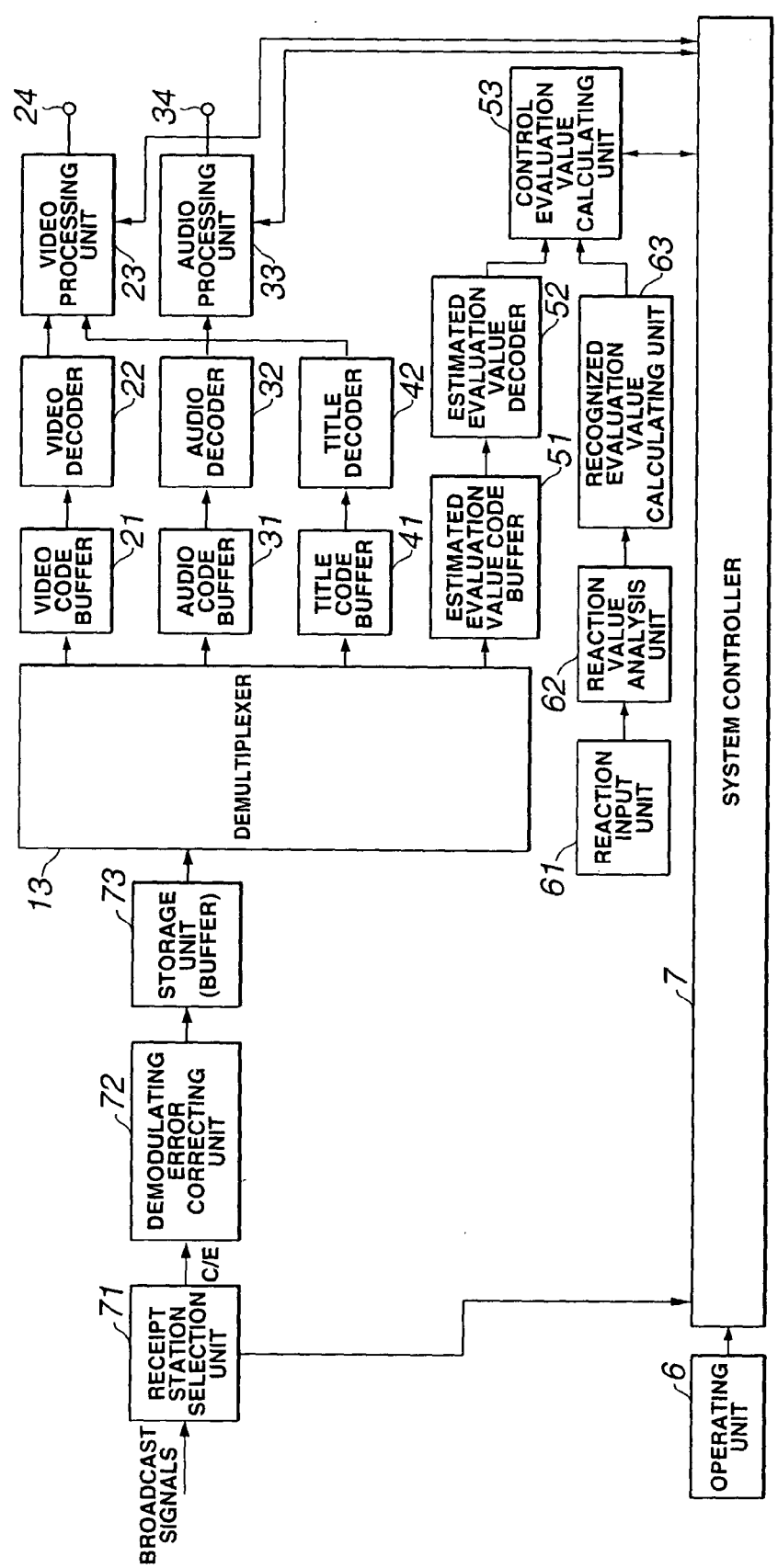
FIG. 5 is a block diagram showing an embodiment of a content receiving device according to the present invention.

FIG. 5 shows an embodiment of a broadcast receiver. In the present embodiment, estimated evaluation value data, multiplexed on the content (video and acoustic data of the program) is aired as digital TV broadcast, while plural scenes or shots, that may be selected by the broadcast receiver, are aired so that the story development can be changed in the broadcast receiver.

In a reception station selecting unit 71, broadcast signals including estimated evaluation value data are received and selected by a tuning operation or a station selection operation in the operating unit 6. A signal C/E, received and tuned, is demodulated and error-corrected by a demodulating error correcting unit 72 and, after error correction, written in a storage unit 73 so as to be read out from the storage unit 73. The storage unit 73, operating as a buffer, is used for selecting scenes or shots for changing the content story development.

The signals read out from the storage unit 73 is sent to a demultiplexer 13 from which the encoded picture data, acoustic data, title data and the estimated evaluation value data are separately produced. The present embodiment is otherwise the same as the optical disc reproducing apparatus shown in FIG. 1.

In the present broadcast reception device, the scenes or shots, read out from the storage unit 73, are selected, under control by the system controller 7, based on the control evaluation values, to change the content story development.

Meanwhile, if the reaction values or recognition evaluation values are to be measured or calculated from one scene or shot of the content (program) to another, the information indicating the scene or shot period or domain may be aired along with the content. Alternatively, the system controller 7 may be configured to detect the scene or shot interval from the features of the reproduced picture or sound.

The broadcast reception apparatus may be configured so that recognized evaluation values of the respective items will be directly input by the viewer.

Figure 6:
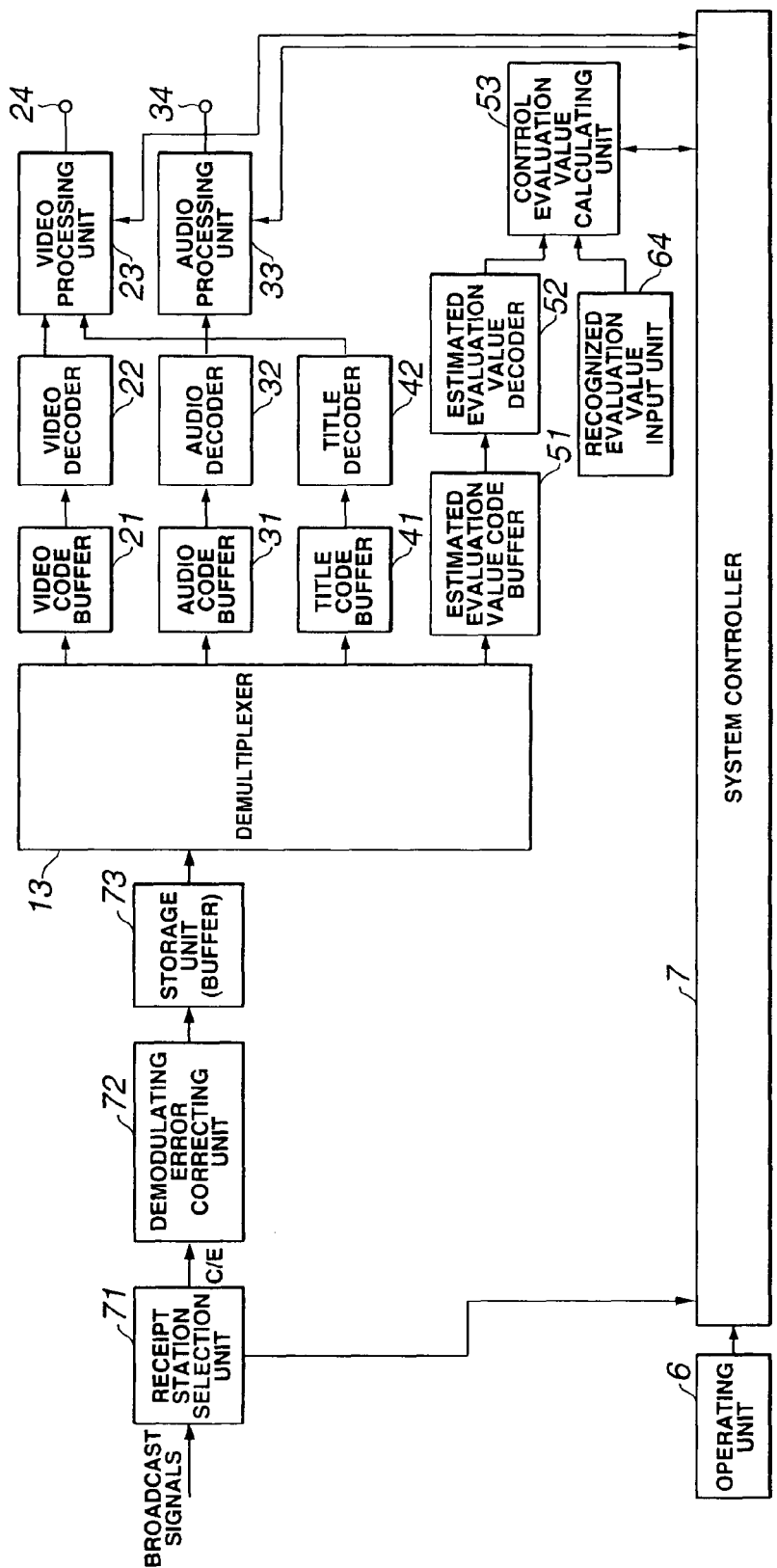
FIG. 6 is a block diagram showing another embodiment of a content receiving device according to the present invention.

FIG. 6 shows an embodiment of the present case wherein a recognized estimation value inputting unit 64 is provided in place of the reaction value inputting unit 61, reaction value analysis unit 62 and the recognition evaluation value calculating unit 63 in the embodiment of FIG. 5. The specified structure of the recognized estimation value inputting unit 64 is the same as the optical disc reproducing apparatus of FIG. 2.

Figure 7:
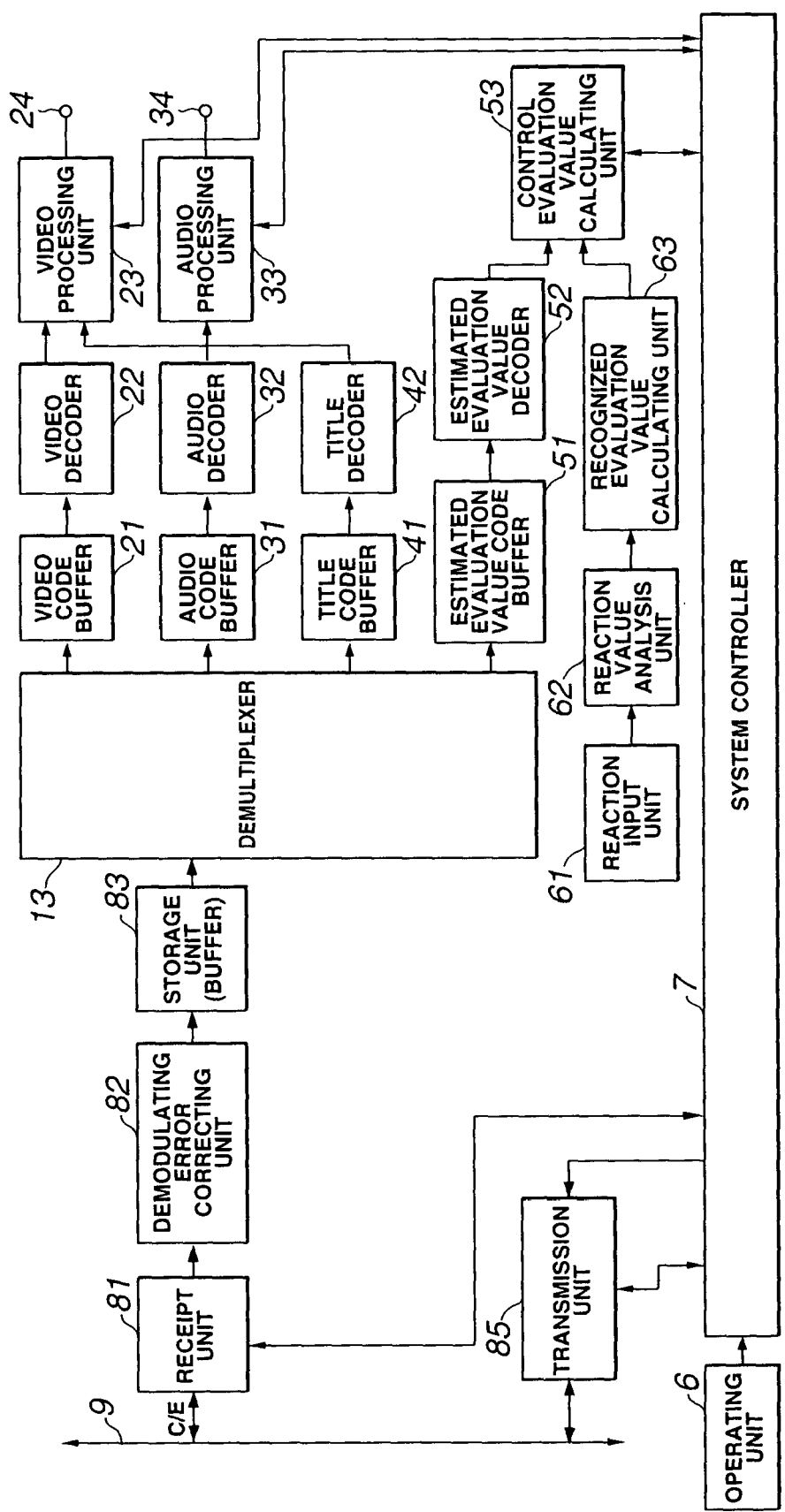
FIG. 7 is a block diagram showing a further embodiment of a content receiving device according to the present invention.
Figure 8:
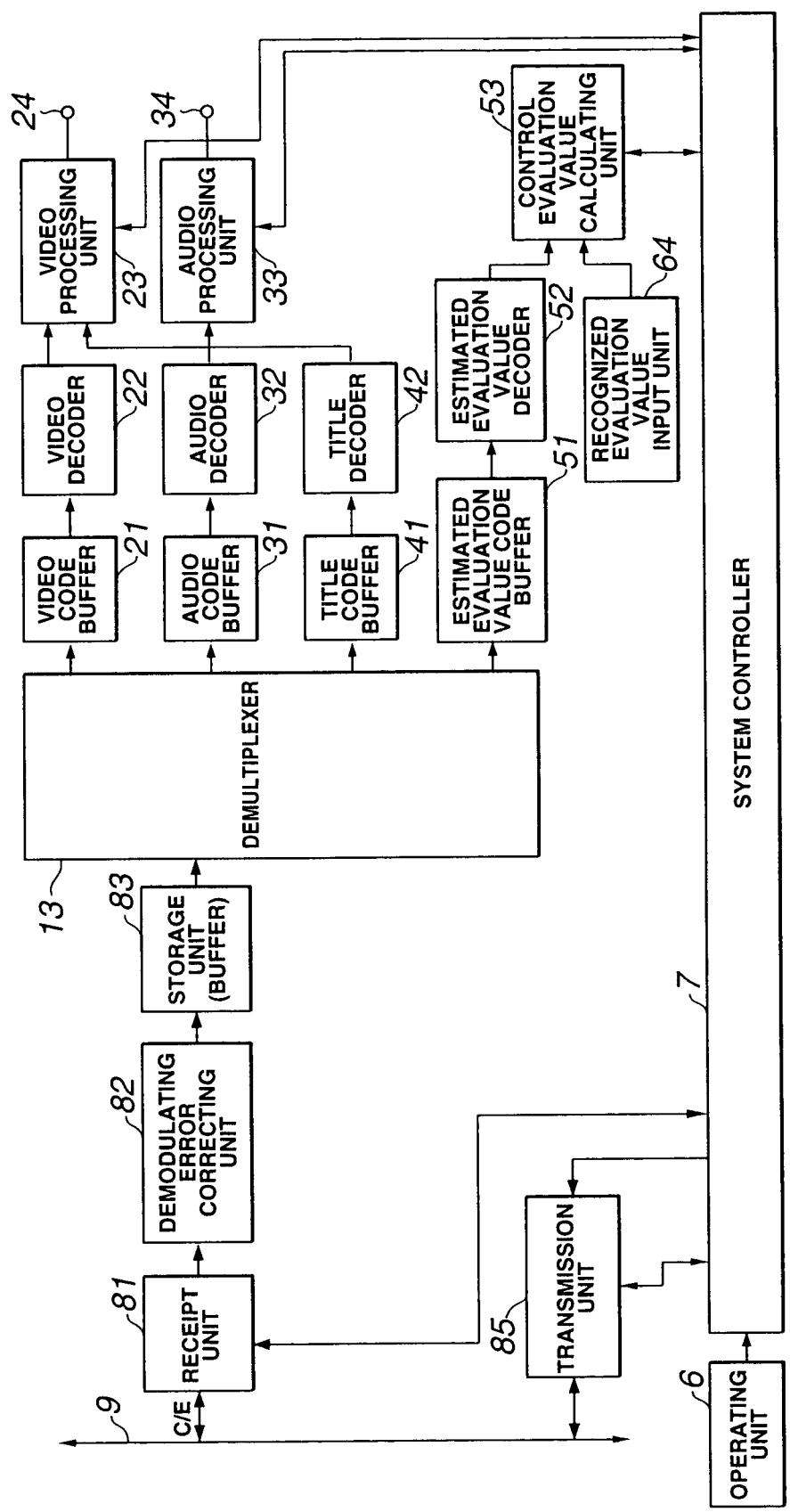
FIG. 8 is a block diagram showing a further embodiment of a content receiving device according to the present invention.

(Other Embodiment of the Content Receiving Apparatus of FIGS. 7 and 8)

As a modification, the first embodiment of the content reception apparatus may also be configured for receiving the estimated evaluation values and the content transmitted from the source of transmission responsive to a content transmission request.

FIG. 7 shows an embodiment of a content reception device of the present embodiment. In this content reception device, the source of transmission is requested by a transmitting unit 85 to transmit the content and the estimated evaluation value data C/E, over the communication network 9, such as the Internet. The content and the estimated evaluation value data C/E are received by a receipt unit 81 from the source of transmission over the communication network 9.

Based on an operation at an operation unit 6, the system controller 7 sends the content identification information to the transmitting unit 85 to command the transmitting unit 85 to send a signal requesting the source of transmission to send the corresponding content and the estimated evaluation value data.

Responsive to this command, the transmitting unit 85 secures a communication network between it and the source of transmission to request the source of transmission the content corresponding to the content identification information and the estimated evaluation value data. If the communication network cannot be secured, the transmitting unit 85 notifies an error to the system controller 7. If, as a result of communication with the source of transmission, the source of transmission is unable to transmit the specified content and the estimated evaluation value data, the transmitting unit 85 still notifies an error to the system controller 7.

The content and the estimated evaluation value data, sent from the source of transmission and received by the receipt unit 81, are demodulated and error-corrected by a demodulating error correction unit 82 so as to be subsequently written in and read out from the storage unit 83.

The source of transmission transmits plural scenes or shots, selectable by the content receiving apparatus, so that the content story development may be changed in the content receiving apparatus. The storage unit 83, operating as a buffer, is used for selecting the scene or shot for changing the content story development.

The signals read out from the storage unit 83 are sent to the demultiplexer 13 from which encoded picture data, acoustic data, title data and estimated evaluation value data are separately produced. The present content receiving apparatus is otherwise the same as the broadcast receipt device shown in FIG. 5.

In this content receiving apparatus, the scenes or shots read out from the storage unit 83 are selected, under control by the system controller 7, based on the control evaluation values, thereby changing the content story development.

If there are a considerable quantity of the information of the content and the estimated evaluation values, the system may be configured for transmitting the content and the estimated evaluation values from the source of transmission, as the viewing progresses, in which case the system is configured so that the interruption and restart of transmission of the content and the estimated evaluation values will be controlled by the time stamp or the address information indicating the progress of the content.

Meanwhile, if once the content and the estimated evaluation value data received are saved, it is unnecessary to receive the same content and the estimated evaluation value data C/E again. Thus, the receipt device may be constructed so that the system controller 7 causes the received content and estimated evaluation value data to be stored as necessary in a storage unit in the receipt device or in an external storage loaded on or connected to the receipt device, in association with the content identification information.

The content receipt device in this case may also be constructed for the viewer to directly input the recognized evaluation values for the respective items.

FIG. 8 shows an instance for such case wherein a recognized estimation value inputting unit 64 is provided in place of the reaction value inputting unit 61, reaction value analysis unit 62 and the recognition evaluation value calculating unit 63 in the embodiment of FIG. 7. The specified structure of the recognized estimation value inputting unit 64 is the same as the optical disc reproducing apparatus of FIG. 2.

(Other Embodiment of the Content Presentation Control)

The above-described aspect of the invention pertinent to the content presentation control may be applied to a device for reproducing the content from a recording medium other than an optical disc, to a case wherein the content is made up only by the picture information, or to a case wherein the content is made up only by the audio information.

[Embodiment of Content Analysis, Collection and Analysis; See FIGS. 10 to 19]

As a second embodiment, such a case wherein the viewer's evaluation of the content reproduced or received is collected and analyzed is now explained.

Figure 10:
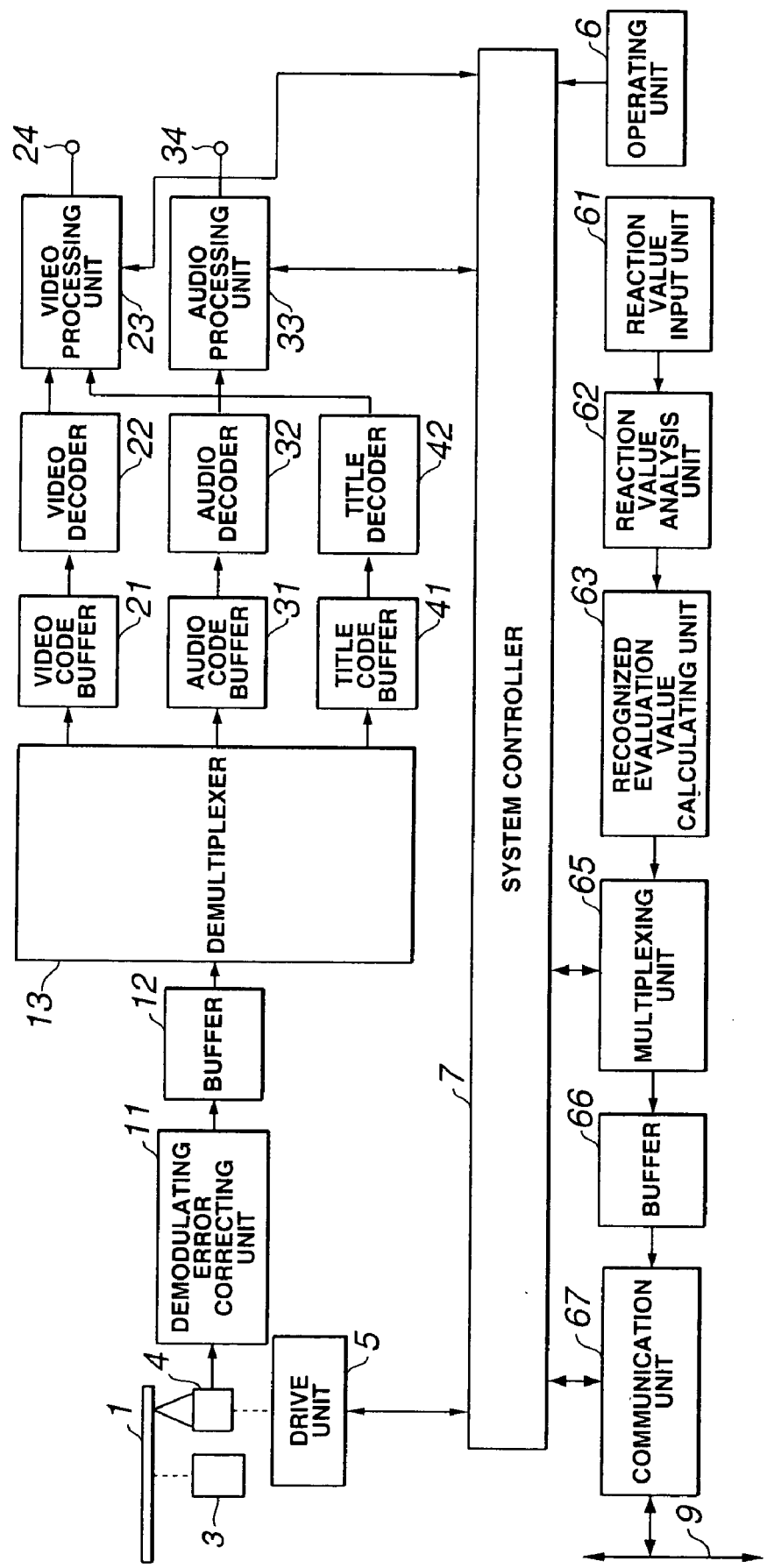
FIG. 10 is a block diagram showing a further embodiment of a content reproducing apparatus according to the present invention.
Figure 11:
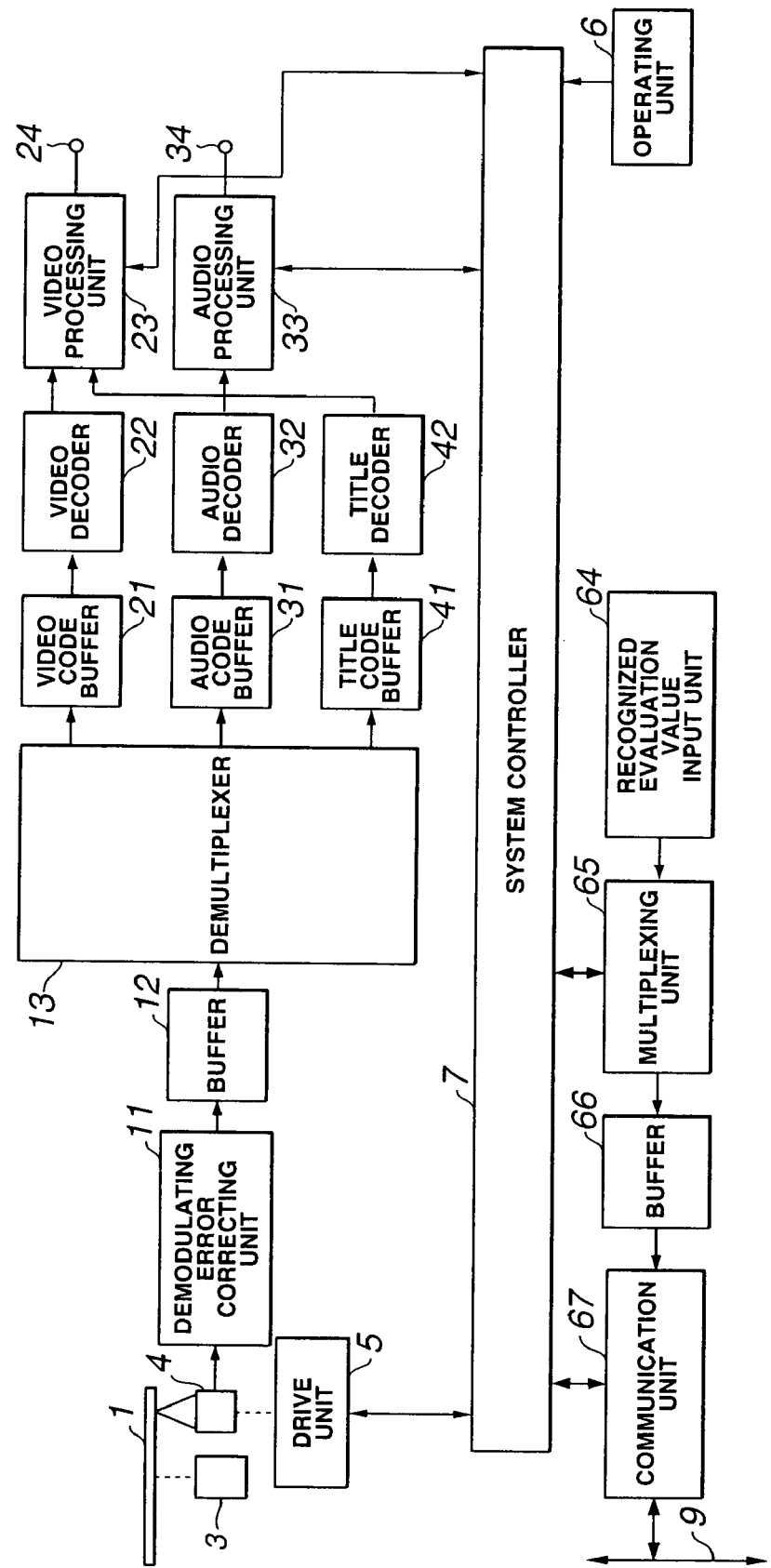
FIG. 11 is a block diagram showing a further embodiment of a content reproducing apparatus according to the present invention.

[An Instance of a Content Reproducing Device; see FIGS. 10 and 11]

FIG. 10 shows an instance of an optical disc reproducing device as the second embodiment of the content reproducing apparatus of the present invention.

On the optical disc 1 are recorded contents which are the picture information, such as the motion picture, and the acoustic information. Specifically, the picture and acoustic data are compression-encoded in accordance with the MPEG system and multiplexed so as to be recorded on the optical disc.

On the optical disc 1, there are also recorded the decoding time information, such as decode time stamp, and the content presentation time information, such as content presentation time information (reproducing time information).

<Epitome of Reproducing Device>

An optical disc 1 is driven by a disc motor 3. An optical head (pickup) 4 is driven by a driving unit 5 including a feed motor and a tracking/focussing actuator.

When the viewer acts on an operating unit 6 for reproduction, a system controller 7 commands reproducing the optical disc 1 to cause the signals to be read out by the optical head 4. The signals so read out are demodulated and corrected for errors by a demodulation error correction unit 11 so as to be then written in and read out from a buffer 12.

The signals read out from the buffer 12 are sent to a demultiplexer 13 from which encoded picture data, acoustic data, title data and the estimated evaluation value data are separately acquired.

The encoded picture data, acoustic data and the title are written in a video code buffer 21, an audio code buffer 31 and a title code buffer 41, read out from the video code buffer 21, audio code buffer 31 and the title code buffer 41 and subsequently decoded in a video decoder 22, an audio decoder 32 and in a title decoder 42.

Based on the timing information, such as the aforementioned decoding time stamp, the system controller 7 controls the decoding timing in the respective decoders 22, 32, 42 and controls the output timing in the respective decoders 22, 32, 42 for coordinating the temporal sequence data from the respective decoders 22,32,42 based on the timing information such as the aforementioned presentation time stamp.

The picture data from the video decoder 22 and the title data from the title decoder 42 are sent to a video processor 23 where the title signals are superimposed in the picture signals.

The picture signals at an output of the video processor 23 are output to a video output terminal 24 from which the picture signals are sent to a picture display device, such as a CRT display or a liquid crystal video projector.

The picture signals are sent to a picture display apparatus, having the D/A (digital to analog) converter, as the picture signals remain to be digital picture data, that is without being converted by the video processor 23 into analog picture signals. Alternatively, the picture signals are converted by the video processor 23 into analog picture signals, which are sent out to the picture display apparatus.

The acoustic data from the audio decoder 32 processed by an audio processor 33 and output acoustic signals of the audio processor 33 are output to an audio output terminal 34 so as to be output from the audio output terminal 34 to an audio output device, such as a loudspeaker or to a headphone.

The acoustic signals are sent to an audio display apparatus, having a D/A (digital to analog) converter, as the acoustic signals remain to be digital audio data, that is without being converted by the audio processor 33 into the analog picture signals. Alternatively, the acoustic signals are converted by the audio processor 33 into analog acoustic signals, which are sent out to the audio outputting device.

When the contents are reproduced from the optical disc 1, the reaction of the viewer, who listened to the sound output from the audio outputting device and viewed the picture displayed by the picture display apparatus, is input from a reaction value inputting unit 61 as a reaction value. At the same time as the content from the optical disc 1 is reproduced, the system controller 7 measures the reaction of the viewer by the reaction value inputting unit 61.

The reaction value, input from the reaction value inputting unit 61, is analyzed by the reaction value analysis unit 62 where another reaction value is calculated. From the reaction value input from the reaction value inputting unit 61 and from the reaction value calculated by the reaction value analysis unit 62, the recognition evaluation values indicating the impression or evaluation by the viewer of the content reproduced from the optical disc 1 are calculated by a recognition evaluation value calculating unit 63.

The so calculated information on the recognized evaluation values is correlated with the content presentation time information, and is multiplexed in a multiplexing unit 65 with the content identification information, transmission source identification information and with the audience information from the system controller 7, as later explained. The so multiplexed data is written in a buffer 66. The multiplexed data then is read out from the buffer 66 and transmitted by a communication device 67 to a collection center over a communication network 9, such as Internet.

Although the reaction value inputting unit 61, reaction value analysis unit 62, recognition evaluation value calculating unit 63, multiplexing unit 65 and the system controller 7 are shown as functionally separate units in FIG. 10, the signal processing by the reaction value inputting unit 61 or the functions of the reaction value analysis unit 62, recognition evaluation value calculating unit 63 and the multiplexing unit 65 may be included in the functions proper to the system controller 7.

<Measurement of the Reaction Values and Calculations of the Recognized Evaluation Values>

The reaction value inputting unit 61 is made up by various sensors and signal processing units. The reaction values are obtained by the signal processing unit executing calculation processing, such as differentiation, integration or correlation processing, on the measured data as output from the respective sensors.

It is however possible for the reaction value inputting unit 61 to be provided with only a sensor portion and an interfacing portion, such that a sensor output is processed by the system controller 7 to calculate the reaction values.

The sensors for measuring the reaction of the viewer are mounted on the seat surface, backrest or on the armrest of a seat in which the viewer sits, an ear pad or a head band of a head set worn by the viewer or on a remote commander operated by the viewer.

The reaction values are classified into data measured as a reaction of the viewer and data obtained on analysis of measured data from the reaction value inputting unit 61 by the reaction value analysis unit 62.

Specifically, the measurement items as the viewer's reaction may be exemplified by a cardiogram, respiration rate, respiration period, an electromyogram, cerebral blood flow, brain wave, amount of respiration, skin temperature, pupil diameter, eye opening degree, eye blink, facial expressions, blood flow of limb, blood flow in an earlobe and limb temperature.

In an audience participation type drama, such as a motion picture, a game or a broadcast receiving apparatus as later explained, the values obtained by the observation of the active behavior of the viewer, such as, for example, the pitch or frequency of the speech uttered by the viewer, its variations, smoothness of motion of an operating lever or the magnitude of force with which the operating lever is moved, may be used.

The data obtained by the reaction value analysis unit 62 by analyzing these measured data may be exemplified by data indicating the time interval during which there is no blink, as calculated by analyzing the data indicating the time points of blink, and data indicating the time period of laughter, as calculated from fluctuations in the eye opening degree and time variations in the blinkless period, or mouth expressions.

Additionally, the reaction value analysis unit 62 is able to calculate data indicating the domain or period of surprise from the eye opening degree, changes in the pupil diameter or the electromyogram (indicating the tension of limb muscle). Moreover, the reaction value analysis unit 62 is able to calculate data indicating the time period of tension from the amount of sweat, heart rate, its rise rate, changes in the pupil diameter, changes in the limb blood flow and changes in the limb temperature.

As a method for calculating the new reaction value from the plural measured data, such a method which resides in calculating a linear combination of respective measured data may be used.

In the recognition evaluation value calculating unit 63, the impression or evaluation of the contents by the viewer is calculated as a recognition evaluation values from the reaction values input from the reaction value inputting unit 61 and from the reaction value calculated in the reaction value analysis unit 62.

As specified recognition evaluation values, the evaluation values indicating the degree of the viewer's interest, the evaluation values indicating the strength of the impression, the evaluation values indicating the preference or the evaluation values indicating the degree of fear, are calculated.

The recognition evaluation values, indicating the degree of the viewer's interest, are calculated as a function of the eye opening degree, blink rate or the heart rate. The recognition evaluation values indicating the strength of impression are calculated from the eye opening degree, heart rate and the amount of sweat. The recognition evaluation values indicating the preference are calculated from the stableness of heart rate or the amount of sweat, limb temperature or limb blood flow. The recognition evaluation values indicating the fear is calculated from the degree of surprise or the degree of tension.

Meanwhile, the recognition evaluation values are defined and calculated here taking the meaning of recognition into account and are not necessarily independent of one another.

The recognition evaluation values may also be represented as multi-dimensional data, in which case an identifier indicating the meaning of each dimension is appended for use as recognition evaluation value data.

Although the reaction values or the recognized evaluation values may be measured or calculated incessantly, these may also be measured every content partition, for example, every reproduced content scene or shot. In this case, the information indicating the domain of scenes or shots may be recorded along with the content on the optical disc 1. Alternatively, the domain of scenes or shots may also be detected by the system controller 7 from the features of the reproduced pictures or sounds.

<Data Transmission>

The recognized evaluation values calculated in the recognition evaluation value calculating unit 63 are correlated with the content presentation time information, such that, when these values are received by the collection center, as later explained, it may be known to which portion of the content is relevant a particular recognized estimation value.

The content identification information specifies the content. This content identification information is not necessarily the information annexed to the content itself, such that, if only one content, for example, has been recorded on the optical disc 1 and also the disc identification information (information identifying the disc) is also recorded thereon, the disc identification information may be the content identification information. If only one content has been recorded on the optical disc 1 while no disc identification information is recorded thereon, the disc header information, such as the number of chapters in the disc and the play time, may be combined in accordance with a preset rule to form the disc identification information which then may be used as the content identification information.

The information for identifying the transmission source is the information specifying the terminal device, herein the optical disc reproducing device, as the content reproducing device, or the information specifying the audience.

The information specifying the terminal device is pre-set in the system controller 7 by for example the producer of the terminal device. The information specifying the audience is pre-set in the system controller 7 by an inputting operation at the operating unit 6, or by mounting an external storage device, such as a memory card, having this information recorded thereon, to a terminal device.

The audience information is specifically the information specifying the viewers' attributes, such as age, sex, living territory or taste, or the hysteresis of the content viewed by the audience in the past. The audience information is set in the system controller 7 by the inputting operation at the operating unit 6 at the outset or by mounting the external storage medium, such as a memory card, having the audience information recorded thereon, to the terminal device.

The audience information does not necessarily have to be transmitted. If this information is transmitted, it is possible to execute analysis at the collection center by taking the viewer's attributes into consideration, for example, by checking how the viewer's evaluation for the same content varies from one viewer's attribute to another, as will be explained subsequently.

The recognized estimation value information, having the content presentation time information, content identification information, transmission source identification information and the audience information, appended thereto, is multiplexed in the multiplexing unit 65, with the recognized estimation value information, having the content presentation time information appended thereto as a data fraction, and with the transmission source identification information and the audience information as a header fraction, and is transmitted by the communication unit 67 to the collection center.

The recognized estimation value information is transmitted every preset time, such as every five seconds or every 30 minutes, or is transmitted collectively when reproduction of the totality of the contents has come to a close. In any case, the above information is transiently recorded in a buffer 66 and subsequently transmitted by the communication unit 67 to the collection center.

It may be contemplated for the audience to view a content of long duration, such as a motion picture, in plural installments each time. The optical disc reproducing apparatus is arranged so that, if the reproduction of the content is halted transiently en route, the system controller 7 holds the information specifying the paused position, or holds the recognized evaluation values or content presentation time information at such position, for content reproduction and for data transmission for the next time for the same content.

<The Case of Directly Inputting the Recognized Evaluation Value: See FIG. 11>

In the embodiment of FIG. 10, the recognized evaluation values are calculated in the recognition evaluation value calculating unit 63 from the reaction values from the reaction value inputting unit 61. Alternatively, the recognized evaluation values for the respective items may be directly input by the viewer.

FIG. 11 shows an embodiment of such a case. In this embodiment, an recognized estimation value inputting unit 64 is provided in place of the reaction value inputting unit 61, the reaction value analysis unit 62 and the recognition evaluation value calculating unit 63 of the embodiment of FIG. 10.

The recognized estimation value inputting unit 64 is designed to permit the viewer to input the recognized evaluation values for respective items with numerical figures, such as [−2] for the degree of interest or [+3] for the degree of preference. Alternatively, the recognized estimation value inputting unit 64 may be provided with plural levers for respective items of the recognized evaluation values, these levers being slid by the viewer in the plus direction or in the minus direction.

Still alternatively, the recognized estimation value inputting unit 64 may be comprised of a microphone and a signal processor having the speech recognizing function, so that the viewer is able to orally input the recognized evaluation values of the respective items, such as by uttering 'not at all interested' or 'truly desirable'.

(Further Embodiment of the Content Reproducing Apparatus: See FIG. 12)

Figure 12:
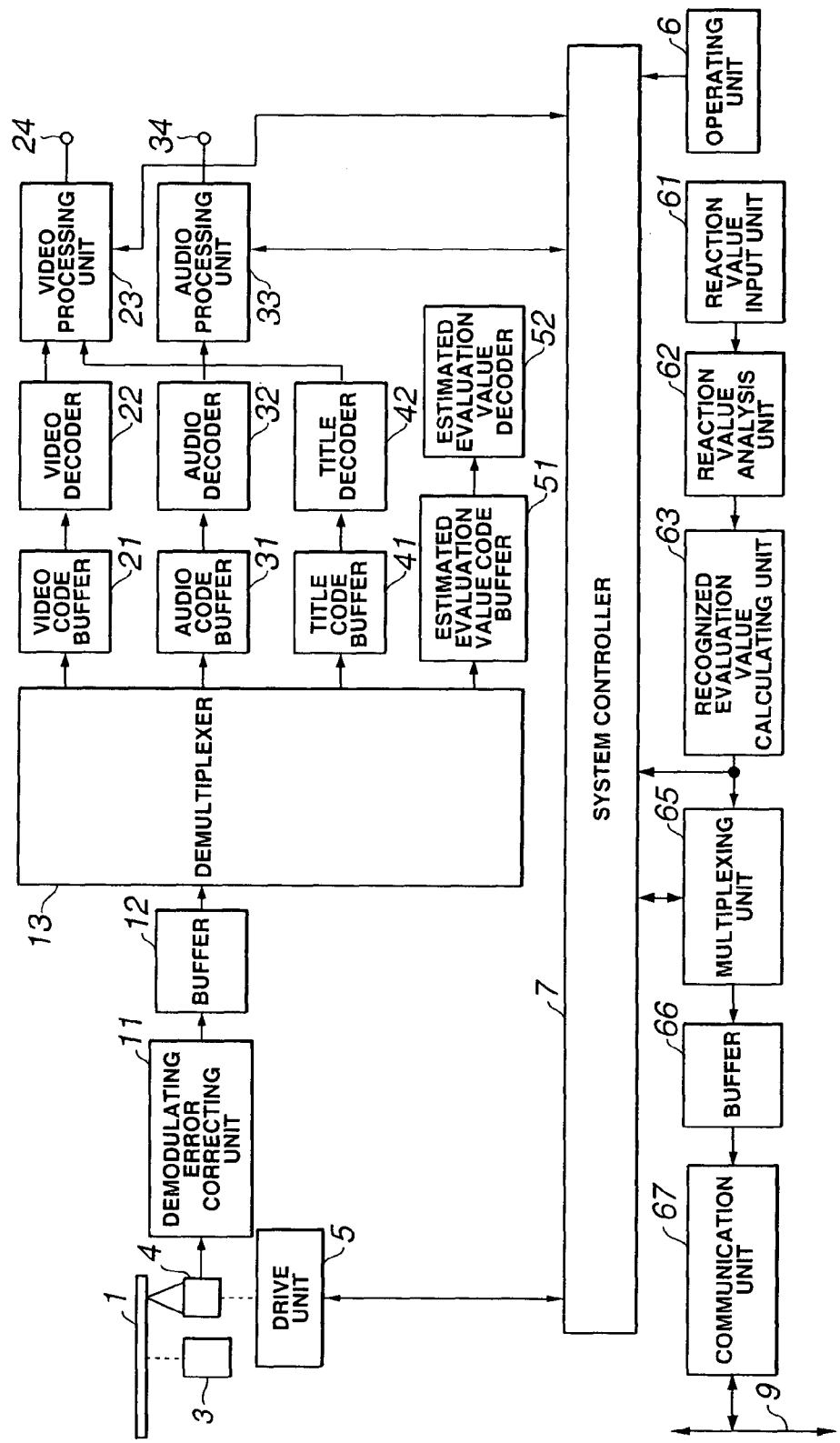
FIG. 12 is a block diagram showing a further embodiment of a content reproducing apparatus according to the present invention.

FIG. 12 shows an optical disc reproducing apparatus as a content reproducing apparatus of a second embodiment of the present invention.

In the present embodiment, estimated evaluation values for the content are recorded, along with the content, on the optical disc 1. The estimated evaluation values are estimated impressions of the viewer on viewing the content, or estimated evaluation of the content by the viewer on viewing the content. The estimated evaluation values have been set by the content supplier (creator) in consideration of the sort or brightness of the presented picture, sort or level (magnitude) of the presented sound or of the story development of the presented content.

The content presented has the properties of a story, in a majority of cases, while the psychological state of the viewer to whom the content has been presented is usually changed with the story development. Thus, it may be presumed that, even if the picture or the sound is the same, the impression or evaluation, such as feeling or interpretation, may be changed from scene to scene. Consequently, the estimated evaluation values are set from one content partition to another, such as from one content scene to another, in consideration not only of characteristics of pictures or sounds (physical properties such as picture brightness or sound level) but also of the properties of the presented content as a story. As a matter of course, the scene or shot, to which the attention of the viewer is desired to be directed, is intentionally adjusted video-acoustically so that the recognition evaluation values indicating the degree of the viewer's interest for the scene or shot will be higher. Thus, the estimated evaluation values of the scene or shot is also set to a higher value.

The psychological state of the audience for the presented content can be understood from the recognized evaluation values calculated from the above-mentioned various reaction values and the temporal process thereof. Also, comparison of the estimated evaluation values preset by the content supplier as described above to the recognized evaluation values calculated from the various reaction values indicates whether or not the psychological state of the viewer is as expected by the content supplier. Moreover, the result of comparison of the estimated evaluation values and the recognized evaluation values may be positively exploited for controlling the content presentation.

FIG. 12 shows an instance for such case. The estimated evaluation value data are encoded and, in the present instance, are multiplexed to picture data and acoustic data, which picture and acoustic data are then recorded. The specified method for time axis management and multiplication of the estimated evaluation values is the same as in the first embodiment pertinent to content presentation control described above.

<Epitome of Reproducing Apparatus>

The estimated evaluation value data are read out from the optical disc at the same time as the content is reproduced from the optical disc 1. The so read out estimated evaluation value data are separated by the demultiplexer 13 and written in a code buffer for the estimated evaluation values 51. The data are then read out from the code buffer for the estimated evaluation values 51 and decoded by a decoder for the estimated evaluation values 52.

As in the embodiment of FIG. 10, the reaction of the audience is measured, at the same time as the content is reproduced, in the reaction value inputting unit 61, as reaction values, while recognized evaluation value, indicating the impression or evaluation of the audience for the reproduced content, are calculated in the recognition evaluation value calculating unit 63.

In the present embodiment, the estimated evaluation values decoded in the decoder for the estimated evaluation values 52 are compared in the system controller 7 to the recognized evaluation values calculated in the recognition evaluation value calculating unit 63, and the results thereof are evaluated.

Similarly to the recognized evaluation value, the estimated evaluation values may be represented as multi-dimensional data. In such case, an identifier indicating the meaning of each dimension is appended to the leading end of the estimated evaluation value data of each dimension. When the estimated evaluation values and the recognized evaluation values are represented as multi-dimensional data, comparison of the estimated evaluation values and the recognized evaluation values in the system controller 7 is by for example comparing the direction and the magnitude of the multi-dimensional vectors.

The estimated evaluation values read out from the optical disc 1 are also correlated with the content presentation time information. Thus, the system controller 7 is able to recognize the estimated evaluation values from one scene or shot to another, as 'the estimated evaluation values is 40 in the meaning indicated by the identifier as from the presentation time 01:25:30 until presentation time 01:26:20'.

<Content Presentation Control>

Based on the results of comparison of the estimated evaluation values and the recognized evaluation values, the system controller 7 generates a control signal which controls reproduction characteristics of the content and a control signal which changes the content story development to send the former control signal to the video processor 23 and to the audio processor 33 to control video and audio reproducing characteristics as well as to send the latter control signal to the drive unit 5 to change the replay site or sequence of the optical disc 1.

Specifically, the system controller 7 checks to see whether or not the difference between the estimated evaluation values and the recognized evaluation values at a scene or shot being evaluated is within a preset allowable range, while also verifying the difference between the estimated evaluation values and the recognized evaluation values as well as the change tendency of the recognized evaluation value, as to for example whether the difference between the estimated evaluation values and the recognized evaluation values is becoming larger or smaller than the difference between the estimated evaluation values and the recognized evaluation values for past scenes or shots, as to whether the increasing tendency of the recognized evaluation values or the decreasing tendency of the recognized evaluation values is desirable and as to whether or not the recognized evaluation values assuming a locally maximum value or a locally minimum value is desirable.

For example, if the difference between the estimated evaluation values and the recognized evaluation values is in a tolerable range but is increasing, it is determined that the reaction (evaluation) of the viewer is in a direction different from the expected direction.

Based on such results of check, the system controller 7 controls the reproduction characteristics of the content to change the content story development.

Specifically, if it is determined, from the results of comparison of the estimated evaluation values and the recognized evaluation value, that the viewer is not so affrighted as predicted, the video-acoustic characteristics, such as picture brightness or sound level, for the subsequent scenes or shots, are changed, or the subsequent story development is changed.

On the other hand, if it is determined that the viewer is not so delighted or interested nor so concentrated in the scene as predicted, subsequent story development is changed.

For changing the story development, the story development is made predictable by inserting a scene suggestive of future development or a scene which may be predicted from past scenes. This raises the degree of attention to the story on the part of the audience. Conversely, the story development may be rendered less predictable by changing or deleting the scene(s) suggestive of story development to render the story development less tiresome to the user.

If the story, scene or the shot is changed, reference may be had to the hysteresis of past reaction values or recognized evaluation values of the audience. The hysteresis may be the stored past reaction values or past recognized evaluation values for the content then presented or may be the reaction values or recognized evaluation values for some other content viewed by the audience in the past.

The content reproducing characteristics may be exemplified by luminance, contrast, saturation and color hue (color phase) for the picture and by the frequency response or level for the sound.

The story development is changed by selecting one of plural scenes and presenting the so selected scene, or by substituting new scenes for certain shots making up a scene and presenting the so substituted shots by way of interchanging.

For changing the story development, scenes or shots may be executed from time to time. Alternatively, such interchanging of scenes or shots may be permitted only for predetermined scenes.

An optical disc reproducing apparatus is constructed so that, for controlling the state of the feeling the viewer has for the content, indexes concerning the meaning or the orientation of the recognition and evaluation, such as 'logical process of introduction, development, turn and conclusion', may be affixed beforehand to plural selectable scenes, so as to permit the system controller 7 to select the scene to be presented, based on these indexes and on the results of comparison between the estimated evaluation values and the recognized evaluation values.

The optical disc reproducing apparatus is also constructed so that, as for shot interchanging, indexes are affixed to shots and the scenes to be presented will be selected from the indexes and from the results of comparison between the estimated evaluation values and the recognized evaluation values.

<The Case of Directly Inputting the Recognized Evaluation Value: see FIG. 11>

In the present embodiment, a recognized estimation value inputting unit is provided in place of the reaction value inputting unit 61, reaction value analysis unit 62 and the recognition evaluation value calculating unit 63 in order for the viewer to directly input the recognized evaluation values for respective items.

(Example of a Content Receiving Apparatus (Broadcast Receiver): See FIGS. 13 and 14)

The content receiving apparatus of the second embodiment may be configured to receive a digital TV broadcast, such as BS digital broadcast.

In digital TV broadcast, a program ID (identifier) or a program name is broadcast as the content identification information, while the information inserted into a program, a scene or a shot to describe its video or acoustic characteristics, such as so-called meta-data, may also be aired.

Figure 13:
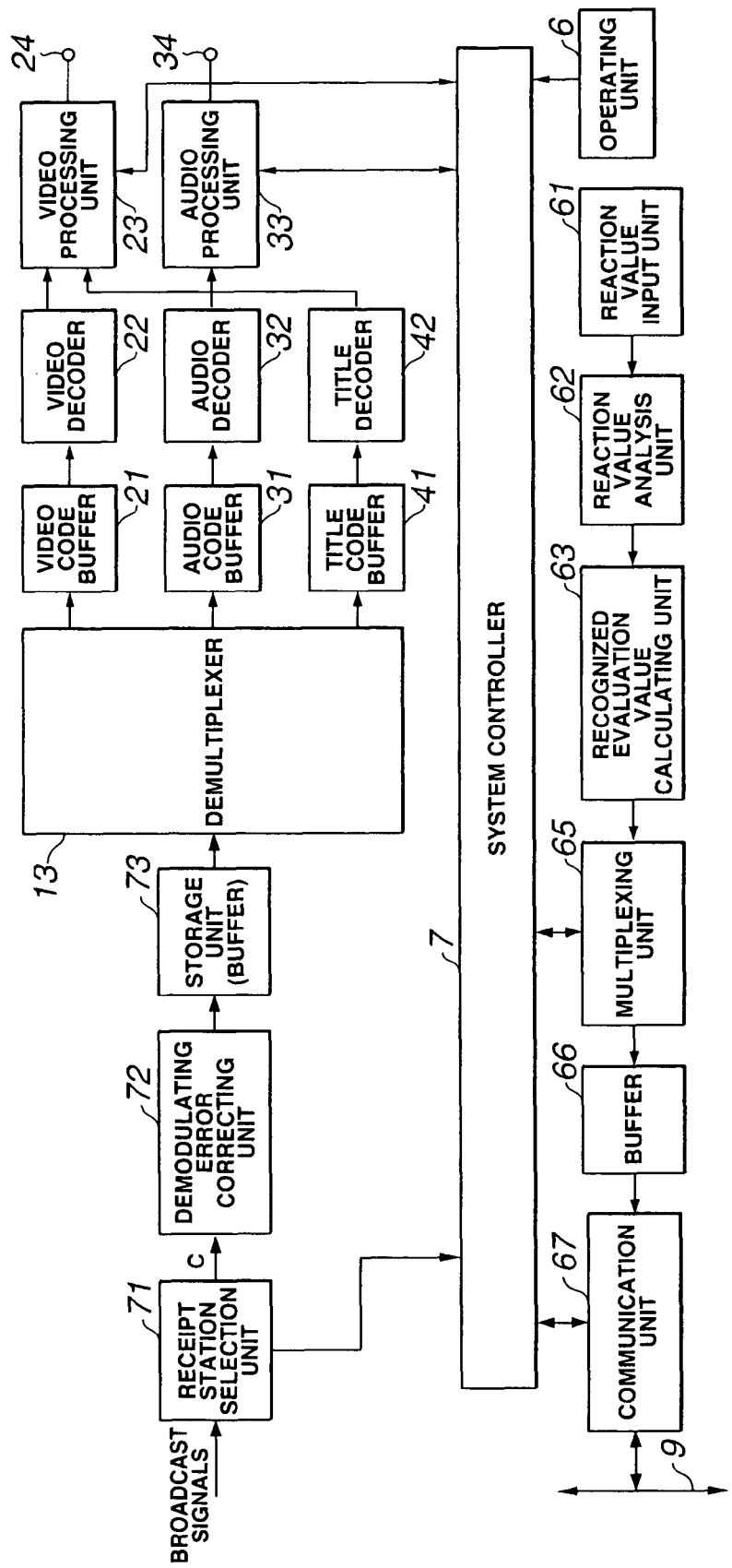
FIG. 13 is a block diagram showing a further embodiment of a content reproducing apparatus according to the present invention.

FIG. 13 shows an embodiment of a broadcast receiver. A reception station selection unit 71 receives and selects the station of aired signals by tuning control or station selection control of the system controller 7 based on tuning or station selection operations at the operating unit 6. The signals so received and tuned are demodulated and corrected for errors by the demodulating error correcting unit 72 so as to be then written in and subsequently read out from the storage unit 73.

The signals read out from the storage unit 73 are sent to the demultiplexer 13 from which encoded versions of the picture data, acoustic data and the title data are separately produced. The broadcast receiver is otherwise the same as the optical disc reproducing apparatus shown in FIG. 10.

Meanwhile, if the reaction values or the recognized evaluation values are measured or calculated from one scene or shot of the content (program) to another, the information indicating the scene or shot partitions may be aired with the content C. Alternatively, the scene or shot partitions may be detected by the system controller 7 from the features of the reproduced picture or sound.

Figure 14:
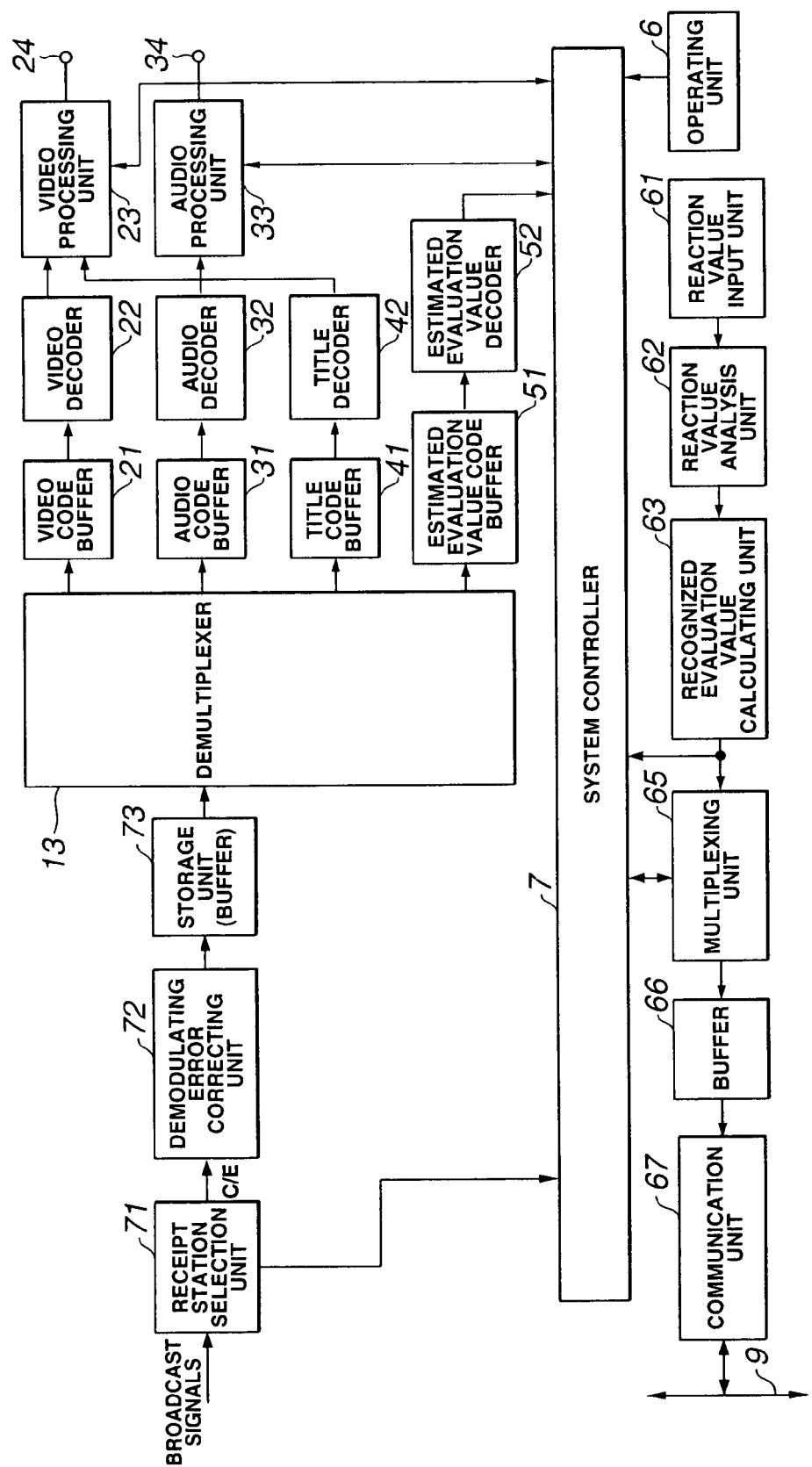
FIG. 14 is a block diagram showing a further embodiment of a content receiving device according to the present invention.

FIG. 14 shows a modification of the broadcast receiver. In the present embodiment, the estimated evaluation value data is aired as it is multiplexed on the content (picture data and acoustic data of the program) as digital TV broadcast. In addition, plural scenes or shots, selectable in the broadcast receiver, are aired so that the content story development can be changed in the broadcast receiver.

In the reception station selection unit 71, broadcast signals including estimated evaluation value data E, are received on tuning. The signals, so received on tuning, are demodulated and corrected for errors by the demodulating error correcting unit 72. The resulting signals are then written in and subsequently read out from the storage unit 73. This storage unit 73, operating as a buffer, selects a scene or a shot for changing the content story development.

The signals read out from the storage unit 73 are sent to the demultiplexer 13 from which encoded versions of the picture data, acoustic data, title data and the estimated evaluation value data are separately produced. The broadcast receiver is otherwise the same as the optical disc reproducing apparatus shown in FIG. 12.

In the present broadcast reception device, scenes or shots read out from the storage unit 73 are selected, under control of the system controller 7, based on the results of comparison of the estimated evaluation values and the recognized evaluation value, to change the content story development.

In the broadcast receiver, shown in FIGS. 13 and 14, a recognized estimation value inputting unit may be provided in place of the reaction value inputting unit 61, reaction value analysis unit 62 and the recognition evaluation value calculating unit 63 in order for an operator to input recognized evaluation values pertinent to respective items.

(Other Embodiment of the Content Receiving Apparatus: See FIGS. 15 and 16)

As a modification, the second embodiment of the content receiving apparatus may also be configured as a device for receiving the content transmitted from the transmission source responsive to the content transmission request.

Figure 15:
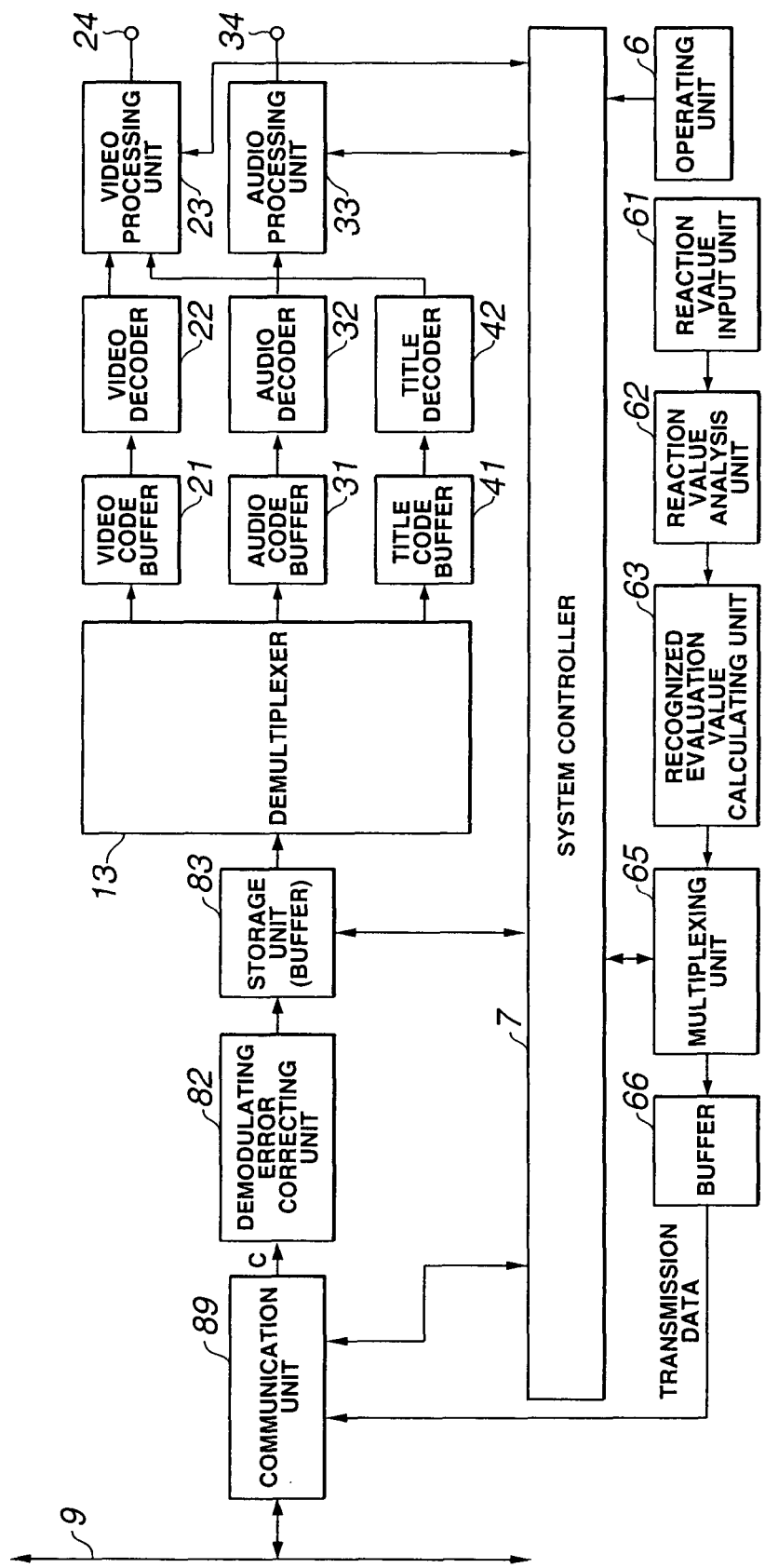
FIG. 15 is a block diagram showing a further embodiment of a content receiving device according to the present invention.

FIG. 15 shows the present modification of the content receiving apparatus. In this content receiving apparatus, the source of transmission is requested by a communication unit 89, having the functions of transmission and receipt, to transmit the content C over the communication network, such as Internet, to the content receiving apparatus. Thus, the content receiving apparatus receives the content from the source of transmission over the communication network 9.

Based on the operation at the operating unit 6, the system controller 7 sends the content identification information to the communication unit 89 and commands the communication unit 89 to send to the source of transmission a signal requesting the corresponding content.

Responsive to this command, the communication unit 89 secures the communication network between it and the source of transmission to request the transmission source the content corresponding to the content identification information. If the communication network has not been secured, an error is noticed to the system controller 7. If, as a result of communication with the transmission source, it has been found that the transmission source cannot send the specified content, the communication unit 89 similarly notifies an error to the system controller 7.

The content C, transmitted from the transmission source and received by the communication unit 89, is demodulated and corrected for errors by demodulating error correcting unit 82 so as to be then written in and read out from a storage unit 83.

The present content receiving apparatus is otherwise the same as the broadcast receiver of FIG. 13, except that, in the present embodiment of FIG. 15, the communication unit 89 also has the function of data transmission of the communication unit 67 of the embodiment of FIGS. 14 to 17.

The system configuration may also be such that, if the content has an abundant information quantity, the content will be transmitted from the transmission source as the content being viewed progresses. In such case, the system configuration may be such that interruption and restart of content transmission will be controlled by the time stamp indicating the progress of the content and by the address information.

Meanwhile, if the reaction values and the recognized evaluation values are measured or calculated from one scene or shot of the content (program) to another, the information indicating the scene or shot partitions may be aired with the content. Alternatively, the scene or shot partitions may be detected by the system controller 7 from the features of the reproduced picture or sound.

Figure 16:
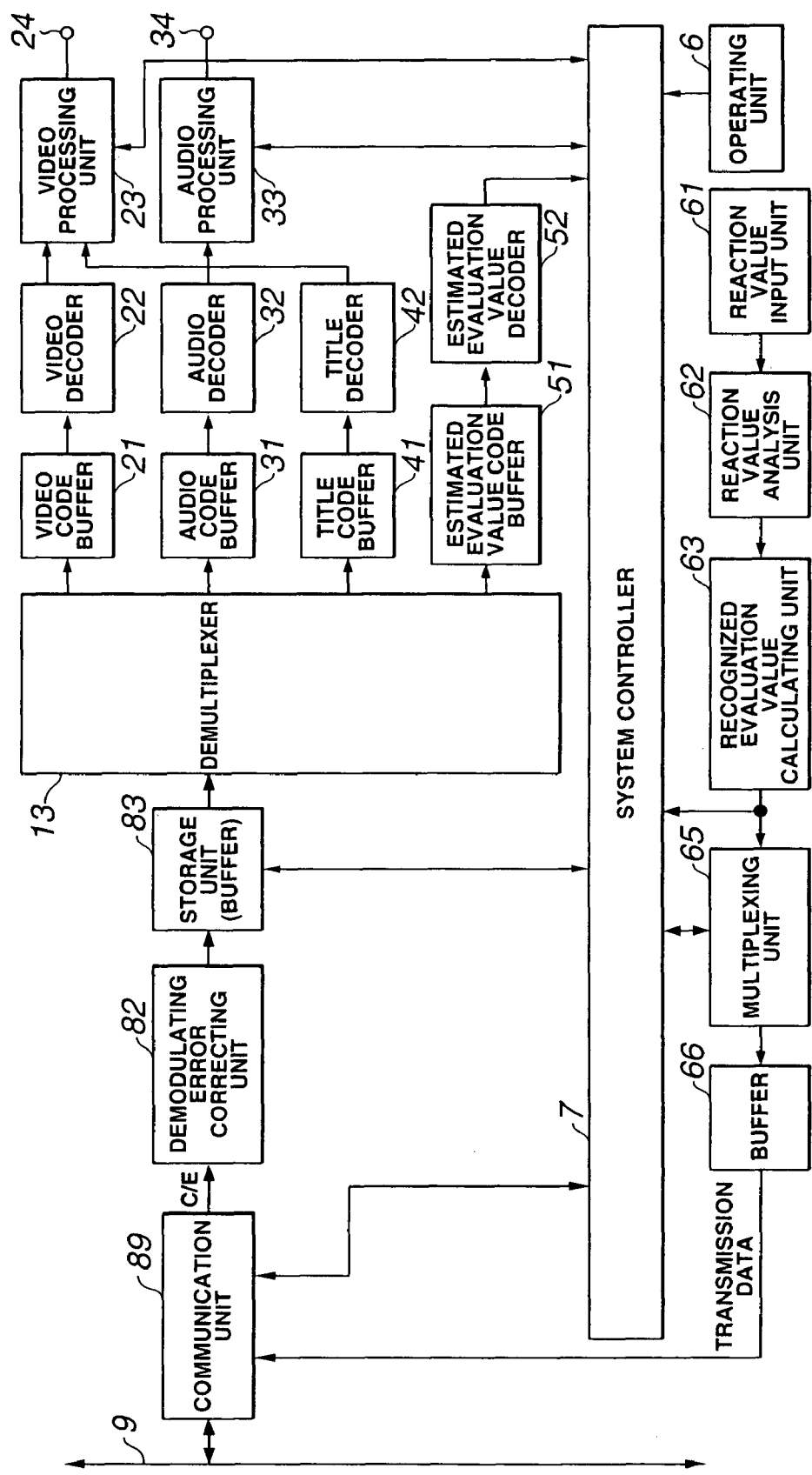
FIG. 16 is a block diagram showing a further embodiment of a content receiving device according to the present invention.

FIG. 16 shows a further embodiment of the so configured content receiving apparatus. In the present embodiment, the above-mentioned estimated evaluation value data E are transmitted from the transmission source, along with the content C, at the same time as plural scenes or shots selectable in the content receiving apparatus are also transmitted so that the content story development can be changed in the content receiving apparatus.

The content and the estimated evaluation value data, transmitted from the transmission source and received by the communication unit 89, are demodulated and corrected for errors by the demodulating error correcting unit 82 so as to be written in and read out from the storage unit 83. The storage unit 83, operating as a buffer, is used for selecting scenes or shots for changing the content story development.

The present content receiving apparatus is otherwise the same as the broadcast receiver of the embodiment of FIG. 14, except that, in the present embodiment of FIG. 16, the communication unit 89 simultaneously includes the data transmitting function of the communication unit 67 of the embodiments of FIGS. 10 to 14.

In the content receiving apparatus of the embodiment of FIG. 15 or 16, a recognized estimation value inputting unit is provided in place of the reaction value inputting unit 61, reaction value analysis unit 62 and the recognition evaluation value calculating unit 63 in order for the viewer to directly input the recognized evaluation values for respective items.

Figure 17:
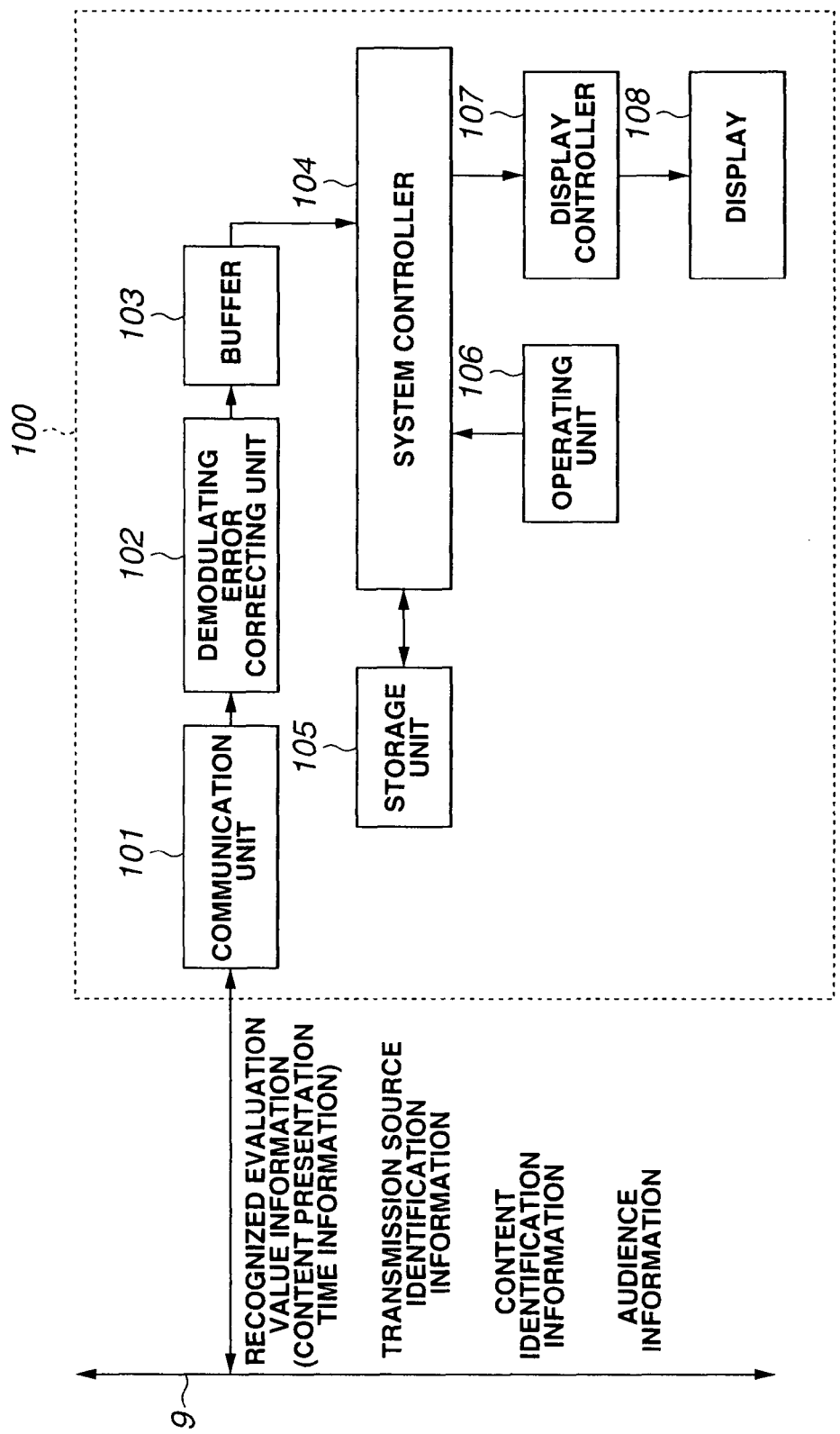
FIG. 17 is a block diagram showing an embodiment of a content evaluation collecting and analyzing apparatus according to the present invention.
Figure 18:
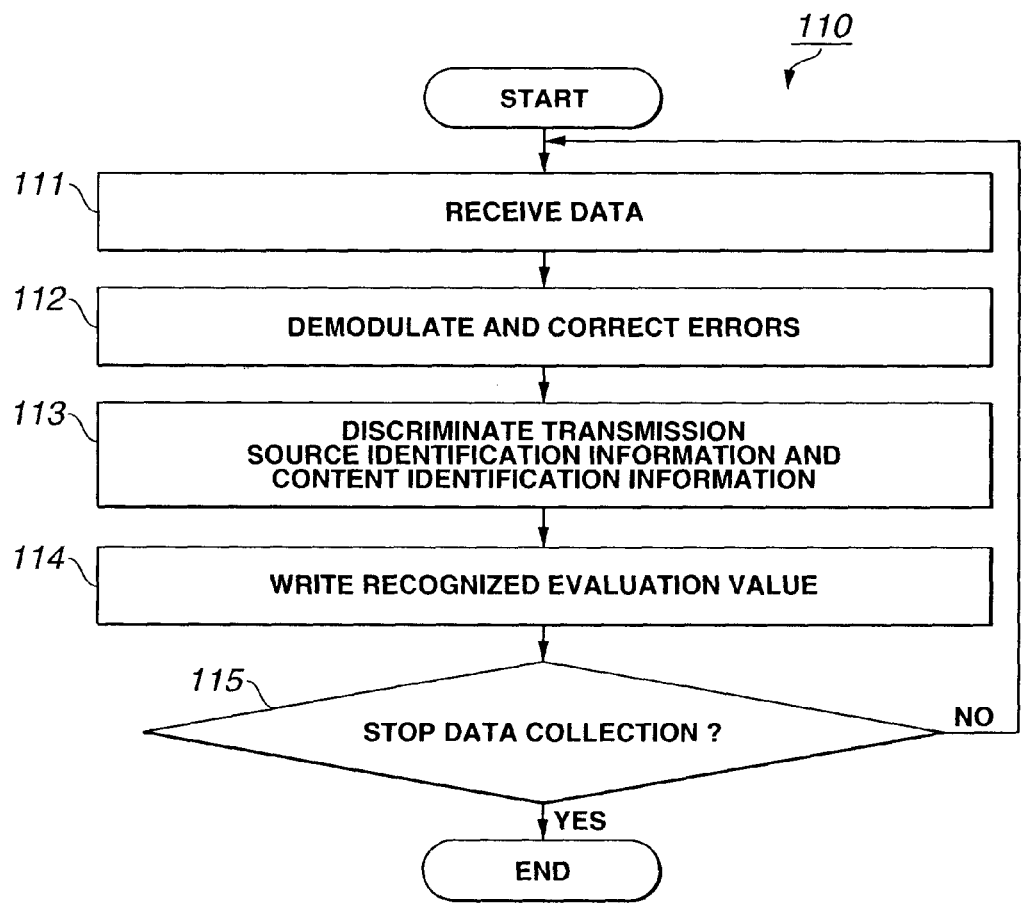
FIG. 18 is a flowchart showing an embodiment of a content evaluation collecting processing sub-routine.
Figure 19:
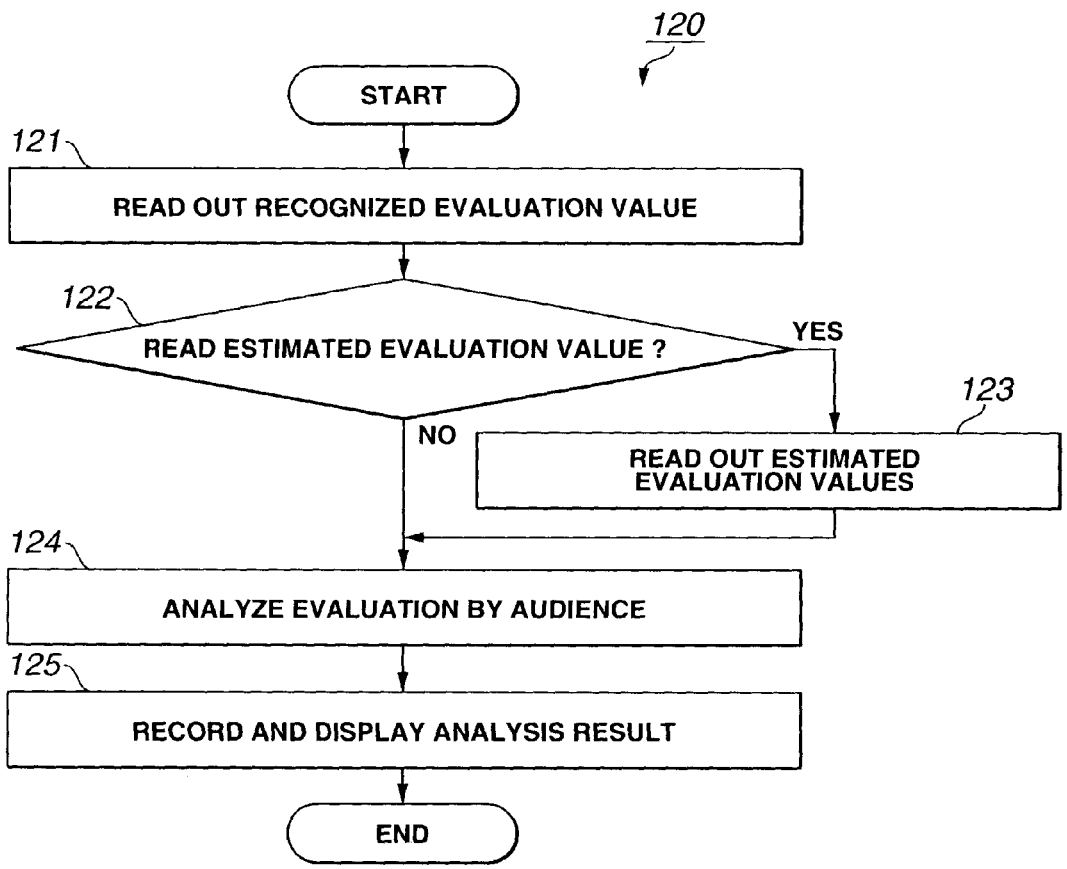
FIG. 19 is a flowchart showing an embodiment of a content evaluation collection analyzing sub-routine.

(Examples of Collection Analysis Device and the Content Analysis Method: see FIGS. 17 to 19)

In the second embodiment of the content evaluation analysis method, data transmitted from a terminal device (content reproducing or content receiving apparatus) as in the embodiments of FIGS. 10 to 16 is received in the collection center to detect the information to analyze the evaluation of the audience as to the content.

FIG. 17 shows an example of the collection analysis device provided at the collection center. This communication unit 101 receives data transmitted over communication network 9 from a terminal device shown in the embodiments shown in FIGS. 10 to 16, that is multiplexed data comprised of the recognized estimation value information correlated with the content presentation time information, transmission source identification information, content identification information and audience information.

The so received data is demodulated and error-corrected by the demodulating error correcting unit 102 so as to be written in a buffer 103. The resulting data then is read out from the buffer 103 so as to be taken in at a system controller 104.

The system controller 104 discriminates the transmission source by the transmission source identification information, while discriminating the content of the object of evaluation by the content identification information and discriminating the attributes of the audience by the audience information. The system controller 104 sorts the received recognized evaluation values from content to content, while classifying the recognized evaluation values form one attribute of the audience to another, and writing the resulting values in a storage unit 105.

Under a command from the operating unit 106, the system controller 104 reads out the recognized evaluation values from the storage unit 105 and collects the so read out recognized evaluation values from one presentation time sequence to another to analyze the evaluation of the content by the viewer. This collection is carried out based on the degree of approximation of the time sequence patterns of the recognized evaluation value.

In the storage unit 105, the above-mentioned estimated evaluation values as set by the content supplier (creator) may be written beforehand from content to content. If the estimated evaluation values as to the content being evaluated has been written in the storage unit 105, the system controller 104 compares the estimated evaluation values to the recognized evaluation values to analyze the viewer's evaluation on the content.

The analyzed result at the system controller 104 is recorded in the storage unit 105, while being demonstrated by a display controller 107 on a display 108.

FIG. 18 shows an instance of a collection processing routine at a collection analysis device 100. In this collection processing subroutine 110, data is first received at step 111. At the next step 112, data is demodulated and corrected for errors. At the next step 113, the transmission source identification information and the content identification information are discriminated from each other. At the next step 114, the recognized evaluation value, summed with the content presentation time information, is detected and written in the storage unit 105. At the next step 115, it is checked whether or not the data collection is to be halted. If data collection is to be continued, processing reverts to step 111 to repeat the processing as from step 111. If the data collection is to be halted, the collection processing is terminated.

FIG. 19 shows an example of analysis processing routine at the collection analysis device 100. In this analysis processing routine 120, recognized evaluation values are first read out at step 121 from the storage unit 105. At the next step 122, it is checked whether or not the recognized evaluation values are to be read out. If the recognized evaluation values are to be read out, processing proceeds from step 122 to step 123 to read out the recognized evaluation values from the storage unit 105. Then, processing transfers to step 124. If the recognized evaluation values as to the content of the object of evaluation have not been written in the storage unit 105, processing transfers from step 122 directly to step 124.

At step 124, the recognized evaluation values are compared to the estimated evaluation values. Alternatively, this comparison is not made and the evaluation by the audience of the content is analyzed solely from the recognized evaluation values. Then, processing transfers to step 125 to record the result of analysis in the storage unit 105 as well as to display the result of analysis on the display 108.

At step 124, the system controller 104 performs the following analysis:

If the estimated estimation values are compared to the recognized evaluation value, it is checked whether or not the difference between the estimated evaluation values and the recognized evaluation values at a scene or shot being evaluated is within a preset allowable range, as already explained with reference to a terminal device of the embodiments of FIGS. 12, 14 and 16. In addition, the difference between the estimated evaluation values and the recognized evaluation values as well as the change tendency of the recognized evaluation values is also checked as to for example whether the difference between the estimated evaluation values and the recognized evaluation values is becoming larger or smaller than the difference between the estimated evaluation values and the recognized evaluation values for past scenes or shots, as to whether the increasing tendency of the recognized evaluation values or the decreasing tendency of the recognized evaluation values is desirable, and as to whether or not the recognized evaluation values assuming a locally maximum value or a locally minimum value is desirable.

If, for example, the different between the estimated evaluation values and the recognized evaluation values is within the allowable range, but has been increased, it is determined that the reaction of the viewer (evaluation) is in a direction different from the predicted direction.

If the evaluation by the viewer is analyzed solely from the recognized evaluation value, without comparing the estimated evaluation values and the recognized evaluation values to each other, the psychological state of the viewer to the presented content is verified from the relative magnitudes or the changing tendency of the recognized evaluation values to determine whether or not the audience is in the psychological state as expected by the content supplier.

If the content supplier has found, from the analyzed results by the system controller 104, as displayed on the display 108, that the viewer is not so affrighted as predicted, the content is re-edited to change the video-acoustic properties of the content, such as picture brightness or sound level, to change the story development.

On the other hand, if it is determined that the viewer is not so delighted or interested nor so concentrated in the scene as predicted, the content story development may be changed.

If the story, scene or the shot is changed, reference may be had to the hysteresis of past reaction values or recognized evaluation values of the audience. The hysteresis may be the stored past reaction values or past recognized evaluation values for the content then presented or may be the reaction values or recognized evaluation values for some other content viewed by the audience in the past.

If the content being evaluated is the program or commercial as aired or distributed, the content supplier is able to know the degree of interest, the intensity of impression or the degree of preference of the viewer as to the program or the commercial every presentation time period.

If the audience information is contained in the received data, the content supplier is able to analyze the tendency of the interest or preference of the viewer, every presentation time period, for each of the age layers, sex, each of the living territories and for the past content viewing hysteresis of the viewer.

If the content is e.g., an itinerary, the content supplier is able to grasp the destination the viewer likes, an event he or she is interested in, or the lodgment, so that the content supplier is able to obtain the search results which reflect the viewer's liking or interest more directly than the search into the audience rate or questionnaires so far used.

(Other Embodiment of Content Evaluation Collection Analysis)

The above-described aspect of the present invention, pertinent to content evaluation, collection and analysis, may be applied to a device for reproducing the content from a recording medium other than an optical disc, to a case where the content is composed only of the picture information or to a case where the content is composed only of the acoustic information.

[Embodiment of the Content Evaluation Collection Management: See FIGS. 20 to 30]

As a third embodiment, the case of collecting and managing the viewer's evaluation on the content, as reproduced or received, is hereinafter explained.

(Embodiment of a Content Reproducing Device: See FIGS. 20 and 21)

Figure 20:
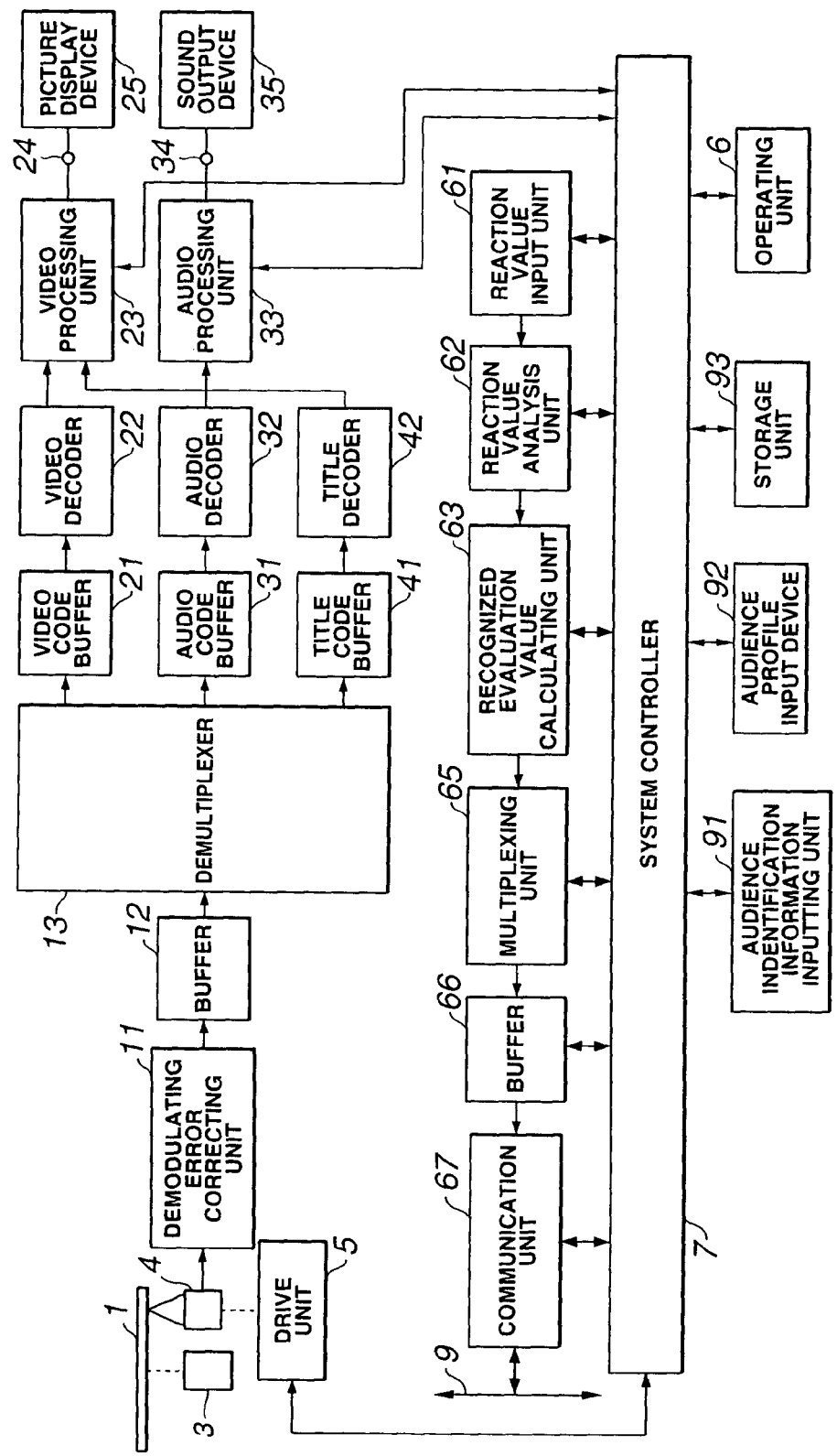
FIG. 20 is a block diagram showing a further embodiment of a content reproducing apparatus according to the present invention.

FIG. 20 shows an embodiment of an optical disc reproducing device, as the third embodiment of the content reproducing device.

On the optical disc 1 are recorded contents which are the picture information, such as a motion picture, and the acoustic information. Specifically, the picture and acoustic data are compression-encoded in accordance with the MPEG system and multiplexed so as to be recorded on the optical disc.

On the optical disc 1, there are also recorded the decoding time information, such as decoding time stamp, and the content presentation time information, such as content presentation time information (reproducing time information).

<Epitome of Reproducing Device>

The optical disc 1 is driven by the disc motor 3. The optical head (pickup) 4 is driven by the driving unit 5 including a feed motor and a tracking/focussing actuator.

When the viewer acts on the operating unit 6 for reproduction, the system controller 7 commands the driving unit 5 to reproduce the optical disc 1 to cause the signals to be read out by the optical head 4. The signals so read out are demodulated and corrected for errors by the demodulation error correction unit 11 so as to be then written in and read out from the buffer 12.

The signals read out from the buffer 12 are sent to the demultiplexer 13 from which encoded picture data, acoustic data, title data and the estimated evaluation value data are separately acquired.

The encoded picture data, acoustic data and the title are written in a video code buffer 21, an audio code buffer 31 and a title code buffer 41, read out from the video code buffer 21, audio code buffer 31 and the title code buffer 41 and subsequently decoded in a video decoder 22, an audio decoder 32 and in a title decoder 42.

Based on the timing information, such as the aforementioned decoding time stamp, the system controller 7 controls the decoding timing in the respective decoders 22, 32, 42 and controls the output timing in the respective decoders 22, 32, 42 for coordinating the temporal sequence data from the respective decoders 22, 32, 42 based on the timing information such as the aforementioned presentation time stamp.

The picture data from the video decoder 22 and the title data from the title decoder 42 are sent to a video processor 23 where the title signals are superimposed in the picture signals.

The picture signals at an output of the video processor 23 are output to the video output terminal 24 from which the picture signals are sent to the picture display device 25, such as a CRT display or a liquid crystal video projector.

The picture signals are sent to a picture display device, having the D/A (digital to analog) converter, as the picture signals remain to be digital picture data, that is without being converted by the video processor 23 into analog picture signals. Alternatively, the picture signals are converted by the video processor 23 into analog picture signals, which are sent out to the picture display device.

The acoustic data from the audio decoder 32 processed by the audio processor 33 and output acoustic signals of the audio processor 33 are output to the audio output terminal 34 so as to be output from the audio output terminal 34 to an audio output device, such as a loudspeaker or to a headphone.

The acoustic signals are sent to an audio display apparatus, having a D/A (digital to analog) converter, as the acoustic signals remain to be digital audio data, that is without being converted by the audio processor 33 into the analog picture signals. Alternatively, the acoustic signals are converted by the audio processor 33 into analog acoustic signals, which are sent out to the audio outputting device.

When the contents are reproduced from the optical disc 1, the reaction of the viewer, who listened to the sound output from the audio outputting device and viewed the picture displayed by the picture display apparatus, is input from a reaction value inputting unit 61 as a reaction value. At the same time as the content from the optical disc 1 is reproduced, the system controller 7 measures the reaction of the viewer by the reaction value inputting unit 61.

The reaction value, input from the reaction value inputting unit 61, is analyzed by a reaction value analysis unit 62 where another reaction value is calculated. From the reaction value input from the reaction value inputting unit 61 and from the reaction value calculated by the reaction value analysis unit 62, the recognition evaluation values indicating the impression or evaluation by the viewer of the content reproduced from the optical disc 1 is calculated by the recognition evaluation value calculating unit 63.

The so calculated information on the recognized evaluation values is correlated with the content presentation time information, and is multiplexed in a multiplexing unit 65 with the audience code (code specifying the audience) and with the content identification code (code specifying the content). The audience code is allocated by the collection management center at the time of initialization previous to content reproduction.

The multiplexed data is written in the buffer 66, from which the data is read out and sent by the communication unit 67 to the collection management center over the communication network 9, such as the Internet.

For the optical disc reproducing device, as the terminal device, a terminal code (a code specifying a terminal device) is set beforehand by e.g. a device producer. This terminal code is sent from the terminal device (optical disc reproducing device) to the collection management center at the time of initialization previous to content reproduction, as will be explained subsequently.

To the system controller 7, there are connected a viewer identification information inputting unit 91, a viewer profile inputting unit 92 and a storage unit 93.

To the viewer identification information inputting unit 91, the viewer identification information (the information specifying the viewer) is input by the viewer at the time of initialization and at the time of commencing the content reproduction. Specifically, when the viewer applies his or her finger on a preset surface, the viewer identification information inputting unit 91 reads the fingerprint of the viewer as the viewer identification information. Alternatively, when the viewer enunciates before a microphone, the viewer identification information inputting unit reads out the speech characteristics, such as voice pitch frequency or voiceprint, of the viewer as the viewer identification information. Still alternatively, when the viewer inputs his or her own alias or nickname, with alphabetical letters, the alias or the nickname is detected as the viewer identification information.

In initialization, the viewer profile inputting unit 92 is fed with a viewer profile by the viewer. Specifically, the viewer profile is the information specifying the viewer's age, sex, living territory or taste, the information specifying the viewer's attributes or the information specifying the hysteresis of the content as viewed by the viewer in the past.

In initialization, the viewer identification information, input by the viewer identification information inputting unit 91, and the viewer's profile, input by the viewer profile inputting unit 92, are registered in the storage unit 93. The viewer code, allocated by the collection management center, is also registered in the storage unit 93.

Although FIG. 20 shows the reaction value inputting unit 61, reaction value analysis unit 62, recognition evaluation value calculating unit 63, multiplexing unit 65 and the system controller 7 as functionally separate units, the signal processing by the reaction value inputting unit 61 or the functions of the reaction value analysis unit 62, recognition evaluation value calculating unit 63 and the multiplexing unit 65 may be included in the functions proper to the system controller 7.

<Measurement of the Reaction Values and Calculations of the Recognized Evaluation Value>

The reaction value inputting unit 61 is made up by various sensors and signal processing units. The reaction values are obtained by the signal processing unit executing calculation processing, such as differentiation, integration or correlation processing, on the measured data as output from the respective sensors.

It is however possible for the reaction value inputting unit 61 to be provided with only a sensor fraction and with an interfacing fraction, such that a sensor output is processed by the system controller 7 to calculate reaction values.

The sensors for measuring the reaction of the viewer are mounted on the seat surface, backrest or the armrest of a seat in which the viewer sits, an ear pad or a head band of a head set worn by the viewer, or on a remote commander operated by the viewer.

The reaction values are classified into data measured as a reaction of the viewer and data obtained on analysis of measured data from the reaction value inputting unit 61 by the reaction value analysis unit 62.

Specifically, the measurement items as the viewer's reaction may be exemplified by a cardiogram, respiration rate, respiration period, an electromyogram, cerebral blood flow, brain wave, amount of respiration, skin temperature, pupil diameter, eye opening degree, eye blink, facial expressions, blood flow of limb, blood flow in an earlobe and limb temperature.

In an audience participation type drama, such as a motion picture, a game or a broadcast receiving apparatus as later explained, the values obtained by the observation of the active behavior of the viewer, such as, for example, the pitch or frequency of the speech uttered by the viewer, its variations, smoothness of motion of an operating lever, or the magnitude of force with which the operating lever is moved, may be used.

The data obtained by the reaction value analysis unit 62 by analyzing these measured data may be exemplified by data indicating the time interval during which there is no blink, as calculated by analyzing the data indicating the time points of blink, and data indicating the time period of laughter, as calculated from fluctuations in the eye opening degree and time variations in the blinkless period, or mouth expressions.

Additionally, the reaction value analysis unit 62 is able to calculate data indicating the domain of surprise from the eye opening degree, changes in the pupil diameter or the electromyogram (indicating the tension of limb muscle). Moreover, the reaction value analysis unit 62 is able to calculate data indicating the time period of tension from the amount of sweat, heart rate, its rise rate, changes in the pupil diameter, changes in the limb blood flow and changes in the limb temperature.

As a method for calculating the new reaction value from the plural measured data, such a method which resides in taking linear combination of respective measured data may be used.

In the recognition evaluation value calculating unit 63, the impression or evaluation of the content by the viewer is calculated as a recognition evaluation values from the reaction values input from the reaction value inputting unit 61 and from the reaction value calculated in the reaction value analysis unit 62.

As specified recognition evaluation values, the evaluation values indicating the degree of the viewer's interest, the evaluation values indicating the strength of the viewer's impression, the evaluation values indicating the viewer's preference or the evaluation values indicating the degree of fear felt by the viewer, is calculated.

The recognition evaluation value, indicating the degree of the viewer's interest, is calculated as a function of the eye opening degree, blink rate or the heart rate. The recognition evaluation values indicating the strength of the viewer's impression is calculated from the eye opening degree, heart rate and the amount of sweat. The recognition evaluation values indicating the viewer's preference is calculated from the stableness of heart rate or the amount of sweat, limb temperature or limb blood flow. The recognition evaluation values indicating the fear felt by the viewer is calculated from the degree of surprise or the degree of tension.

Meanwhile, the recognition evaluation values are defined and calculated here taking the meaning of recognition into account and are not necessarily independent of one another.

The recognition evaluation values may also be represented as multi-dimensional data, in which case an identifier indicating the meaning of each dimension is appended for use as recognition evaluation value data.

Although the reaction values or the recognized evaluation values may be measured or calculated incessantly, these may also be measured every content partition, for example, every reproduced content scene or shot. In this case, the information indicating the intervals of scenes or shots may be recorded along with the content on the optical disc 1. Alternatively, the periods of scenes or shots may also be detected by the system controller 7 from the features of the reproduced pictures or sounds.

<Data Transmission at the Time of Content Reproduction>

The content identification code, multiplexed on the recognized evaluation values and on the viewer's code and sent in this form to the collection management center, is not necessarily the information appended to the content itself, such that, if only one content, for example, has been recorded on the optical disc 1 and also the disc identification information (information identifying the disc) is also recorded thereon, the disc identification information may be the content identification information. If only one content has been recorded on the optical disc 1 while no disc identification information is recorded thereon, the disc header information, such as the number of chapters in the disc and the play time, may be combined in accordance with a preset rule to form the disc identification information which then may be used as the content identification information.

The recognized estimation value information, the viewer's code and the content identification code are multiplexed in the multiplication unit 65, with the viewer's code and the content identification code as the data fraction and as the header fraction, respectively, and are sent by the communication unit 67 to the collection management center.

The recognized estimation value information is transmitted every five seconds or every half an hour. Alternatively, the recognized estimation value information is transmitted collectively at a time point the content reproduction all has come to a close. In any case, the above respective information are transiently stored in the buffer 66 and subsequently transmitted by the communication unit 67 to the collection management center.

It may be contemplated for the audience to view a content of long duration, such as a motion picture, in plural installments each time. The optical disc reproducing apparatus is arranged so that, if the reproduction of the content is halted transiently en route, the system controller 7 holds the information specifying the paused position or the recognized evaluation values or content presentation time information at such position for use for next content reproduction and data transmission for the same content.

<Remote Controller Exploiting a Memory Card: See FIG. 25>

The reaction value inputting unit 61, viewer identification information inputting unit 91, viewer profile inputting unit 92 and the storage device 93 are preferably mounted on the remote controller of a terminal device.

Figure 25:
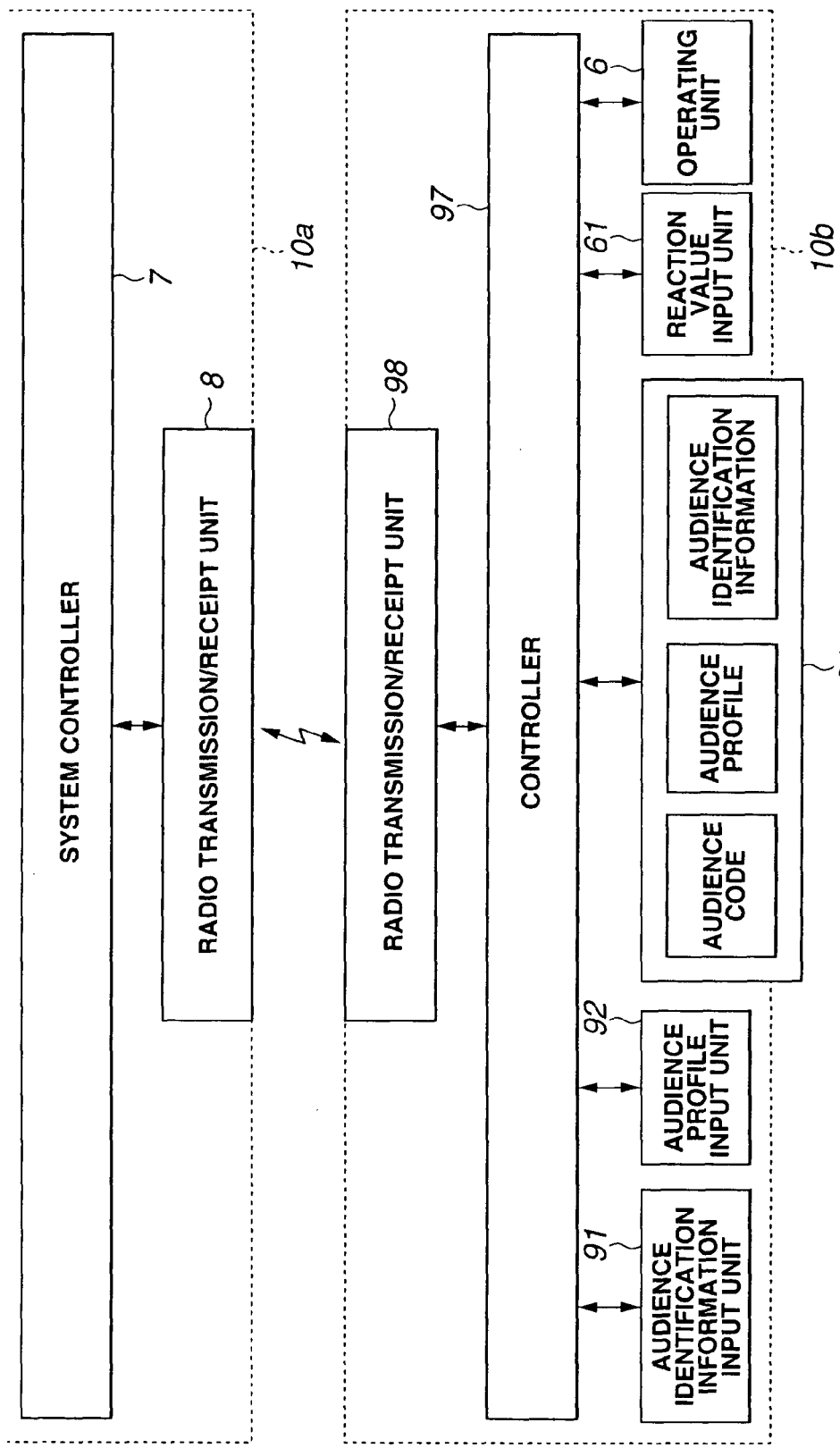
FIG. 25 is a block diagram showing an embodiment of an operating inputting unit of a terminal device, constructed as a remote controller.

FIG. 25 shows such a case in which the operating unit 6, reaction value inputting unit 61, viewer identification information inputting unit 91, viewer profile inputting unit 92, controller 97 and a radio transceiver unit 98 are mounted on a remote controller 10b, while the memory card 94 as the storage unit is removably mounted on the remote controller 10b. In a main body unit 10a of the terminal device, a radio transceiver unit 8 is mounted as the unit is connected to the system controller 7.

In the present embodiment, the viewer identification information, as entered by the viewer identification information inputting unit 91, the viewer's profile, as entered by the viewer profile inputting unit 92 and the viewer's code, allocated by the collection management center, at the time of initialization, are registered in a memory card 94. After the registration, the viewer is able to carry the memory card 94 to e.g., a destination of trip and to load it on the remote controller 10b of the terminal device at the destination of trip to view the content even at other than the viewer's home, such as at the destination of trip, to transmit the recognized evaluation values for the content to the collection management center.

<The Case of Directly Inputting the Recognized Evaluation Value: See FIG. 21>

In the instance of FIG. 20, the recognized evaluation values are calculated by the recognition evaluation value calculating unit 63 from the reaction value supplied from the reaction value inputting unit 61. Alternatively, the viewer may directly input the recognized evaluation values on respective items.

Figure 21:
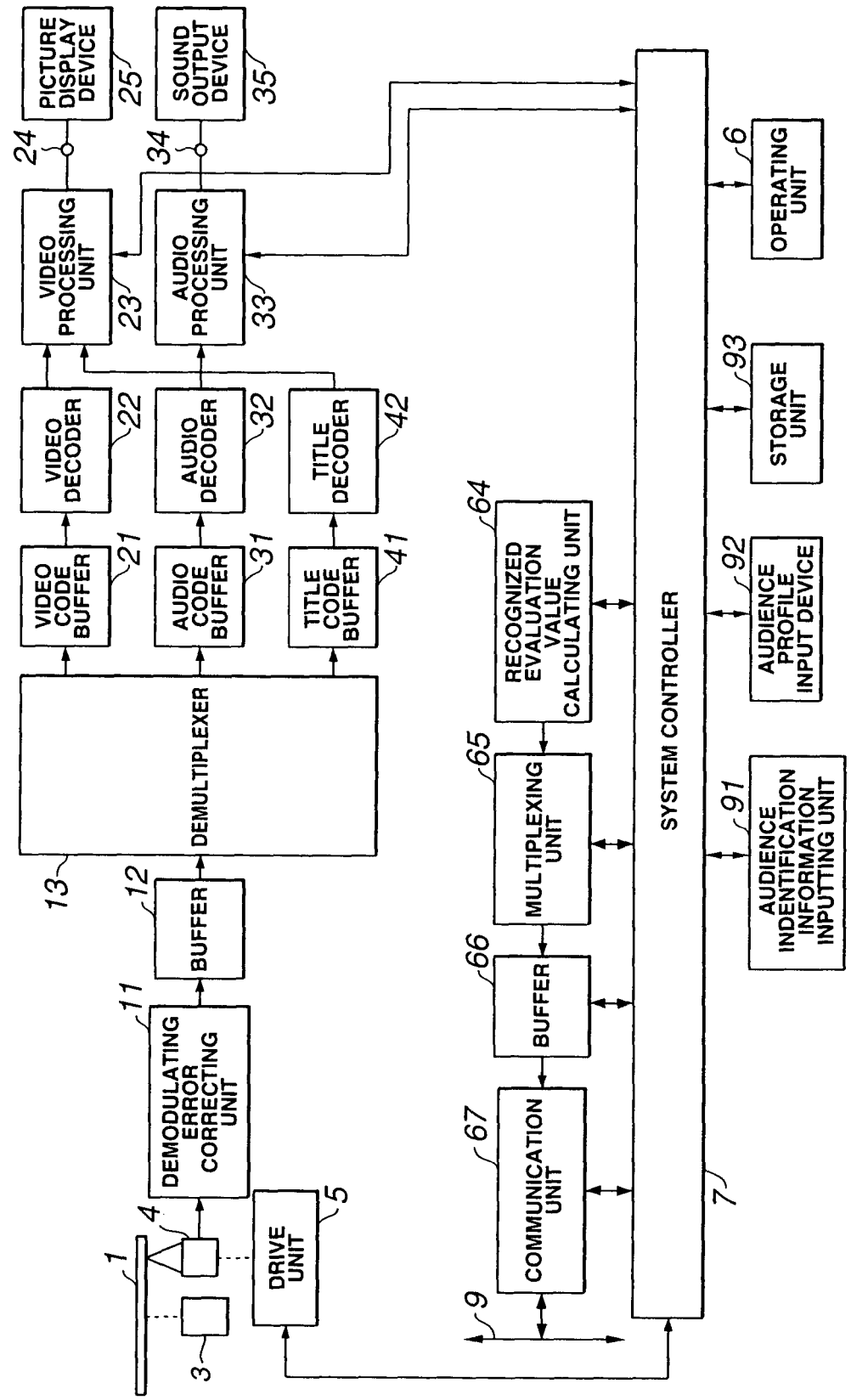
FIG. 21 is a block diagram showing a further embodiment of a content reproducing apparatus according to the present invention.

FIG. 21 shows an instance of such case. In this embodiment, the recognized estimation value inputting unit 64 is provided in place of the reaction value inputting unit 61, the reaction value analysis unit 62 and the recognition evaluation value calculating unit 63 of the embodiment of FIG. 20.

The recognized estimation value inputting unit 64 is designed to permit the viewer to input recognized evaluation values for respective items with numerical figures, such as [−2] for the degree of interest or [+3] for the degree of preference. Alternatively, the recognized estimation value inputting unit 64 may be provided with levers for respective items of the recognized evaluation value, these levers being slid by the viewer in the plus direction or in the minus direction.

Still alternatively, the recognized estimation value inputting unit 64 may be comprised of a microphone and a signal processor having the speech recognizing function, so that the viewer is able to orally input the recognized evaluation values of the respective items, such as by uttering 'not at all interested' or 'truly desirable'.

(Further Embodiment of the Content Reproducing Apparatus: See FIG. 22)

Figure 22:
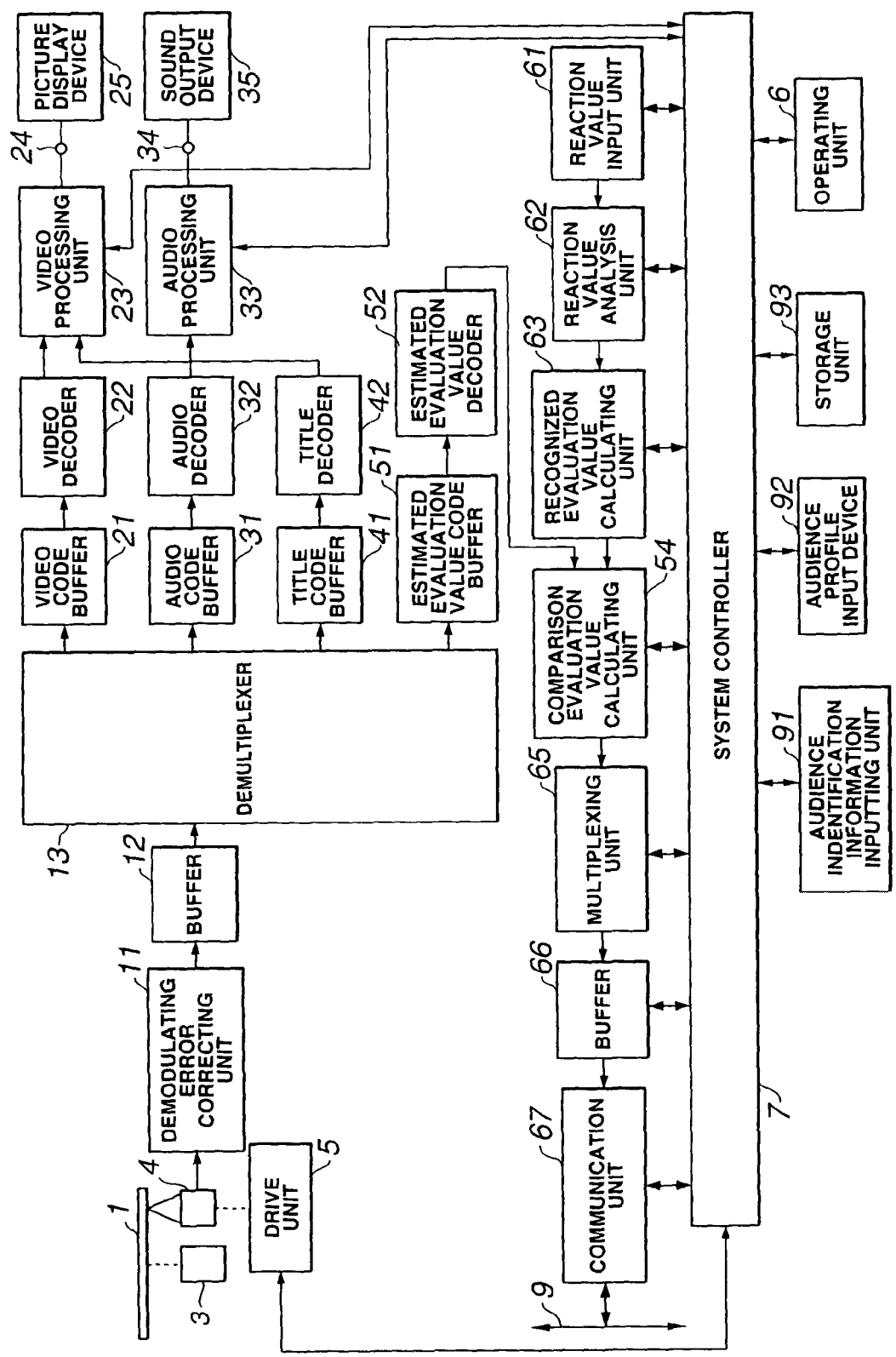
FIG. 22 is a block diagram showing a further embodiment of a content reproducing apparatus according to the present invention.

FIG. 22 shows an optical disc reproducing apparatus as a content reproducing apparatus of a third embodiment of the present invention.

In the present embodiment, estimated evaluation values for the content are recorded, along with the content, on the optical disc 1. The estimated evaluation values are estimated impressions of the viewer on viewing the content, or estimated evaluation of the content by the viewer on viewing the content. The estimated evaluation values have been set by the content supplier (creator) in consideration of the sort or brightness of the presented picture, sort or level (magnitude) of the presented sound or of the story development of the presented content.

The content presented has the properties of a story, in a majority of cases, while the psychological state of the viewer to whom the content has been presented is usually changed with the story development. Thus, it may be presumed that, even if the picture or the sound is the same, the impression or evaluation, such as feeling or interpretation, may be changed from scene to scene. Consequently, the estimated evaluation values are set from one content partition to another, such as from one content scene to another, in consideration not only of characteristics of pictures or sounds (physical properties such as picture brightness or sound level) but also of the properties of the presented content as a story. As a matter of course, the scene or shot, to which the attention of the viewer is desired to be directed, is intentionally adjusted video-acoustically so that the recognition evaluation values indicating the degree of the viewer's interest for the scene or shot will be higher. So, the estimated evaluation values of the scene or shot is also set to a higher value.

The psychological state of the audience for the presented content can be understood from the recognized evaluation values calculated from the above-mentioned various reaction values and the progress thereof with time. Also, comparison of the estimated evaluation values preset by the content supplier as described above to the recognized evaluation values calculated from the various reaction values indicates whether or not the psychological state of the viewer is as expected by the content supplier.

An instance of FIG. 22 shows a case wherein the comparison evaluation values, representing the results of comparison of the estimated evaluation values and the recognized evaluation value, in place of the recognized evaluation value, are sent to the collection management center. The estimated evaluation value data are encoded and, in the present embodiment, are multiplexed on picture and acoustic data so as to be recorded in this form on the optical disc 1. The specified method for time axis management and multiplexing is the same as that in the first embodiment pertinent to content presentation control.

The recognized estimation value data are read out from the optical disc 1 at the same time as the content is reproduced from the optical disc 1. The so read out estimated evaluation value data are demultiplexed by the demultiplexer 13 and written in the code buffer for the estimated evaluation values 51. The demultiplexed data are read out from the code buffer 51 and decoded by the decoder for the estimated evaluation values 52. The estimated evaluation values, thus decoded, are also correlated with the content presentation time information.

The viewer's reactions are measured as reaction values in the reaction value inputting unit 61, at the same time as the content is reproduced, as in the embodiment of FIG. 20. The recognized evaluation value, indicating the impression or evaluation by the viewer for the reproduced content, are calculated in the recognition evaluation value calculating unit 63.

Moreover, in the present embodiment, the estimated evaluation values decoded by the decoder for the estimated evaluation values 52 and the recognized evaluation values calculated in the recognition evaluation value calculating unit 63 are compared to each other in a comparison evaluation value calculating unit 54.

Similarly to the recognized evaluation value, the estimated evaluation values may be represented as multi-dimensional data. In such case, an identifier indicating the meaning of each dimension is appended to the leading end of the estimated evaluation value data of each dimension. When the estimated evaluation values and the recognized evaluation values are represented in this manner as multi-dimensional data, comparison of the estimated evaluation values and the recognized evaluation values in the comparison evaluation value calculating unit 54 is by comparing for example the direction and the magnitude of the multi-dimensional vectors.

In the present embodiment, comparison evaluation values obtained at the time of content reproduction from the comparison evaluation value calculating unit 54, representing the results of comparison between the estimated evaluation values and the recognized evaluation value, are multiplexed in the multiplexing unit 65 with the viewer code and the content identification code, and the resulting multiplexed data are written in the buffer 66. The data are transmitted by the communication unit 67 to the collection management center over the communication network 9.

In the present embodiment, a recognized estimation value inputting unit may be provided in place of the reaction value inputting unit 61, reaction value analysis unit 62 and the recognition evaluation value calculating unit 63 to permit the viewer to directly input recognized evaluation values for respective items.

The memory card 94 may also be detachably mounted on the remote controller 10b, as in the embodiment of FIG. 25.

(Embodiment of the Content Receiving Apparatus (Broadcast Receiver): See FIGS. 23 and 24)

The content receiving apparatus of a third embodiment may, for example, be configured as a device for receiving digital TV broadcast, such as BS digital broadcast.

The content in this case is the picture information and the acoustic information of a program. As the content identification code, the program code, for example, is used.

Figure 23:
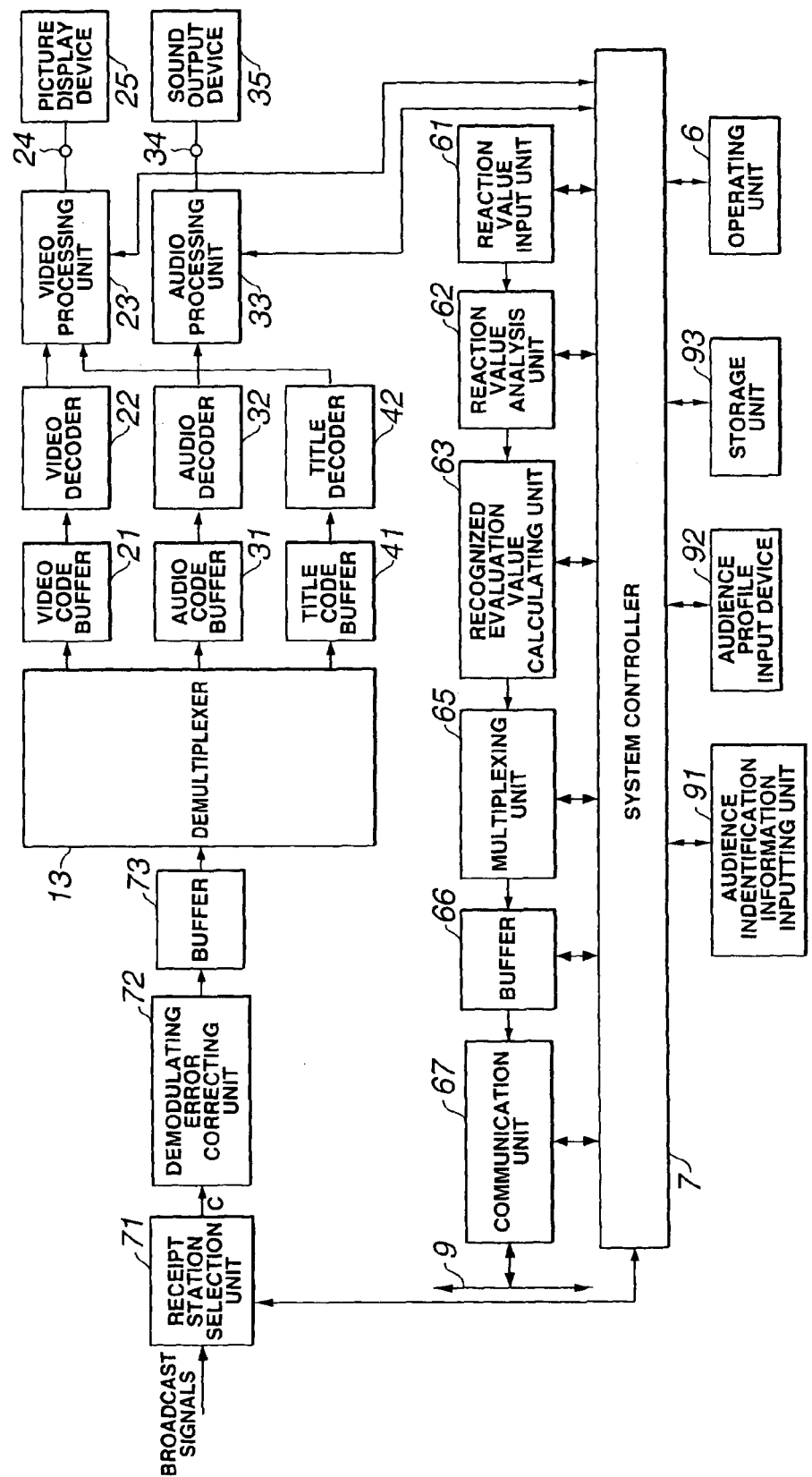
FIG. 23 is a block diagram showing a further embodiment of a content receiving apparatus according to the present invention.

FIG. 23 shows an embodiment of a broadcast receiver. A reception tuning unit 71 receives broadcast signals, on tuning, under tuning control by the system controller 7 based on the tuning operation by the operating unit 6. The signals, received on tuning, are demodulated and corrected for errors by the demodulating error correcting unit 72, after which the signals are written in the buffer 73 and subsequently read out from the buffer 73.

The signals read out from the buffer 73 are sent to the demultiplexer 13 from which encoded picture data, acoustic data and title data are separately produced on demultiplication. The content receiving apparatus is otherwise the same as the optical disc reproducing device of the embodiment of FIG. 20.

Meanwhile, if the reaction values or the recognized evaluation values are measured or calculated from one scene or shot of the content (program) to another, the information indicating the domain or period of the scene or shot may be aired simultaneously with the content. Alternatively, the system controller 7 may be configured for detecting the domain or period of the scene or shot from the features of the reproduced picture or sound.

Figure 24:
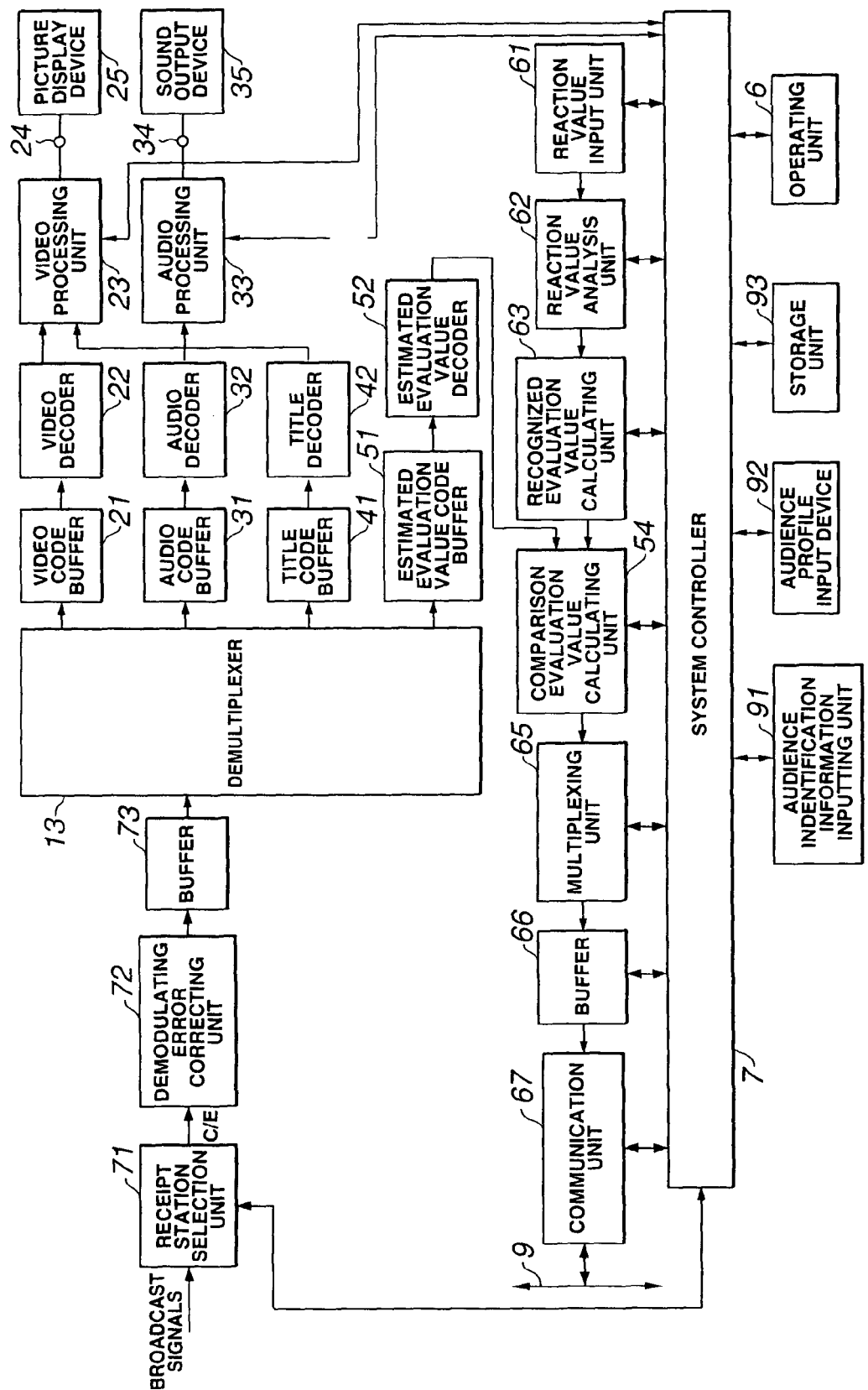
FIG. 24 is a block diagram showing a further embodiment of a content receiving apparatus according to the present invention.

FIG. 24 shows a further embodiment of the broadcast receiver. In the present embodiment, the aforementioned estimated evaluation value data are aired, as the data are multiplexed on the content (picture data and acoustic data), as digital TV broadcast. As in the optical disc reproducing device of the embodiment of FIG. 22, the comparison evaluation values, representing the results of comparison of the estimated evaluation values and the recognized evaluation value, are sent to the collection management center.

In the reception tuning unit 71, aired signals, including the estimated evaluation value data, are received on tuning. The signals, received on tuning, are demodulated and corrected for errors by the demodulating error correcting unit 72 so as to be written in and subsequently read out from the buffer 73.

The signals read out from the buffer 73 are sent to the demultiplexer 13 from which encoded picture data, acoustic data, title data and the recognized estimation value data are separately produced on demultiplication. The content receiving apparatus is otherwise the same as the optical disc reproducing device of the embodiment of FIG. 22.

The broadcast receiver of FIGS. 23 and 24 may also be configured so that a recognized estimation value inputting unit is provided in place of the reaction value inputting unit 61, reaction value analysis unit 62 and the recognition evaluation value calculating unit 63 to permit the viewer to directly input the recognized evaluation values for respective items.

The memory card 94 may also be detachably mounted on the remote controller 10b, as in the embodiment of FIG. 25.

(Instances of the Collection Management Device and Method: See FIGS. 26 to 30)

In the third embodiment of the content evaluation and management method, the collection management center, sometimes abbreviated to 'center', receives data sent from a terminal device (content reproducing device or the content receiving apparatus) as in the embodiments of FIGS. 20 to 25 and detects the respective information. The center also analyzes the viewer's evaluation for the content and updates the evaluation hysteresis, while updating viewer management data.

Figure 26:
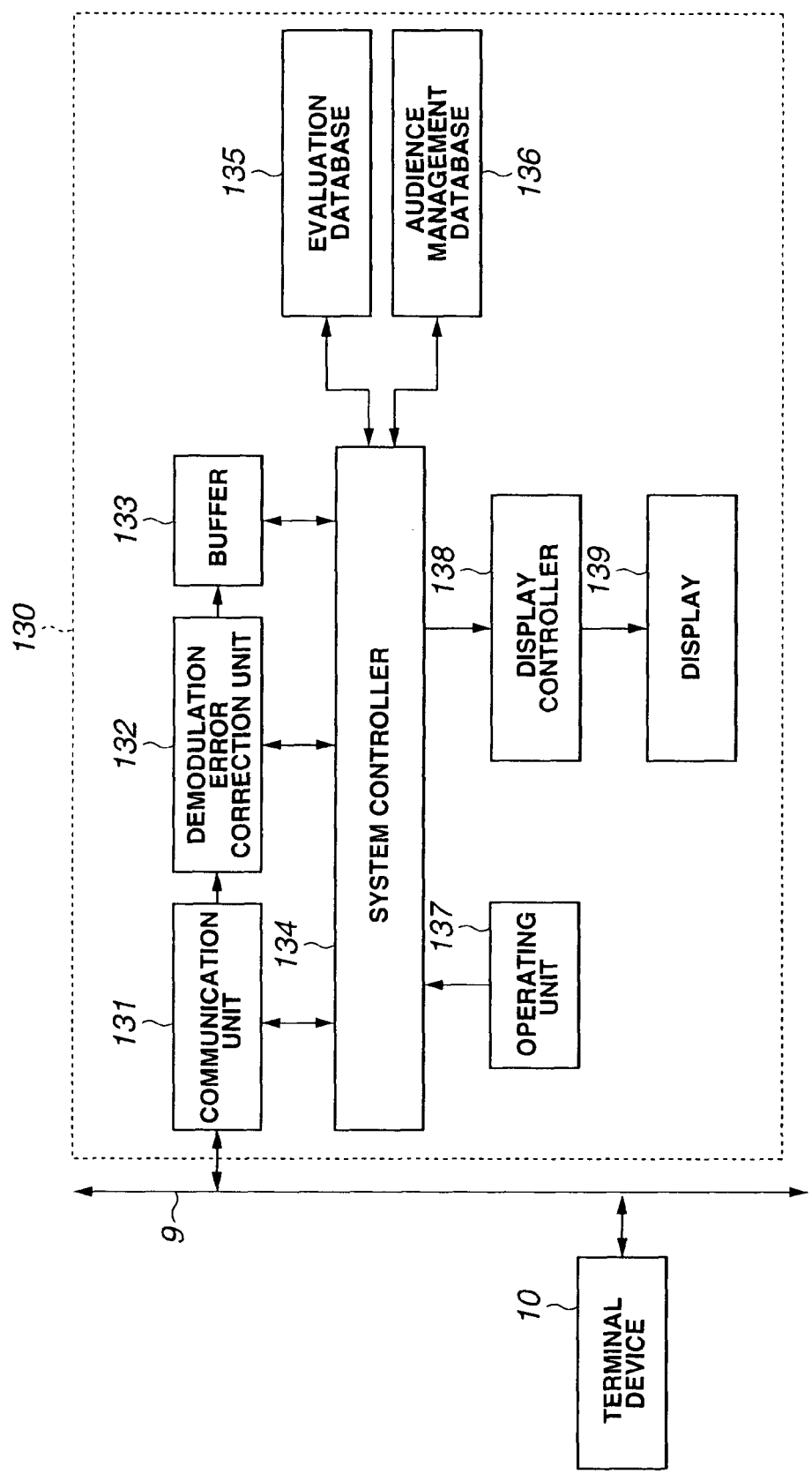
FIG. 26 is a block diagram showing an embodiment of a content evaluation collecting and managing device according to the present invention.

FIG. 26 shows an instance of a collection management device provided at the center. This collection management device 130 is made up by a communication unit 131, a demodulating error correcting unit 132, a buffer 133, a system controller 134, an evaluation database 135, a viewer management database 136, an operating unit 137, a display controller 138 and a display 139.

The data sent from the terminal device 10 over the communication network 9 are received by the communication unit 131 and demodulated and corrected for errors by the demodulating error correcting unit 132. The resulting signals are then written in and subsequently read out from the buffer 133 so as to be taken in by the system controller 134.

The system controller 134 performs registration processing in association with the initializing processing at the terminal device 10, and the data reception processing as well as evaluation analysis processing in association with the content reproducing processing at the terminal device 10, while controlling various portions of the collection management device 130, as will be explained subsequently in detail.

The evaluation database 135 has recorded thereon the hysteresis of the evaluation by the viewer on the content and the results of evaluation analysis, while the viewer management database 136 has recorded thereon management data, such as scores (points) for individual viewers as specified by the viewer's codes.

Figure 27:
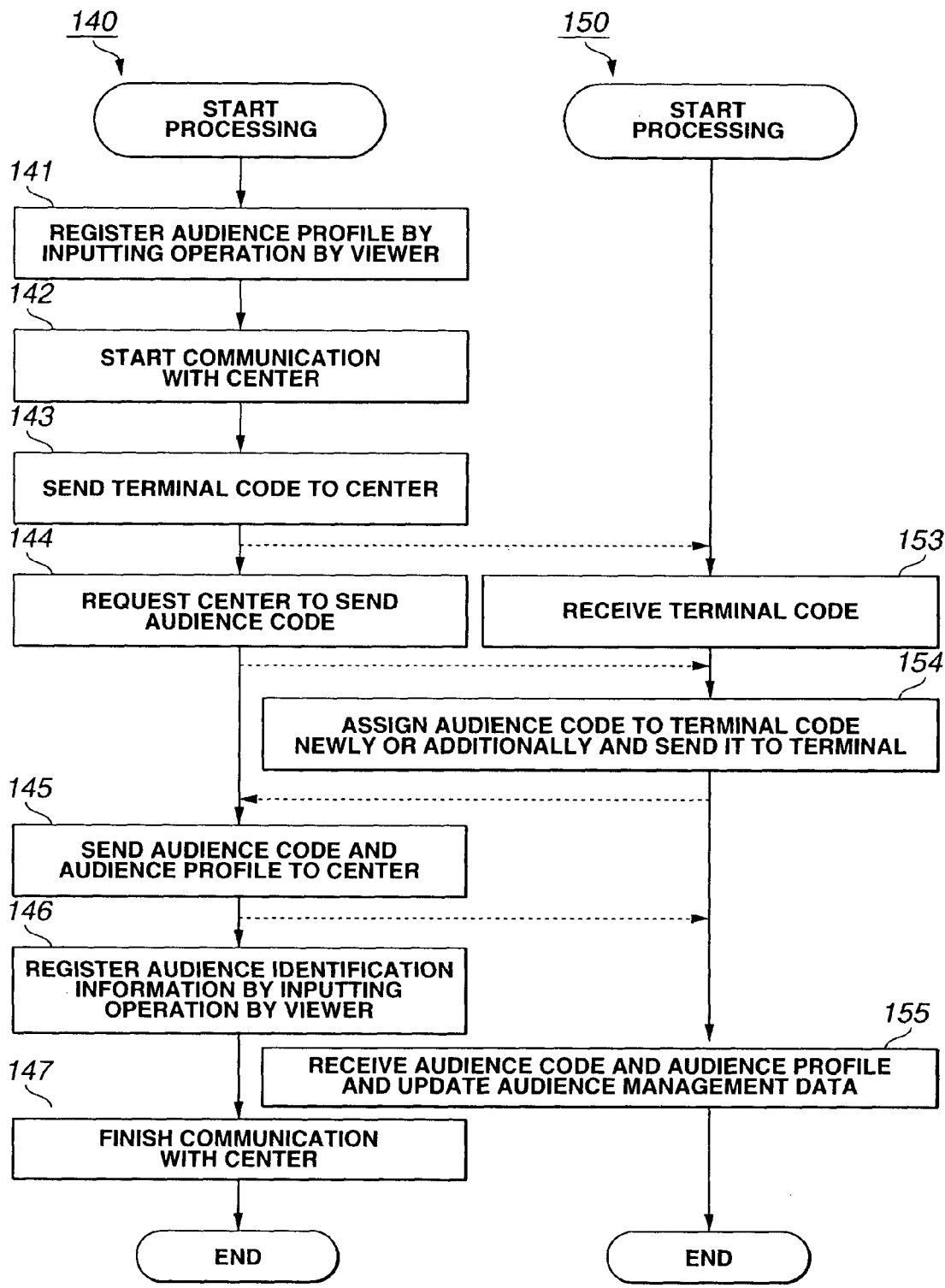
FIG. 27 is a flowchart showing an embodiment of an initializing processing routine in a terminal device and a registration processing routine in the content evaluation collecting and managing device according to the present invention.

In the above-described system, an initializing processing routine, shown on the left side of FIG. 27, is executed in the terminal device 10, while a registration processing routine shown on the right side thereof is executed in the collection management device 130 of the center, before the terminal device 10 reproduces the content to send data including recognized evaluation values or comparison evaluation values to the center. In the following description, 'reception' is included in 'reproduction' insofar as the broadcast receiver is concerned.

That is, in a terminal side initializing processing subroutine 140, the system controller 7 at step S141 registers a viewer profile in a storage unit 93 (or in a memory card 94), by the viewer's inputting operation at a viewer profile inputting unit 92. At the next step 142, communication with the center is commenced. At the next step 143, the terminal code is sent to the center and, at the next step 144, the center is requested to send a viewer code.

In a center side registration processing routine 150, the system controller 134 at step 153 receives a terminal code, transmitted at step 143 from the terminal device 10, by the communication unit 131. At the next step 154, the system controller responsive to the request from the terminal device 10 at step 144 newly or additionally allocates the viewer's code to the terminal code received at step 153 to cause the communication unit 131 to send the resulting signal to the terminal device 10.

It is when a first viewer desirous to view a content by a terminal device has requested a viewer code that a viewer code is newly allocated to a corresponding terminal code. Also, it is when second and third viewers desirous to view the content by the same terminal device have requested the viewer's codes that new viewer's codes are additionally allocated. In either cases, the viewer(s) inputs the own viewer's profile and requests the own viewer's code from the center.

In the terminal side initializing processing subroutine 140, the viewer's code, transmitted at step 154 from the center, is received at step 145 for registration in the storage unit 93 or in the memory card 94. The viewer's card and the viewer's profile registered at step 141 are transmitted to the center.

In the center side registration processing routine 150, the viewer's code and the viewer's profile, transmitted from this terminal device 10, are received at step 155 to update the viewer management data in the viewer management database 136. Specifically, management data for viewers, to whom the viewers' cards have been allocated, are newly provided and initial scores or points are accorded thereto. The initial scores or points may be set arbitrarily.

In the terminal side initializing processing subroutine 140, the viewer identification information is registered at step 146 in the storage unit 93 or in the memory card 94, by the inputting operation on a viewer identification information inputting unit 91. Then, at step 147, communication with the center is terminated.

In the terminal side initializing processing subroutine 140 and in the center side registration processing routine 150, the viewer code, viewer profile and the viewer identification information are registered in the storage unit 93 or in the memory card 94 of the terminal device 10, while the viewer management data are set in the center side viewer management database 136 from one allocated viewer code to another.

Figure 28:
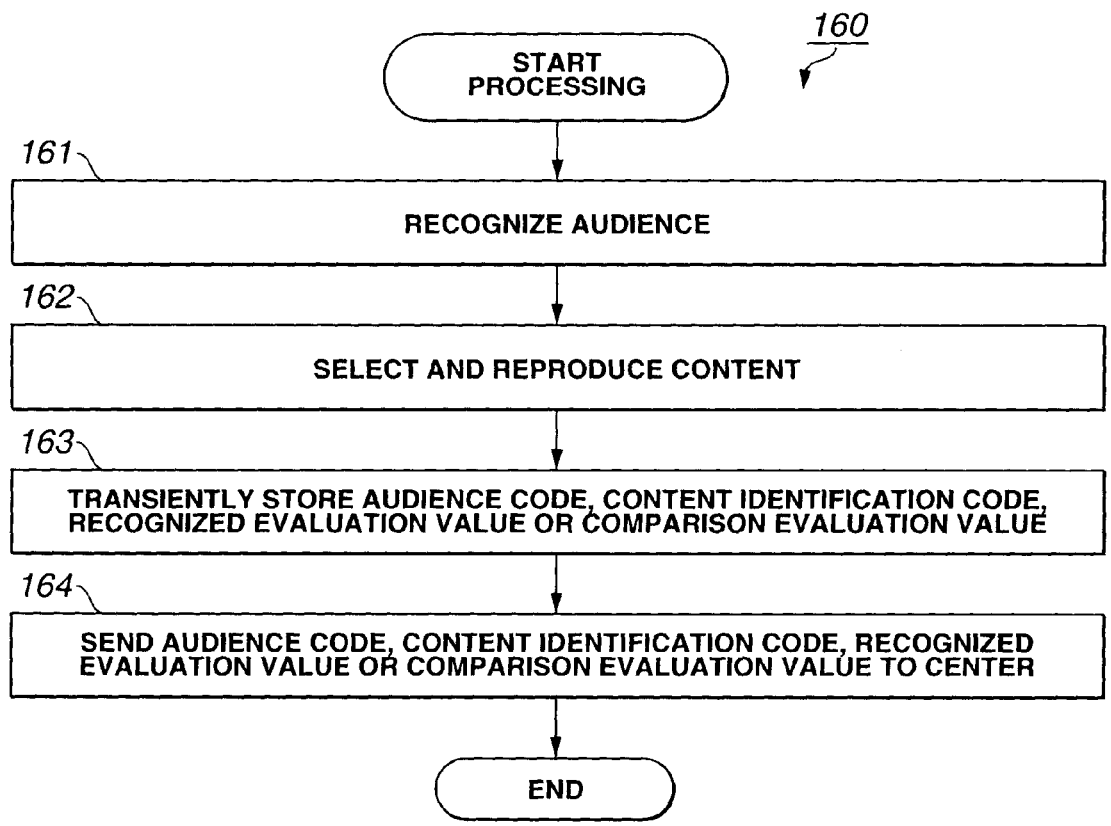
FIG. 28 is a flowchart showing an embodiment of a content reproducing processing routine of a terminal device.

After the above-described initialization, the content is reproduced in the terminal device 10 and data including the recognized evaluation values or comparison evaluation values is sent to the center. FIG. 28 shows an instance of a content reproducing processing routine carried out in this case by the system controller 7 of the terminal device 10.

In this content reproducing processing routine 160, the viewer viewing the content at step 161 inputs the viewer identification information at the viewer identification information inputting unit 91 or loads the memory card 94 having the viewer identification information registered therein on the remote controller 10b, as shown in FIG. 25, to confirm that the viewer about to view the content is the registered viewer. The content reproducing processing routine then proceeds to step 162 to select and reproduce the content.

At the next step 163, the viewer's code, the content identification code and the recognized evaluation values or comparison evaluation values are multiplexed in the multiplexer 65 and stored transiently in the buffer 66. The recognized evaluation values or the comparison evaluation values have been correlated with the content presentation time information.

At the next step 164, the viewer's code, the content identification code and the recognized evaluation values or comparison evaluation values are sent by the communication unit 67 to the center.

Figure 29:
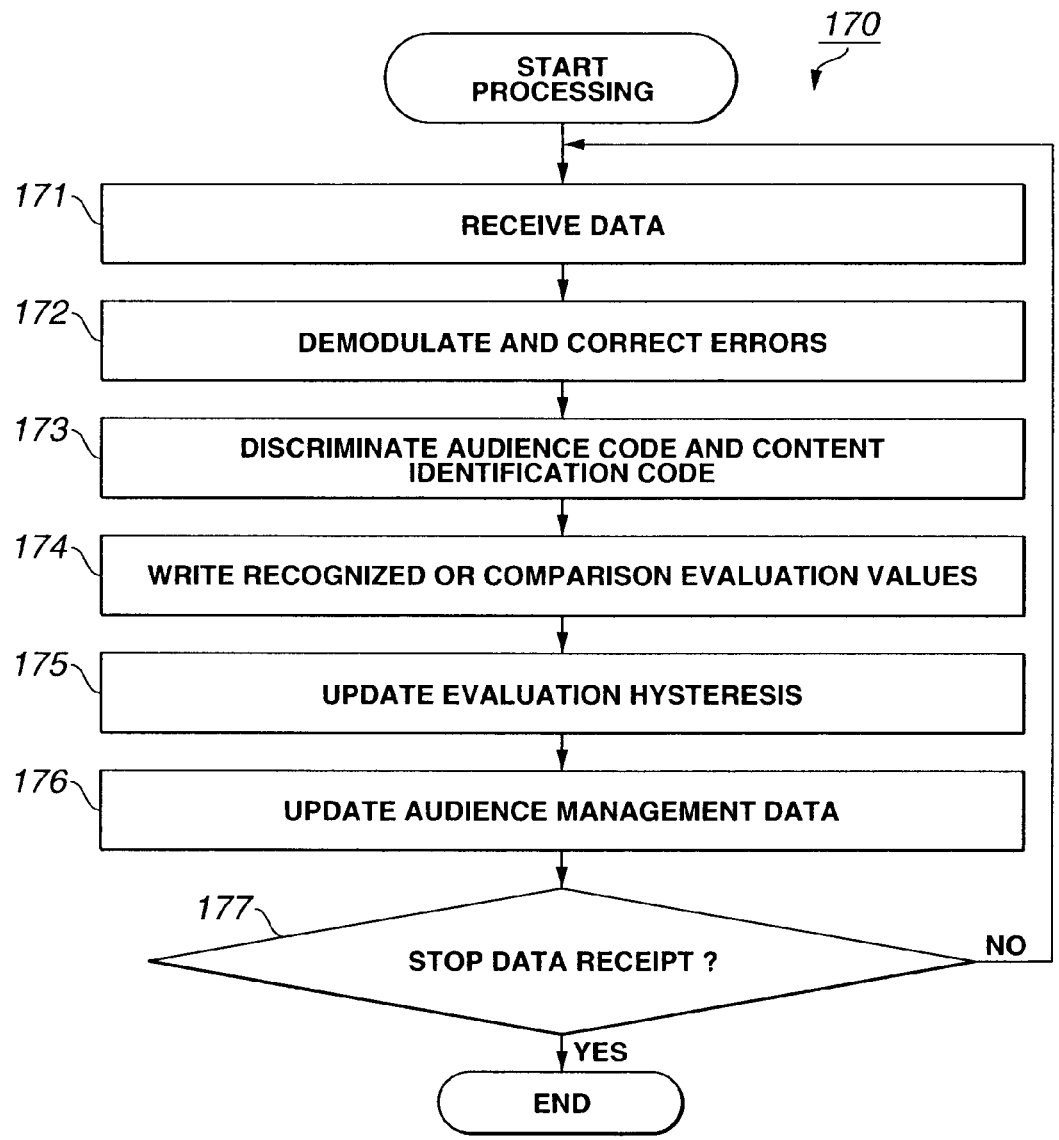
FIG. 29 is a flowchart showing an embodiment of a data reception processing routine in the content evaluating collecting and managing device according to the present invention.

The collection management device 130 of the center receives data transmitted from the terminal device 10 to detect the respective information to update the hysteresis of the viewer's evaluation of the content as well as to update the viewer management data. FIG. 29 shows an instance of the data reception subroutine performed by the system controller 134 of the collection management device 130 in this case.

In this data reception processing routine 170, the system controller 134 at step 171 causes the communication unit 131 to receive data. At the next step 172, the system controller 134 causes the demodulating error correcting unit 132 to demodulate data and correct the data for errors. At the next step 173, the system controller 134 discriminates the viewer codes and the content identification codes. At the next step 174, the system controller 134 causes the recognized evaluation values or the comparison evaluation values, having the content presentation time information appended thereto, to be written in the evaluation database 135 along with the viewer code and the content identification code.

At the next step 175, the system controller 134 updates the evaluation hysteresis in the evaluation database 135. The evaluation hysteresis in this case states, for each viewer, the contents viewed and the evaluation values (recognized evaluation values or comparison evaluation values) for the viewed contents.

At the next step 176, the viewer management data in the viewer management database 136 is updated and, at the next step 177, it is checked whether or not data reception is to be terminated. If the data reception is to be continued, processing reverts from step 177 to step 171 to repeat the processing as from step 171. If data reception is to be terminated, the data reception processing is finished.

In updating the viewer management data at step 176, the management data for the viewer who transmitted the recognized evaluation values or the comparison evaluation values are summed with scores or points. These scores may be appropriated to viewing chargeable contents or to shopping. If the scores have been appropriated in this manner, the corresponding scores are deduced in updating the viewer management data.

Under a command from the operating unit 137, the system controller 134 of the collection management device 130 reads out the recognized evaluation values or the comparison evaluation values from the evaluation database 135, along with the viewer code and the content identification code, for summation, every presentation time sequence, to analyze the viewer's evaluation of the content. This summation is performed on the basis of the correlation or variance of the temporal changing pattern of the recognized evaluation values or the comparison evaluation values.

As for a specified method for evaluation analysis, when the recognized evaluation value, for example, are evaluated, a local peak value, such as a locally maximum value, is calculated for the evaluated values of each viewer, and correlation thereof with the content presentation time is detected.

The local peak values of each viewer are summed from one event domain or period in the content provided by the content supplier (creator) to another. In this case, summation is made separately for plus values and minus values. That is, by summing the minus values, such as 'uninteresting' or 'fiddling' independently of plus values, such as 'interesting' or 'desirable', it is possible to make summation, such as to reflect the market evaluation, even if evaluation by the viewers is split between the plus evaluation and the minus evaluation, with the positive and minus evaluation then counterbalancing each other.

If, in initialization, the viewer profile is received from the terminal device 10 and recorded in the viewer management database 136, as in the above-described embodiment, the viewers are classified, depending on the age layer, sex, living territories or past content viewing hysteresis to sum the recognized evaluation value.

If the viewers are classified depending on the content viewing hysteresis, the content viewing hysteresis may be managed by the content identification code appended to the individual contents. Alternatively, the contents may be roughly classified to manage the content viewing hysteresis from one content class to another. As for the content classification, classification by story property evaluation patterns, such as semantic scores, may be used in addition to customary classifications such as as 'sports', 'documents', 'comedies', 'love stories', or 'adventures'. As for the semantic scores, detailed explanation is given in Takahashi et al., 'Structural Expressions of Motion Pictures Employing the Semantic Core Method', published by Nippon design Association, vol. 47, No. 6, 57-66, 2000.

If the evaluation values transmitted from the terminal device 10 and written in the evaluation database 135 are not the comparison evaluation values, indicating the results of comparison between the recognized evaluation values and the estimated evaluation values, but are the recognized evaluation value, the estimated evaluation values as set by the content supplier may be written in the evaluation database 135 from one content to another.

If the estimated evaluation values for the contents being evaluated are written in this manner in the evaluation database 135, the system controller 134 compares the estimated evaluation values to the recognized evaluation values received by the communication unit 131 and written in the evaluation database 135 to analyze the viewer's evaluation for the content.

The results of analysis by the system controller 134 are recorded in the evaluation database 135 and demonstrated on the display 139 by the display controller 138.

Figure 30:
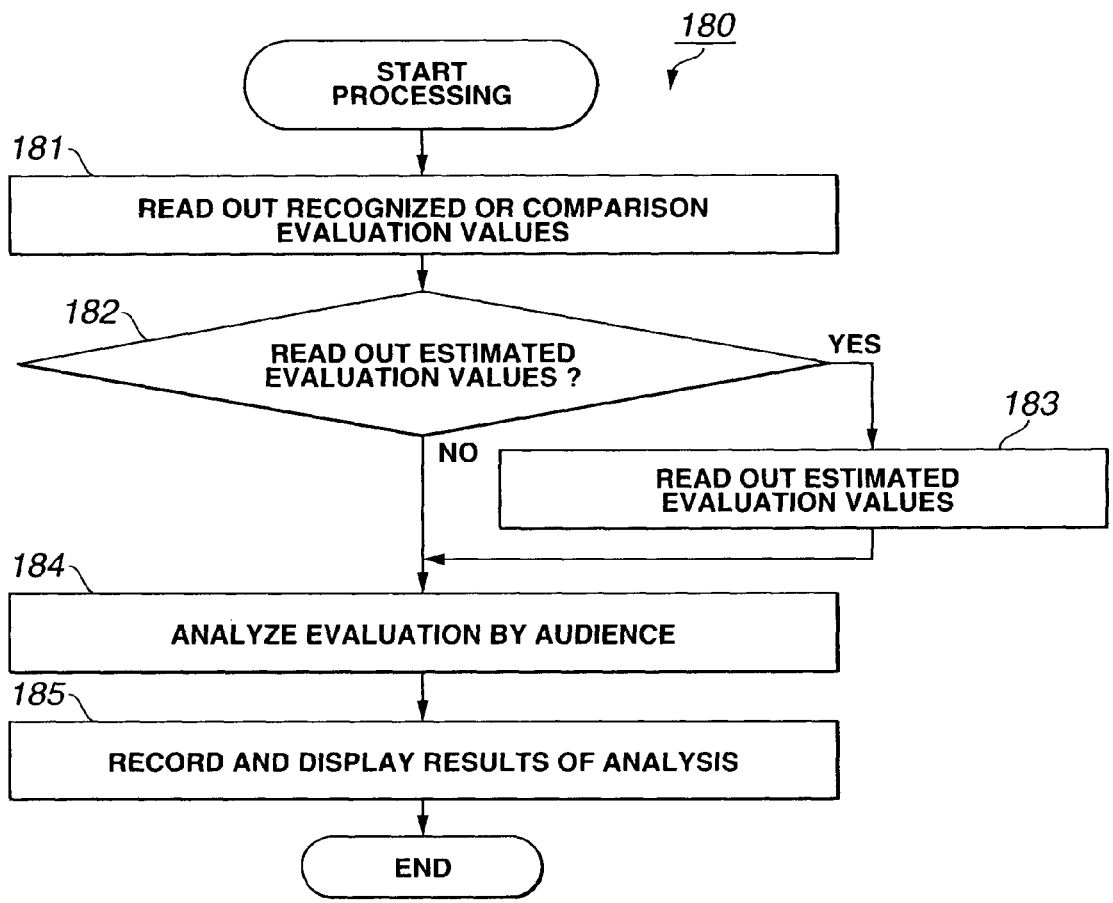
FIG. 30 is a flowchart showing an embodiment of a content evaluation analyzing processing subroutine in the content evaluation collecting managing device.

FIG. 30 shows an example of the above-described evaluation analysis processing routine. In this evaluation analysis processing routine 180, the estimated evaluation values or the comparison evaluation values are first read out at step 181 from the evaluation database 135. At the next step 182, it is checked whether or not the estimated evaluation values are to be read out. If the estimated evaluation values are to be read out, processing transfers from step 182 to step 183 to read out the estimated evaluation values from the evaluation database 135. Then, processing transfers to step 184.

If the comparison evaluation values are read out from the evaluation database 135, or if the estimated evaluation values for the content being evaluated are not written in the evaluation database 135, processing transfers directly from step 182 to step 184.

At step 184, the recognized evaluation values read out from the evaluation database 135 are compared to the estimated evaluation values to analyze the viewer's evaluation on the content. Alternatively, the viewer's evaluation on the content is analyzed only from the recognized evaluation values as read out from the evaluation database 135 or from the comparison evaluation values as read out from the evaluation database 135. Then, processing transfers to step 185 to record the result of analysis in the evaluation database 135 as well as to demonstrate the result on the display 139.

At step 184, the system controller 134 executes the following analyses:

If the estimated estimation values, as read out from the evaluation database 135, are compared to the recognized evaluation values to analyze the viewer's evaluation for the content, or the viewer's evaluation for the content is analyzed from the comparison evaluation values as read out from the evaluation database 135, it is checked whether or not the difference between the estimated evaluation values and the recognized evaluation values at a scene or shot being evaluated is within a preset allowable range. In addition, the difference between the estimated evaluation values and the recognized evaluation values as well as the change tendency of the recognized evaluation values is also checked as to for example whether the difference between the estimated evaluation values and the recognized evaluation values is becoming larger or smaller than the difference between the estimated evaluation values and the recognized evaluation values for past scenes or shots, as to whether the increasing tendency of the recognized evaluation values or the decreasing tendency of the recognized evaluation values is desirable, and as to whether or not the recognized evaluation values assuming a locally maximum value or a locally minimum value is desirable.

If, for example, the difference between the estimated evaluation values and the recognized evaluation values is within the allowable range, but has been increased, it is determined that the reaction of the viewer (evaluation) is in a direction different from the predicted direction.

If the evaluation by the viewer is analyzed solely from the recognized evaluation value, without comparing the estimated evaluation values and the recognized evaluation values to each other, the psychological state of the viewer to the presented content is verified from the relative magnitudes or the changing tendency of the recognized evaluation values to determine whether or not the audience is in the psychological state as expected by the content supplier.

If the content supplier has found, from the analyzed results by the system controller 134, as displayed on the display 139, that the viewer is not so affrighted as predicted, the content is re-edited to change the video-acoustic properties of the content, such as picture brightness or sound level, to change the story development.

On the other hand, if it is determined that the viewer is not so delighted or interested nor so concentrated in the scene as predicted, the content story development may be changed.

If the story, scene or the shot is changed, reference may be had to the hysteresis of past reaction values or recognized evaluation values of the audience. The hysteresis may be the stored past reaction values or past recognized evaluation values for the content then presented or may be the stored reaction values or recognized evaluation values for some other content viewed by the audience in the past.

If the content being evaluated is the program or commercial as aired or distributed, the content supplier is able to know the degree of interest, the intensity of impression or the degree of preference of the viewer as to the program or the commercial every presentation time period.

If the audience information is contained in the received data, the content supplier is able to analyze the tendency of the interest or preference of the viewer, every presentation time period, for each of the age layers, sex, each of the living territories and for the past content viewing hysteresis of the viewer.

If the content is e.g., an itinerary, the content supplier is able to grasp the destination the viewer likes, an event he or she is interested in or the lodgment, so that the content supplier is able to obtain a search result which reflects the viewer's liking or interest more directly than a search into the audience rate or questionnaires so far used.

(Other Embodiment of Content Evaluation Collection Analysis)

The above-described aspect of the present invention pertinent to content evaluation, collection and analysis may be applied to a device for reproducing the content from a recording medium other than an optical disc, to a case where the content is composed only of the picture information or to a case where the content is composed only of the acoustic information.

Industrial Applicability

According to the present invention, described above, it is possible to give the impression or evaluation as intended by the content supplier, while it is also possible to estimate the items in which the viewer is interested to change the content reproduction characteristics or the content story development in a direction which will instigate the viewer's interest.

Moreover, according to the present invention, the impression or viewer's evaluation for the content, including inner or physiological reactions of the viewer not likely to be demonstrated in facial expressions or behavior of the viewer, may be grasped accurately in detail from one presentation time zone of the content to another.

Thus, the content supplier is able to grasp the viewer's interest or preference from one content partition to another and for the entire content correctly and in detail to confirm the degree of completeness of the content as well as to exploit the so obtained information for future content creation to contribute to improving the content hit ratio.

In addition, if the content is a commercial, it can be grasped whether or not the commercial is up to the sponsor's expectations, while the result of the evaluation analysis can be reflected in the calculations of the advertizement fee.

Furthermore, the evaluation by a larger number of viewers may be obtained and analyzed frequently and continually to derive an index useful in continually retouching the content or an index useful for future content creation.

The viewer's interest or liking can be checked according to the viewer's attributes, such as age groups, sex or living territories for deriving the information useful in content creation which takes the viewer's attributes into consideration.

The invention claimed is:

1. A content reproducing apparatus for reproducing subsequent scenes as a function of a user's physical reaction to preceding scenes of said content, said apparatus comprising:

acquiring means for acquiring a content, said content being picture information and/or acoustic information formed of said scenes;

receiving means for receiving evaluation values estimated for respective scenes of said content and set by a supplier or creator of said content, an estimated evaluation value being associated with a respective one of said scenes of said content and representing an anticipated psychological state of a user to that respective scene of said content, said anticipated psychological state of the user being the psychological state that said supplier or creator expects from the user when the user views said respective scene;

reproducing means for reproducing said content;

reaction input means for inputting reaction data representing a user's express physical reaction to said respective scene of the reproduced content while said respective scene of said content is being reproduced and viewed by the user;

evaluation means for determining from said inputted reaction data the user's recognized evaluation value representing the actual psychological state of said user in response to the respective scene of said reproduced content;

comparing means for comparing said user's recognized evaluation values of said respective scene to the estimated evaluation value associated with that scene as said content is being reproduced to determine if the psychological state of the user corresponds to the psychological state that said supplier or creator of said content expects; and controlling means for controlling how subsequent scenes forming the content will be reproduced based on the results of said comparison and for continuing the reproduction of succeeding scenes in response to said controlling means.

2. The apparatus of claim 1, wherein said reaction input means comprises a reaction sensor that senses the user's reaction to the reproduced content.

3. The apparatus of claim 2 wherein the reaction sensor measures predetermined physiologic characteristics of the user.

4. The apparatus of claim 1, wherein both the acquiring means acquires said content and said receiving means receives said evaluation values from a recording medium or via the internet.

5. The apparatus of claim 1, further comprising communication means for transmitting to a server said user's recognized evaluation values or the result of said comparison.

6. A method for controlling the presentation of subsequent scenes of content as a function of a user's physical reaction to preceding scenes, said method comprising:

acquiring content, said content being picture information and/or acoustic information formed of said scenes, receiving evaluation values estimated for respective scenes of said content and set by a supplier or creator of said content, the estimated evaluation values being associated with respective ones of said scenes of said content and representing an anticipated psychological state of a user to each of said respective scenes of said content, said anticipated psychological state of the user being the psychological state that said supplier or creator expects from the user when the user views said respective scene;

reproducing said content;

inputting reaction data representing a user's express physical reaction to said respective scene of the reproduced content while said respective scene of said content is being reproduced and viewed by the user;

determining from said inputted reaction data the user's recognized evaluation value representing the actual psychological state of said user in response to the respective scene of said reproduced content;

comparing the user's recognized evaluation values of said respective scene to the estimated evaluation values associated with that scene as said content is being reproduced to determine if the psychological state of the user corresponds to the psychological state that said supplier or creator of said content expects, and controlling how subsequent scenes forming said content will be reproduced based on the results of the comparison and continuing the reproduction of succeeding scenes in response to said controlling means.

7. An apparatus for collecting and analyzing a viewer's psychological state in response to said user's physical reaction to content formed of scenes of picture information and/or acoustic information, comprising:

communication means for receiving from a terminal device, that reproduces or receives said content, (a) information on a viewer's recognized evaluation values of each of respective scenes of said content, said viewer's recognized evaluation values indicating the viewer's express physical reaction to said respective scene of said content and representing the psychological state of the viewer as the viewer views said scene of said content, (b) content identification information specifying the scenes of said content, and (c) source identification information specifying a viewer's terminal device or the viewer; and analysis processing means for detecting the respective content identification information received from said terminal device and for analyzing the express physical reactions by the viewer to said respective scene of the content by comparing the received viewer's recognized evaluation values of said respective scenes scene to estimated evaluation values associated with that respective ones of said scenes scene of said content and representing the expected psychological state of the viewer expected by a supplier or creator of said content in response to said respective scene viewed by the viewer to determine if the actual psychological state of the viewer corresponds to the psychological state expected by said supplier or creator of said content.

8. A method for collecting and managing a viewer's psychological state in response to said user's physical reaction to content formed of scenes of picture information and/or acoustic information, comprising:

receiving from a terminal device that reproduces or receives the content, (a) transmission source identification information specifying the transmission source, (b) content identification information specifying the scenes of said content reproduced or received by said terminal device, and (c) the results of comparison between (i) a viewer's recognized evaluation values of each of respective ones of said scenes indicating the viewer's express physical reaction to the scene reproduced or received by said terminal device and representing the actual psychological state of the viewer in response to that scene, while said scenes of said content are being reproduced or received, and (ii) evaluation values associated with said respective scenes of said content and pre-estimated for said scenes of the content reproduced or received by said terminal device, said pre-estimated evaluation values representing the expected psychological state of a viewer in response to viewing respective ones of said scenes of the content and expected by a supplier or creator of said content, said comparison determining if the psychological state of the viewer corresponds to the psychological state expected by said supplier or creator of said content for said respective scene of the content;

detecting the respective received information;

analyzing the viewer's evaluation for the content in accordance with said results of comparison;

updating an evaluation hysteresis; and updating management data on the transmission source specified by said transmission source identification information.

9. An apparatus for collecting and managing a viewer's psychological state in response to said user's physical reaction to content formed of scenes of picture information and/or acoustic information formed of scenes, comprising:

communication means for receiving from a terminal device that reproduces or receives the content, (a) transmission source identification information specifying a transmission source, (b) content identification information specifying the scenes of said content reproduced or received by said terminal device, and (c) the results of comparison between (i) a viewer's recognized evaluation values of a respective one of said scenes indicating the viewer's express physical reaction to that scene reproduced or received by said terminal device and representing the actual psychological state of the viewer in response to that scene, while that scene of said content is being reproduced or received, and (ii) evaluation values associated with said respective scenes of said content and pre-estimated for said scenes of the content reproduced or received by said terminal device, said pre-estimated evaluation values representing the expected psychological state of a viewer in response to viewing a respective one of said scenes of the content and expected by a supplier or creator of said content, said comparison determining if the psychological state of the viewer corresponds to the psychological state expected by said supplier or creator of said content for that scene of the content;

evaluation analysis means for detecting the respective information received by said communication means and for analyzing the viewer's express reaction to the content reproduced or received by said terminal device;

an evaluation database in which an evaluation hysteresis of the viewer for the content is recorded and updated; and a management database in which management data for the transmission source specified by said transmission source identification information is recorded and updated.

10. A method of collecting and analyzing the evaluation on a content formed of scenes of picture information and/or acoustic information, comprising the steps of:

receiving from a terminal device that reproduces or receives the content, (a) information on a viewer's recognized evaluation values of respective scenes of said content, indicating a viewer's express physical reaction to said respective scenes of the content and representing the psychological state of the viewer as the viewer views a respective scene of said content, (b) content identification information specifying the scenes of said content, and (c) source identification information specifying a viewer's terminal device or the viewer; and detecting the respective information received and analyzing the express physical reactions by the viewer to a respective scene of the content by comparing the received viewer's recognized evaluation values of said respective scene to estimated evaluation values associated with that respective scene of said content and representing the expected psychological state of a viewer in response to that respective scene and expected by a supplier or creator of said content to determine if the actual psychological state of the viewer corresponds to the expected psychological state of the viewer to that respective scene.

* * * * *